United States Patent
Sasaki

(10) Patent No.: US 9,163,926 B2
(45) Date of Patent: Oct. 20, 2015

(54) INDUCTIVE DETECTION TYPE ROTARY ENCODER

(71) Applicant: MITUTOYO CORPORATION, Kawasaki-shi, Kanagawa (JP)

(72) Inventor: Kouji Sasaki, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 381 days.

(21) Appl. No.: 13/749,206

(22) Filed: Jan. 24, 2013

(65) Prior Publication Data

US 2013/0187639 A1 Jul. 25, 2013

(30) Foreign Application Priority Data

Jan. 25, 2012 (JP) .................. 2012-013458
Jul. 27, 2012 (JP) .................. 2012-166605
Dec. 18, 2012 (JP) .................. 2012-275315

(51) Int. Cl.
*G01B 7/30* (2006.01)
*G01D 5/245* (2006.01)
*G01B 3/18* (2006.01)

(52) U.S. Cl.
CPC .. *G01B 7/30* (2013.01); *G01B 3/18* (2013.01); *G01D 5/2452* (2013.01)

(58) Field of Classification Search
CPC ......... G01D 5/2452; G01D 1/00; G01D 5/06; G01D 5/2073; G01D 5/2086; G01D 5/2451; G01D 5/2457; G01D 5/3473; G01D 3/18; G01D 5/2053; G01D 5/2046; H02K 16/00; H02K 16/02; H02K 19/103; H02K 1/27; H02K 1/2793; H02K 1/185; H02K 55/04; H01F 38/18; H01F 38/14; G01B 7/30; G01B 3/18; G01B 7/003

USPC ............. 324/207.17, 207.16, 207.21, 207.25; 310/112, 114, 199, 208, 209
See application file for complete search history.

(56) References Cited

U.S. PATENT DOCUMENTS

| | | | |
|---|---|---|---|
| 6,236,199 B1 | 5/2001 | Irle et al. | |
| 6,260,286 B1* | 7/2001 | Suzuki et al. | 33/813 |
| 7,385,389 B2 | 6/2008 | Tahara et al. | |
| 2002/0117927 A1* | 8/2002 | Kim et al. | 310/191 |
| 2002/0175673 A1 | 11/2002 | Butzmann | |
| 2010/0102803 A1* | 4/2010 | Kobayashi | 324/207.25 |
| 2010/0231206 A1* | 9/2010 | Kobayashi | 324/207.25 |
| 2011/0068777 A1 | 3/2011 | Tiemann et al. | |
| 2011/0227562 A1* | 9/2011 | Sasaki | 324/207.25 |

FOREIGN PATENT DOCUMENTS

| | | |
|---|---|---|
| EP | 2182329 A2 | 5/2010 |
| EP | 2312272 A2 | 4/2011 |
| EP | 2372313 A1 | 10/2011 |
| JP | 2005-265518 A | 9/2005 |
| JP | 2006-322927 | 11/2006 |
| JP | 2011-085504 | 4/2011 |

OTHER PUBLICATIONS

European Search Report dated Oct. 1, 2014, 7 pages.

\* cited by examiner

*Primary Examiner* — Melissa Koval
*Assistant Examiner* — Nasima Monsur
(74) *Attorney, Agent, or Firm* — Rankin, Hill & Clark LLP

(57) ABSTRACT

A first reception wiring and a first magnetic flux coupler form a first track having a shape periodically changing in a rotation direction of the rotor at a first pitch. A second reception wiring and a second magnetic flux coupler form a second track having a shape periodically changing in a rotation direction of the rotor at a second pitch. The first reception wiring and the second reception wiring are stacked via a first insulative layer in a direction in which a rotation shaft extends. The first magnetic flux coupler and the second magnetic flux coupler are stacked via a second insulative layer in a direction in which the rotation shaft extends.

14 Claims, 27 Drawing Sheets

STATE A

STATE B

INDUCTIVE DETECTION TYPE ROTARY ENCODER

CROSS-REFERENCE TO RELATED APPLICATIONS

This application is based upon and claims the benefit of priority from the prior Japanese Patent Applications No. 2012-013458, filed on Jan. 25, 2012, No. 2012-166605, filed on Jul. 27, 2012, and No. 2012-275315, filed on Dec. 18, 2012, the entire contents of which are incorporated herein by reference.

BACKGROUND OF THE INVENTION

1. Field of the Invention

The present invention relates to an inductive detection type rotary encoder for measuring a rotation angle of an object by use of magnetic flux coupling between wirings provided in a rotor and a stator.

2. Description of the Related Art

A rotary encoder includes a stator arranging therein a transmission wiring and a reception wiring, and a rotor arranging therein a magnetic flux coupler capable of magnetic flux coupling therewith (see U.S. Pat. No. 7,385,389). When the rotary encoder is applied to a hand tool such as micrometer, a plurality of tracks (transmission wiring, reception wiring and magnetic flux coupler) generating signals with different wavelengths need to be collected and the outer diameter of the rotary encoder needs to be reduced.

In an inductive detection type rotary encoder, at least two tracks are required to measure an absolute position (see U.S. Pat. No. 7,385,389, for example). However, when two tracks are concentrically arranged like the apparatus described in U.S. Pat. No. 7,385,389, the outer diameter of the inductive detection type rotary encoder increases.

SUMMARY OF THE INVENTION

An inductive detection type rotary encoder according to the present invention includes: a stator; a rotor which is rotatable about a rotation shaft and is arranged opposite to the stator; a transmission wiring which is annularly formed on the stator about the rotation shaft; a first reception wiring and a second reception wiring which are annularly formed on the stator along the transmission wiring about the rotation shaft; and a first magnetic flux coupler and a second magnetic flux coupler which are annularly formed on the rotor about the rotation shaft and are directed for magnetic-flux coupling with the transmission wiring, the first reception wiring and the second reception wiring, the first reception wiring and the first magnetic flux coupler forming a first track having a shape periodically changing in a rotation direction of the rotor at a first pitch, the second reception wiring and the second magnetic flux coupler forming a second track having a shape periodically changing in a rotation direction of the rotor at a second pitch different from the first pitch, the first reception wiring and the second reception wiring being stacked via a first insulative layer in a direction in which the rotation shaft extends, and the first magnetic flux coupler and the second magnetic flux coupler being stacked via a second insulative layer in a direction in which the rotation shaft extends.

Further, the inductive detection type rotary encoder according to the present invention includes: a stator; a rotor which is rotatable about a rotation shaft and is arranged opposite to the stator; a first transmission wiring which is annularly formed on the stator about the rotation shaft and a second transmission wiring which is annularly formed on the inner periphery side of the first transmission wiring; a first reception wiring and a second reception wiring which are annularly formed on the stator along the transmission wiring about the rotation shaft, and a first magnetic flux coupler and a second magnetic flux coupler which are annularly formed on the rotor about the rotation shaft and are directed for magnetic-flux coupling with the first transmission wiring, the second transmission wiring, and the first reception wiring and the second reception wiring, the first reception wiring and the first magnetic flux coupler forming a first track having a shape periodically changing in a rotation direction of the rotor at a first pitch, the second reception wiring and the second magnetic flux coupler forming a second track having a shape periodically changing in a rotation direction of the rotor at a second pitch different from the first pitch, the first reception wiring and the second reception wiring being stacked via a first insulative layer in a direction in which the rotation shaft extends, the first magnetic flux coupler and the second magnetic flux coupler being stacked via a second insulative layer in a direction in which the rotation shaft extends, the first magnetic flux coupler having a toothed first current path changing at the first pitch and an annular second current path coupling the inner periphery side of the first current path, and the second magnetic flux coupler having an annular third current path, and a toothed fourth current path changing at the second pitch of which outer periphery side is coupled by the third current path.

With the structure, since the first and second reception wirings and the first and second magnetic flux couplers are stacked in a direction in which the rotation shaft extends, the inductive detection type rotary encoder of absolute position detection type can be reduced in size. The first transmission wiring and the second transmission wiring are independently formed and thus can be realized with a simple structure. Further, the first and second magnetic flux couplers are provided with the current paths for strongly magnetic-flux coupling with the first and second reception wirings and the current paths for magnetic-flux coupling therewith very little, thereby reducing crosstalk between the first track and the second track and making a highly accurate measurement.

The inductive detection type rotary encoder can comprise a current supplying unit for alternately supplying currents to the first transmission wiring and the second transmission wiring. Thereby, crosstalk between the first track and the second track can be reduced.

The first and second reception wirings, and the first and second magnetic flux couplers may be stacked as follows. That is, the first reception wiring opposes the first magnetic flux coupler, and the first reception wiring and the first magnetic flux coupler are arranged between the second reception wiring and the second magnetic flux coupler. In this case, the first pitch can be made shorter than the second pitch. The structure enables a track sensitivity having a shorter pitch to be enhanced, thereby enhancing a measurement accuracy.

Further, the inductive detection type rotary encoder according to the present invention includes: a stator; a first rotor which is engaged with a rotation shaft to rotate along with the rotation shaft and axially opposes the stator; a second rotor which is arranged on the outer periphery side of the first rotor, is rotatable relative to the first rotor, and axially opposes the stator; a rotation transmitting unit which transmits rotation of the rotation shaft and rotates the second rotor at a different speed from the first rotor; a first angle detection track and a second angle detection track which are coaxially formed relative to the rotation shaft on an opposite surface of the first rotor of the stator and an opposite surface of the stator of the first rotor, respectively; and a third angle detection track and a fourth angle detection track which are coaxially formed relative to the rotation shaft on an opposite surface of the second rotor of the stator and an opposite surface of the stator of the second rotor, the first angle detection track generating N1 periodical changes for one revolution of the first rotor, the second angle detection track generating N2 periodical changes for one revolution of the first rotor, the third angle detection track generating N3 periodical changes for one revolution of the second rotor, the fourth angle detection track generating N4 periodical changes for one revolution of the second rotor, and N1 is different from N2 and N3 is different from N4.

DETAILED DESCRIPTION OF THE EMBODIMENTS

Embodiments according to the present invention will be described below in detail with reference to the drawings.

Figure 1:
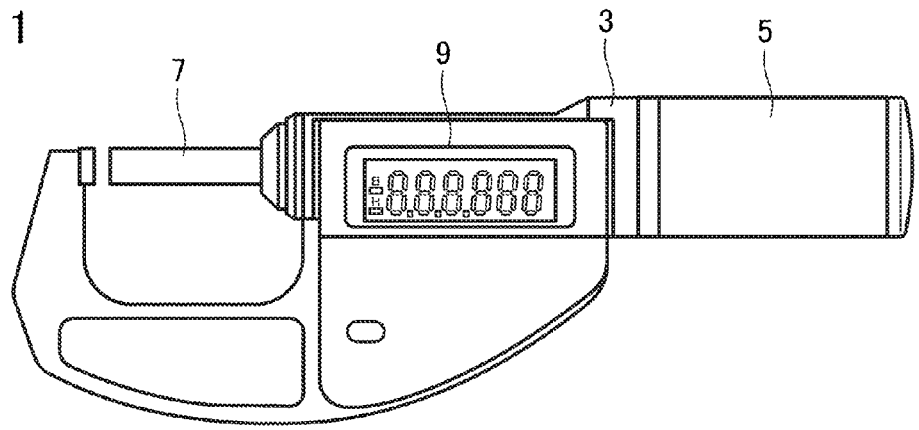
FIG. 1 is a front view of a digital micrometer 1 mounting thereon an inductive detection type rotary encoder according to a first embodiment.

A structure of a digital micrometer mounting thereon an inductive detection type rotary encoder according to a first embodiment of the present invention will be described with reference to FIG. 1. FIG. 1 is a front view of the digital micrometer. A frame 3 of the digital micrometer is rotatably attached with a thimble 5. A spindle 7 as a probe is rotatably supported inside the frame 3.

One end of the spindle 7 protrudes to the outside and abuts an object to be measured. On the other hand, the other end of the spindle 7 is threaded by a feed screw (not illustrated in FIG. 1). The feed screw is fit into a nut in the thimble 5.

With the structure, when the thimble 5 is rotated in the forward direction, the spindle 7 advances in the shaft direction of the spindle 7. When the thimble 5 is rotated in the reverse direction, the spindle 7 retracts in the shaft direction of the spindle 7. The frame 3 is provided with a liquid crystal display unit 9 capable of displaying a measurement value of the digital micrometer.

[Structure of Inductive Detection Type Rotary Encoder 11 According to First Embodiment]

Figure 2:
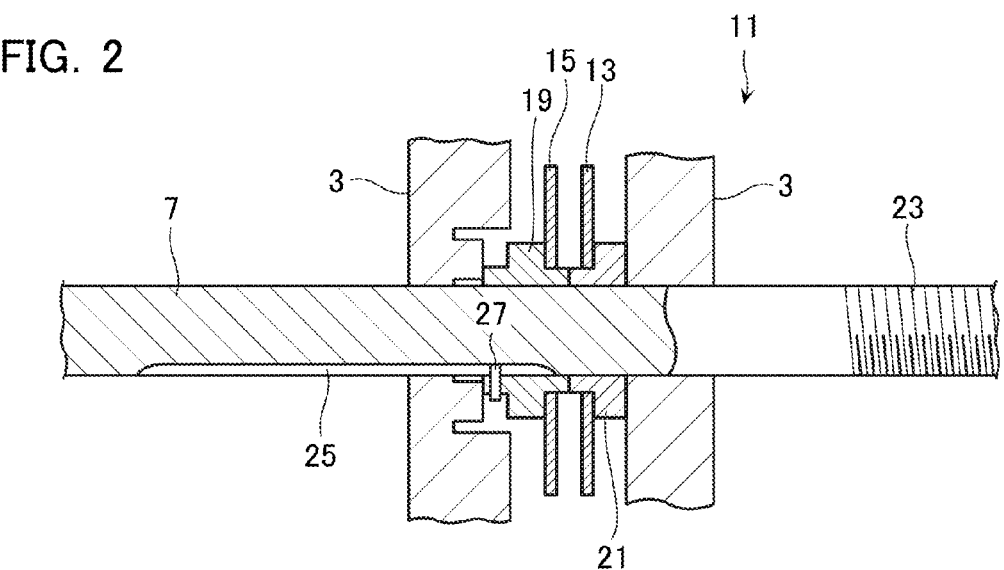
FIG. 2 is a cross-section view of an inductive detection type rotary encoder 11 according to the first embodiment.

A structure of an inductive detection type rotary encoder 11 according to the first embodiment incorporated in the digital micrometer of FIG. 1 will be described below with reference to FIG. 2. FIG. 2 is a cross-section view of the inductive detection type rotary encoder 11.

The inductive detection type rotary encoder 11 includes a stator 13, and a rotor 15 arranged rotatably about the spindle 7 (rotation shaft) and opposite to the stator 13. The rotor 15 is fixed at the end of a cylindrical rotor bush 19. The spindle 7 is inserted into the rotor bush 19. A stator bush 21 is fixed on the frame 3.

A feed screw 23 fit into the nut arranged inside the thimble 5 of FIG. 1 is formed on the surface of the spindle 7. A key groove 25 is cut in the longitudinal direction of the spindle 7 (or in the advance/retract direction of the spindle 7) on the surface of the spindle 7. A tip end of a pin 27 fixed on the rotor bush 19 is fit into the key groove 25. When the spindle 7 rotates, its rotation force is transmitted to the rotor bush 19 via the pin 27 so that the rotor 15 rotates. In other words, the rotor 15 rotates along with the rotation of the spindle 7. Since the pin 27 is not fixed in the key groove 25, the rotor 15 can be rotated without moving along with the spindle 7.

Figure 3A:
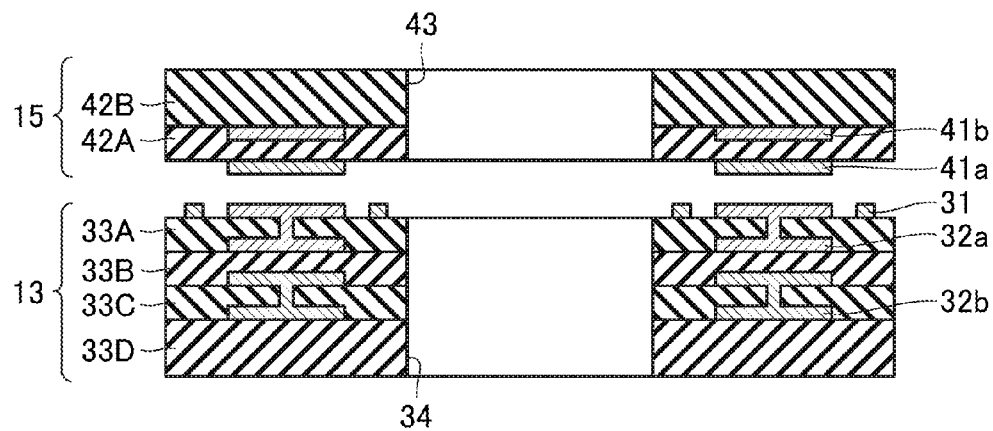
FIGS. 3A and 3B are cross-section views of a stator 13 and a rotor 15 according to the first embodiment.

A structure of the stator 13 and the rotor 15 will be described below with reference to FIG. 3A. FIG. 3A is a cross-section view of the stator 13 and the rotor 15. The stator 13 includes stacked insulative layers 33A to 33D as illustrated in FIG. 3A. The stator 13 includes a transmission wiring 31 and a first reception wiring 32a in the insulative layer 33A on the rotor 15 side, and includes a second reception wiring 32b in the intermediate insulative layer 33C. A through hole 34 for passing the spindle 7 is formed in the insulative layers 33A to 33D, and the transmission wiring 31, the first reception wiring 32a and the second reception wiring 32b are annularly formed about the through hole 34.

On the other hand, the rotor 15 includes stacked insulative layers 42A and 42B as illustrated in FIG. 3A. The rotor 15 includes a first magnetic flux coupler 41a in the insulative layer 42A and includes a second magnetic flux coupler 41b in the insulative layer 42B. A through hole 43 for passing the spindle 7 is formed in the insulative layers 42A and 42B, and the first magnetic flux coupler 41a and the second magnetic flux coupler 41b are annularly formed about the through hole 43.

The transmission wiring 31 flows a drive signal which changes with time, and gives a magnetic field generated by the drive signal to the first and second magnetic flux couplers 41a and 41b formed in the rotor 15. The transmission wiring 31 is provided on the surface of the insulative layer 33A on the rotor 15 side.

The first and second magnetic flux couplers 41a and 41b respectively generate an inductive current based on the magnetic field generated by the drive signal flowing through the transmission wiring 31. The first magnetic flux coupler 41a is provided on the surface of the insulative layer 42A on the stator 13 side. The second magnetic flux coupler 41b is provided on the surface of the insulative layer 42B on the stator 13 side. The first and second magnetic flux couplers 41a and 41b are stacked one above the other in the stack direction via the insulative layer 42A.

When an inductive current is generated in the first magnetic flux coupler 41a due to magnetic flux coupling between the transmission wiring 31 and the first magnetic flux coupler 41a, the first reception wiring 32a detects an inductive voltage generated by the magnetic flux coupling. When an inductive current is generated in the second magnetic flux coupler 41b due to magnetic flux coupling between the transmission wiring 31 and the second magnetic flux coupler 41b, the second reception wiring 32b detects an inductive voltage generated by the magnetic flux coupling.

Part of the first reception wiring 32a is formed on the surface of the insulative layer 33A on the rotor 15 side, the rest of the first reception wiring 32a is formed on the surface of the insulative layer 33B on the rotor 15 side, and both are mutually connected via a through hole or via penetrating the insulative layer 33A. Part of the second reception wiring 32b is formed on the surface of the insulative layer 33C on the rotor 15 side, the rest of the second reception wiring 32b is formed on the surface of the insulative layer 33D on the rotor 15 side, and both are mutually connected via a through hole or via penetrating the insulative layer 33C. The first reception wiring 32a and the second reception wiring 32b are stacked one above the other in the stack direction via the insulative layer 33B.

In FIG. 3A, the first reception wiring 32a opposes the first magnetic flux coupler 41a. The first reception wiring 32a and the first magnetic flux coupler 41a are arranged between the second reception wiring 32b and the second magnetic flux coupler 41b. The arrangement enables a signal intensity received by the first reception wiring 32a to be increased. When a reception signal of the first reception wiring 32a influences a measurement accuracy, the arrangement is preferable.

Figure 3B:
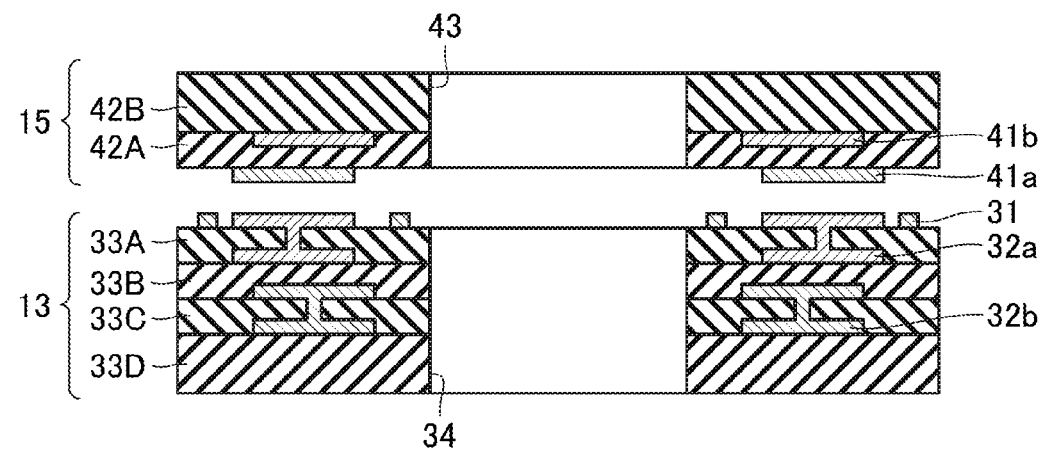

In the example illustrated in FIG. 3A, the first and second reception wirings 32a, 32b have the same diameter, and the first and second magnetic flux couplers 41a and 41b have the same diameter. However, it is only required that the diameter of the first reception wirings 32a is equal to the diameter of the first magnetic flux couplers 41a, and the diameter of the second reception wirings 32b is equal to the diameter of the second magnetic flux couplers 41b. Therefore, the first and second reception wirings 32a, 32b may have the different diameter, and the first and second magnetic flux couplers 41a and 41b may have the different diameter. For example, as shown in FIG. 3B, the diameter of the first reception wiring 32a may be larger than the diameter of the second reception wiring 32b, and the diameter of the magnetic flux coupler 41a may be larger than the diameter of the second magnetic flux coupler 41b.

A planar shape of the transmission wiring 31, the first reception wiring 32a, the second reception wiring 32b, the first magnetic flux coupler 41a and the second magnetic flux coupler 41b will be described below.

Figure 4:
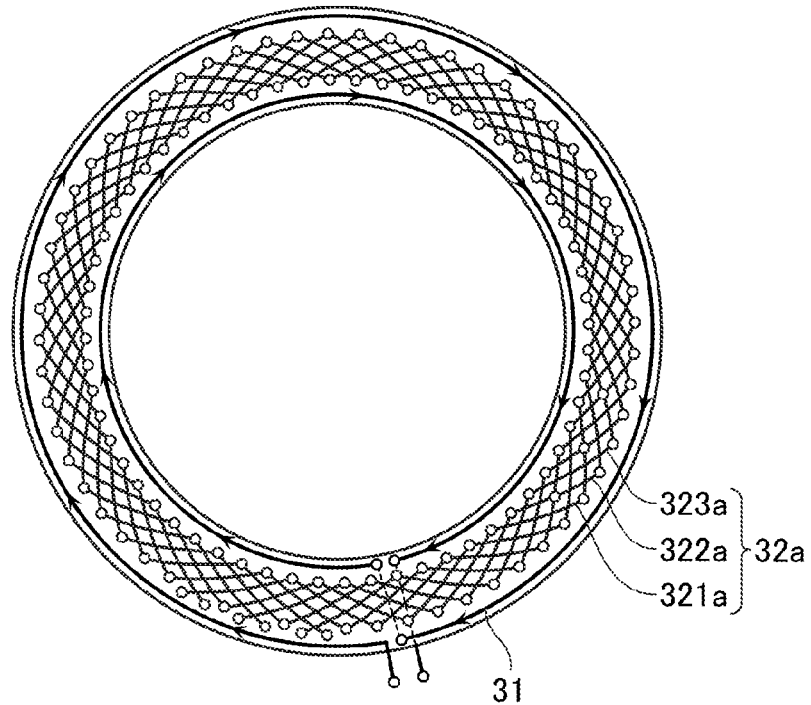
FIG. 4 is a plan view illustrating a transmission wiring 31 and a first reception wiring 32a according to the first embodiment.

FIG. 4 is a plan view illustrating the transmission wiring 31 and the first reception wiring 32a. As illustrated in FIG. 4, the transmission wiring 31 is formed to be coaxial with the spindle 7, and has substantially circular current paths on the outer periphery and inner periphery sides. The transmission wiring 31 is formed such that an orientation of a current flowing through the current path on the outer periphery side of the transmission wiring 31 is the same as an orientation of a current flowing through the current path on the inner periphery side of the transmission wiring 31 (see the arrows).

As illustrated in FIG. 4, the first reception wiring 32a is formed to be coaxial with the spindle 7, and is annularly formed to be positioned between the current paths on the outer periphery and inner periphery sides of the transmission wiring 31. The first reception wiring 32a is formed of three reception wirings 321a to 323a having different phases in the rotation direction. Mutually crossing parts of the reception wirings 321a to 323a are vertically arranged via the insulative layer 33A in order to prevent the crossing parts from short-circuiting, and are mutually connected via the through hole or via hole to be arranged in an insulated and isolated manner.

Figure 5:
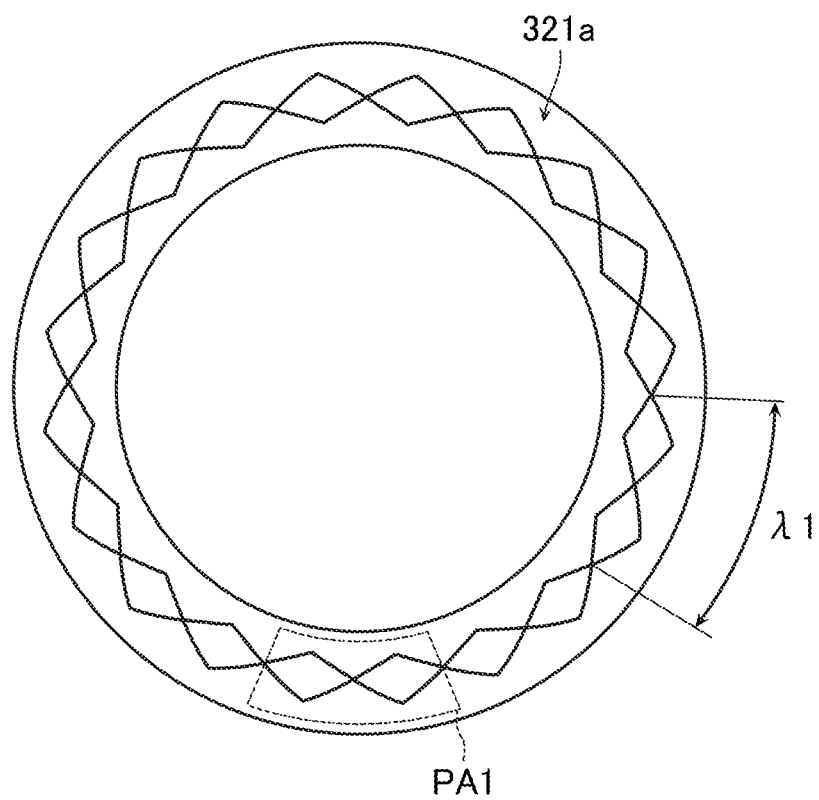
FIG. 5 is a plan view illustrating a reception wiring 321a according to the first embodiment.

A shape of the reception wiring 321a will be described below with reference to FIG. 5. FIG. 5 is a plan view illustrating the reception wiring 321a. The reception wiring 321a has a loop (rhombic) shape periodically changing at a pitch 21 in the rotation direction of the rotor 15. In the example illustrated in FIG. 5, the reception wiring 321a is provided with 10 rhombic pairs PA1. The reception wirings 322a and 323a have the same shape as the reception wiring 321a.

Figure 6:
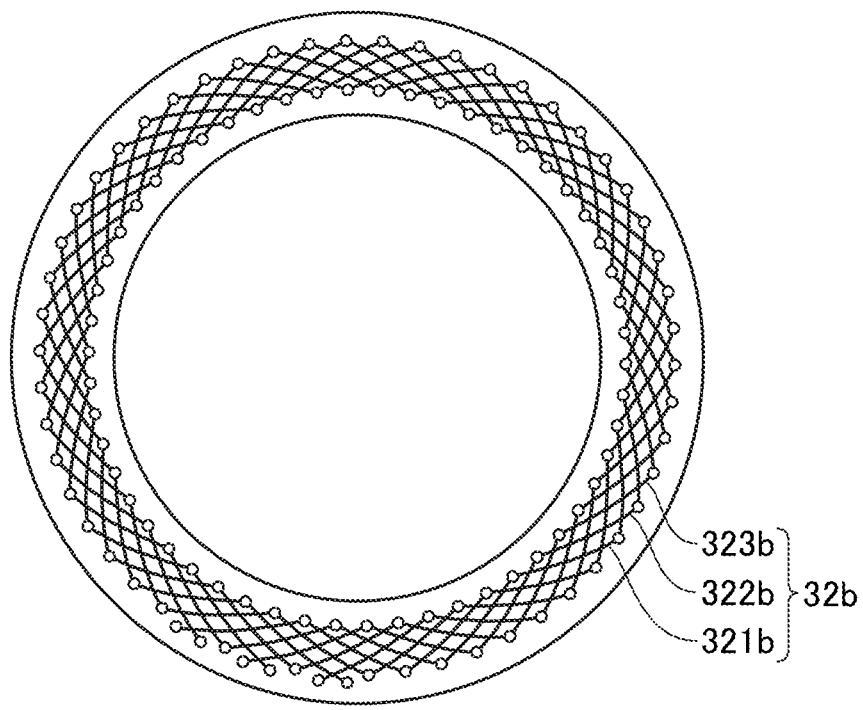
FIG. 6 is a plan view illustrating a second reception wiring 32b according to the first embodiment.

A shape of the second reception wiring 32b will be described below with reference to FIG. 6. FIG. 6 is a plan view illustrating the second reception wiring 32b. As illustrated in FIG. 6, the second reception wiring 32b is formed to be coaxial with the spindle 7 and is annularly formed to be stacked above the first reception wiring 32a in the stack direction. The second reception wiring 32b is formed of three reception wirings 321b to 323b with different phases in the rotation direction. Mutually crossing parts of the reception wirings 321b to 323b are vertically arranged via the insulative layer 33C in order to prevent the crossing parts from short-circuiting, and are mutually connected via a through hole or via hole to be arranged in an insulated and isolated manner.

Figure 7:
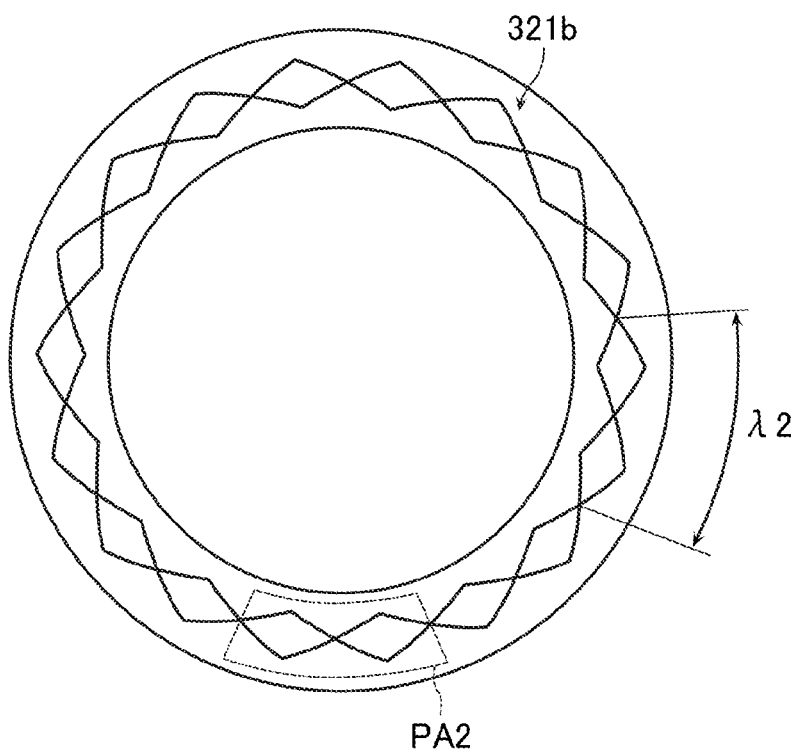
FIG. 7 is a plan view illustrating a reception wiring 321b according to the first embodiment.

A shape of the reception wiring 321b will be described below with reference to FIG. 7. FIG. 7 is a plan view illustrating the reception wiring 321b. As illustrated in FIG. 7, the reception wiring 321b has a loop (rhombic) shape periodically changing in the rotation direction of the rotor 15 at a pitch $\lambda 2$ different from the pitch $\lambda 1$ ($\lambda 2 \neq \lambda 1$). In the example illustrated in FIG. 7, the reception wiring 321b is provided with nine rhombic pairs PA2. In the present embodiment, the pitch $\lambda 1$ is shorter than the pitch $\lambda 2$ ($\lambda 1 < \lambda 2$). The reception wirings 322b and 323b have the same shape as the reception wiring 321b.

Figure 8:
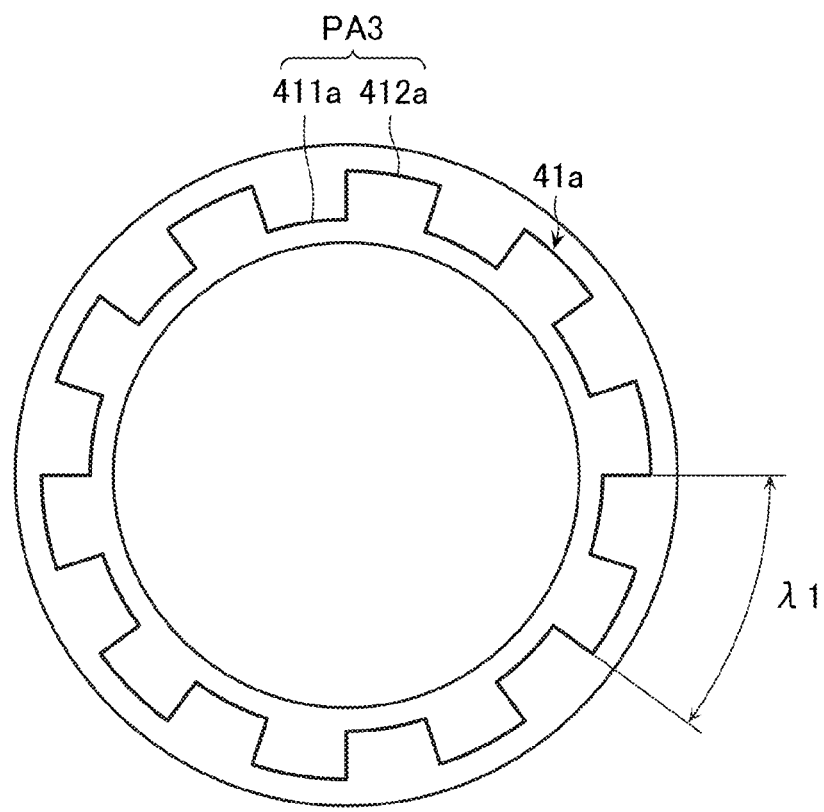
FIG. 8 is a plan view illustrating a first magnetic flux coupler 41a according to the first embodiment.

A shape of the first magnetic flux coupler 41a will be described below with reference to FIG. 8. FIG. 8 is a plan view illustrating the first magnetic flux coupler 41a. The first magnetic flux coupler 41a is formed to be coaxial with the spindle 7 and is formed to be stacked above the first reception wiring 32a via a gap as illustrated in FIG. 8. The first magnetic flux coupler 41a has a continuous toothed shape periodically changing in the rotation direction of the rotor 15 at the same pitch $\lambda 1$ as the first reception wiring 32a. The first magnetic flux coupler 41a alternately configures concave parts 411a sagging toward the spindle 7 and convex parts 412a protruding away from the spindle 7 therein. In the example illustrated in FIG. 8, 10 pairs PA3 of the concave part 411a and the convex part 412a are provided.

Figure 9:
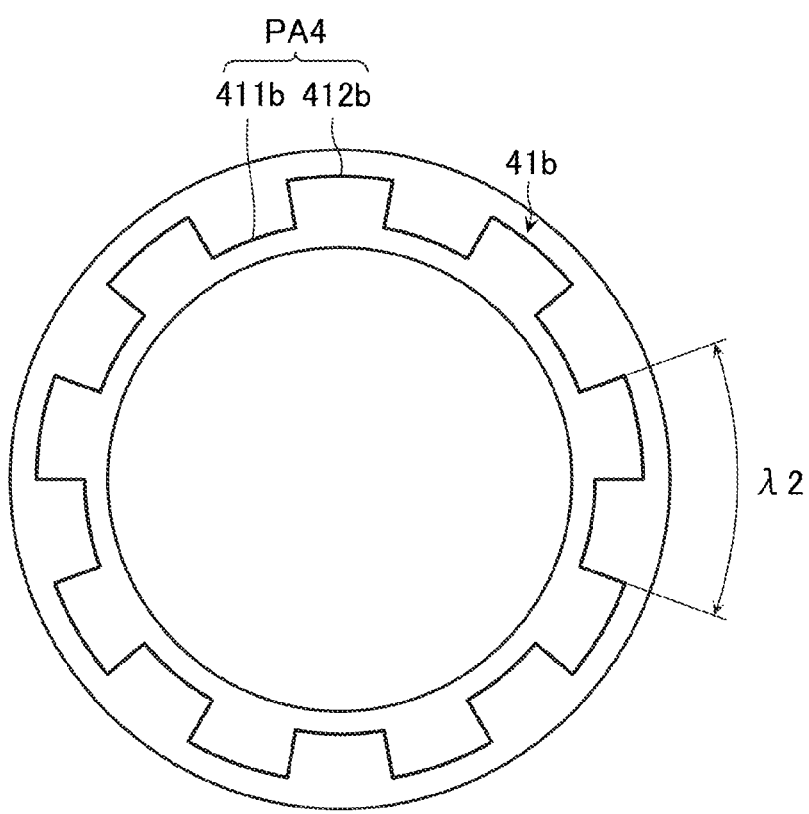
FIG. 9 is a plan view illustrating a second magnetic flux coupler 41b according to the first embodiment.

A shape of the second magnetic flux coupler 41b will be described below with reference to FIG. 9. FIG. 9 is a plan view illustrating the second magnetic flux coupler 41b. The second magnetic flux coupler 41b is formed to be coaxial with the spindle 7 and is formed to be stacked above the first magnetic flux coupler 41a in the stack direction via the insulative layer 42A as illustrated in FIG. 9. The second magnetic flux coupler 41b has a continuous toothed shape periodically changing in the rotation direction of the rotor 15 at the pitch $\lambda 2$. The second magnetic flux coupler 41b alternately configures concave parts 411b sagging toward the spindle 7 and convex parts 412b protruding away from the spindle 7. In the example illustrated in FIG. 9, nine pairs PA4 of the concave part 411b and the convex part 412b are provided.

With the structures illustrated in FIGS. 3 to 9, the first reception wiring 32a and the first magnetic flux coupler 41a form a first track having a shape periodically changing in the rotation direction of the rotor 15 at the pitch $\lambda 1$. The second reception wiring 32b and the second magnetic flux coupler 41b form a second track having a shape periodically changing in the rotation direction of the rotor 15 at the pitch $\lambda 2$ different from the pitch $\lambda 1$. In the present embodiment, since the pitch $\lambda 1$ of the first track is shorter than the pitch $\lambda 2$ of the second track, the first track influences a measurement accuracy more than the second track. Since a signal intensity of the first track at the pitch $\lambda 1$ is further enhanced than a signal intensity of the second track, a higher measurement accuracy can be obtained.

Signals obtained by the first reception wiring 32a and the second reception wiring 32b will be described below with reference to FIG. 10. When currents flow through the current paths on the outer periphery and inner periphery sides of the transmission wiring 31 clockwise as illustrated in FIG. 4, for example, magnetic fields are generated in the current paths in the right screw direction, and thus the magnetic fields combine with the first and second magnetic flux couplers 41a and 41b so that currents flow through the first and second magnetic flux couplers 41a and 41b counterclockwise. Thereby, magnetic fields travelling from the top surface to the back surface of FIGS. 8 and 9 are generated in the concave parts 411a and 411b of the first and second magnetic flux couplers 41a and 41b, and magnetic fields travelling from the back surface to the top surface of the sheet are generated in the convex parts 412a and 412b. The magnetic fields are received by the first and second reception wirings 32a and 32b. In the first reception wiring 32a, not only the magnetic field of the first magnetic flux coupler 41a but also the magnetic field of the second magnetic flux coupler 41b are combined. However, since the circumferential length of the first magnetic flux coupler 41a is pitch $\lambda 1 \times 10$ while the circumferential length of the second magnetic flux coupler 41b is pitch $\lambda 2 \times 9$. Therefore, an impact of the magnetic field from the second magnetic flux coupler 41b is compensated in the total circumference and an impact of the magnetic field coupled to the first reception wiring 32a is caused by only the magnetic field from the first magnetic flux coupler 41a. Thereby, the first reception wiring 32a can obtain a reception signal determined by only a coupling phase with the first magnetic flux coupler 41a. Similarly, the second reception wiring 32b can obtain a reception signal determined by only a coupling phase with the second magnetic flux coupler 41b. In this way, inductive voltages caused by the second magnetic flux coupler 41b are mutually cancelled in the first reception wiring 32a due to the different pitches λ1 and λ2, and thus their signals are not detected. That is, the first reception wiring 32a can restrict crosstalk from the second magnetic flux coupler 41b and the second reception wiring 32b can restrict crosstalk from the first magnetic flux coupler 41a.

Figure 10:
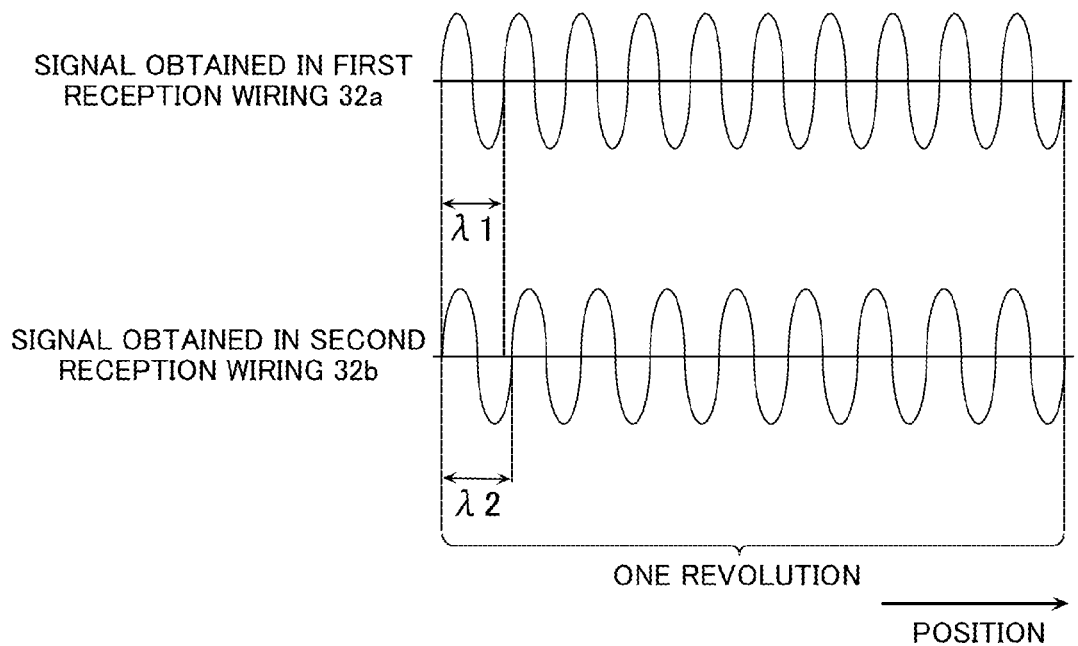
FIG. 10 is a diagram illustrating signals obtained by the first and second reception wirings 32a and 32b according to the first embodiment.

Consequently, as illustrated in FIG. 10, reception signals changing depending on a position of the rotor 15 relative to the stator 13 can be obtained from the first reception wiring 32a and the second reception wiring 32b. Both the reception signals are offset by one circumference during one revolution of the rotor 15, and thus an absolute position in one revolution can be detected from the two reception signals. FIG. 10 illustrates only one phase of signal, but three phases of reception signals mutually offset by 120° are actually obtained.

According to the present embodiment, the first and second reception wirings 32a and 32b are stacked via the insulative layers in the longitudinal direction of the spindle 7 and the first and second magnetic flux couplers 41a and 41b can be also stacked via the insulative layers in the longitudinal direction of the spindle 7, thereby reducing the outer diameter of the encoder. Additionally, crosstalk cannot be generated.

Second Embodiment

Figure 11A:
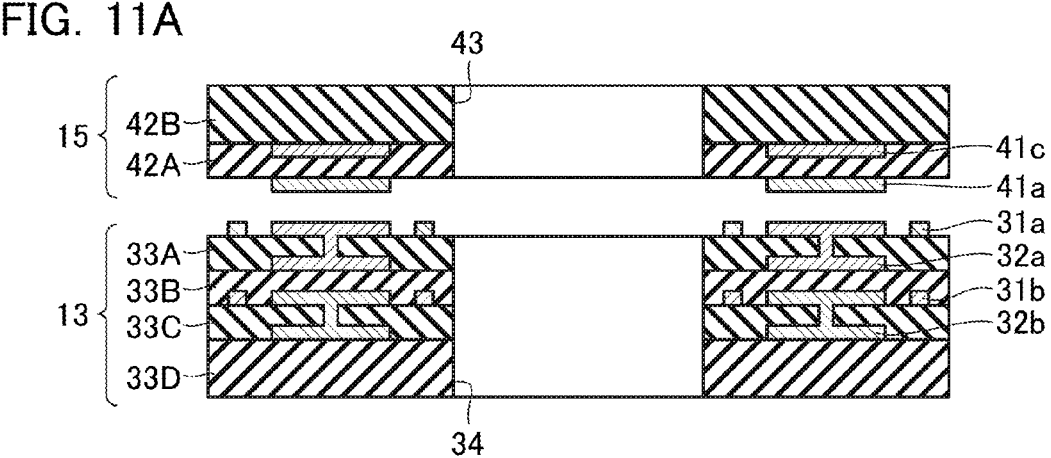
FIGS. 11A and 11B are cross-section views illustrating the stator 13 and the rotor 15 according to a second embodiment.

The stator 13 and the rotor 15 according to a second embodiment will be described below with reference to FIG. 11A. FIG. 11A is a cross-section view illustrating the stator 13 and the rotor 15 according to the second embodiment. The stator 13 according to the second embodiment includes a first transmission wiring 31a and a second transmission wiring 31b as illustrated in FIG. 11A. The second embodiment is different in that from the first embodiment having only one transmission wiring 31. A second magnetic flux coupler 41c provided in the rotor 15 has a different shape from the first embodiment. Additionally, the first and second reception wirings 32a, 32b, the first magnetic flux coupler 41a and the like according to the second embodiment are the same as those in the first embodiment, and thus an explanation thereof will be omitted.

The first transmission wiring 31a flows a drive signal which changes with time, and gives a magnetic field generated by the drive signal to the first magnetic flux coupler 41a. The second transmission wiring 31b flows a drive signal which changes with time, and gives a magnetic field generated by the drive signal to the second magnetic flux coupler 41c. A current is supplied to the first and second transmission wirings 31a and 31b at different timings.

The first transmission wiring 31a is formed on the surface of the insulative layer 33A on the rotor 15 side as illustrated in FIG. 11A. The second transmission wiring 31b is formed on the surface of the insulative layer 33C on the rotor 15 side.

Figure 11B:
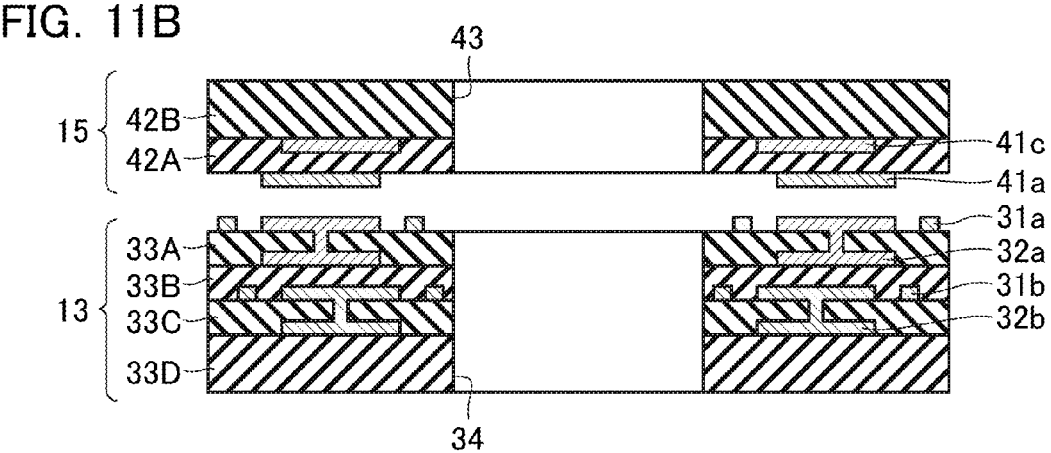

In the example illustrated in FIG. 11A, the first and second reception wirings 32a, 32b have the same diameter, and the first and second magnetic flux couplers 41a and 41b have the same diameter. However, it is only required that the diameter of the first reception wirings 32a is equal to the diameter of the first magnetic flux couplers 41a, and the diameter of the second reception wirings 32b is equal to the diameter of the second magnetic flux couplers 41b. Therefore, the first and second reception wirings 32a, 32b may have the different diameter, and the first and second magnetic flux couplers 41a and 41b may have the different diameter. For example, as shown in FIG. 11B, the diameter of the first reception wiring 32a may be larger than the diameter of the second reception wiring 32b, and the diameter of the magnetic flux coupler 41a may be larger than the diameter of the second magnetic flux coupler 41b.

Figure 12:
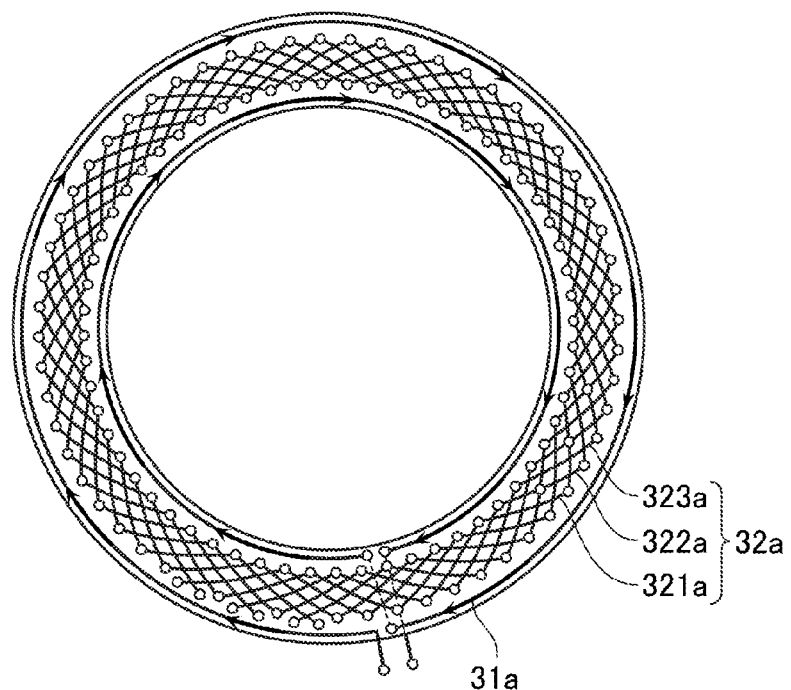
FIG. 12 is a plan view illustrating a first transmission wiring 31a and the first reception wiring 32a according to the second embodiment.

A shape of the first transmission wiring 31a will be described below with reference to FIG. 12. FIG. 12 is a plan view illustrating the first transmission wiring 31a and the first reception wiring 32a. The first transmission wiring 31a is formed to be coaxial with the spindle 7 and has substantially circular current paths on the outer periphery and inner periphery sides as illustrated in FIG. 12. The first transmission wiring 31a is formed such that an orientation of a current flowing through the current path on the outer periphery side of the first transmission wiring 31a is the same as an orientation of a current flowing through the current path on the inner periphery side of the first transmission wiring 31a (see the arrows). The first reception wiring 32a is arranged between the current paths on the outer periphery and inner periphery sides of the first transmission wiring 31a.

Figure 13:
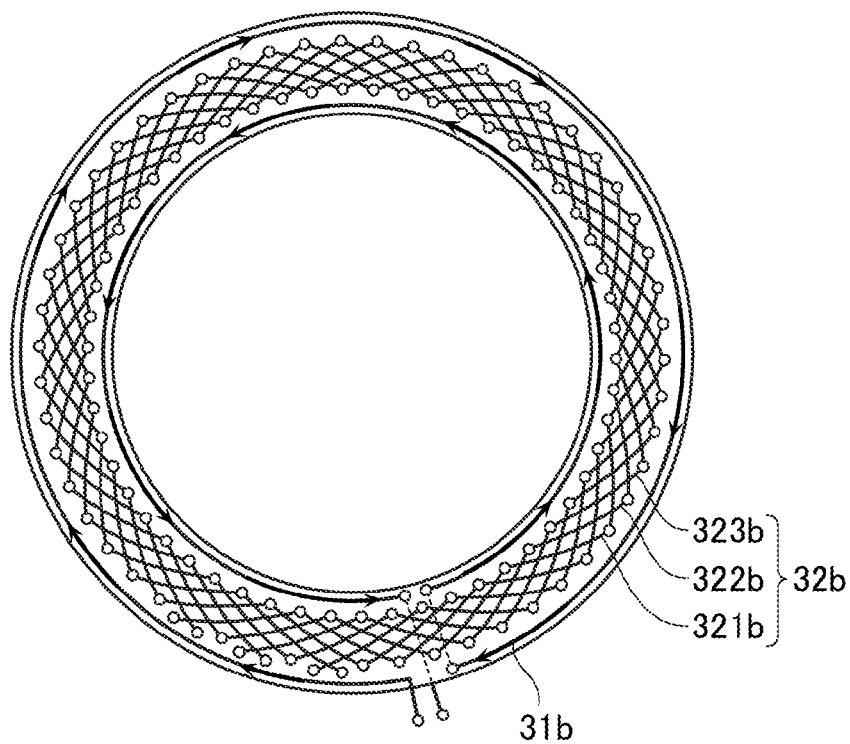
FIG. 13 is a plan view illustrating a second transmission wiring 31b and the second reception wiring 32b according to the second embodiment.

A shape of the second transmission wiring 31b will be described below with reference to FIG. 13. FIG. 13 is a plan view illustrating the second transmission wiring 31b and the second reception wiring 32b. The second transmission wiring 31b is formed to be coaxial with the spindle 7 and has substantially circular current paths on the outer periphery and inner periphery sides as illustrated in FIG. 13. The second transmission wiring 31b is formed such that an orientation of a current flowing through the current path on the outer periphery side of the second transmission wiring 31b is reverse to an orientation of a current flowing through the current path on the inner periphery side of the second transmission wiring 31b (see the arrows). The second reception wiring 32b is arranged between the current paths on the outer periphery and inner periphery sides of the second transmission wiring 31b.

Figure 14:
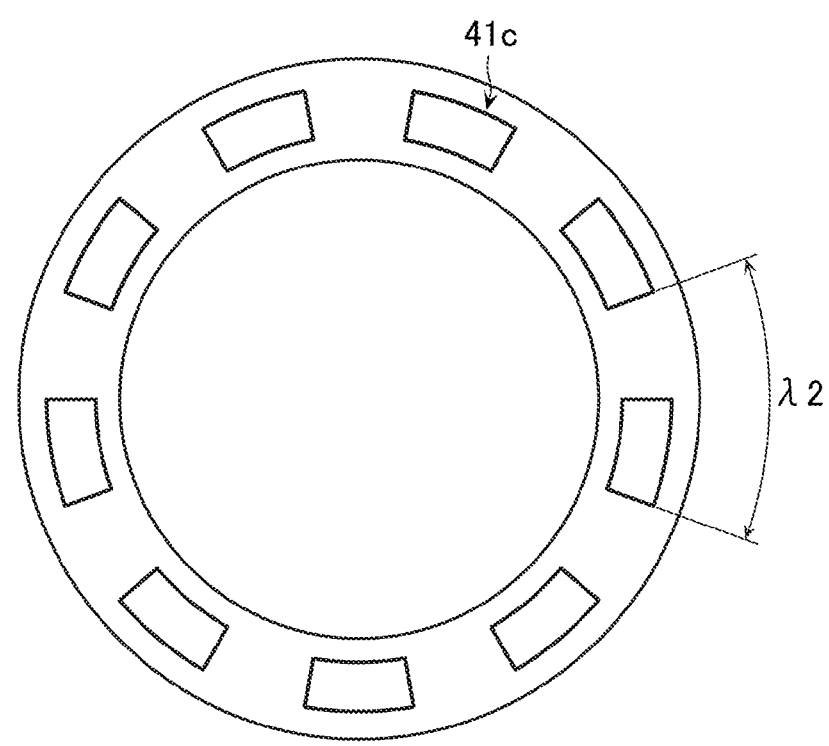
FIG. 14 is a plan view illustrating a second magnetic flux coupler 41c according to the second embodiment.

A shape of the second magnetic flux coupler 41c will be described below with reference to FIG. 14. FIG. 14 is a plan view illustrating the second magnetic flux coupler 41c. The second magnetic flux coupler 41c is formed to be coaxial with the spindle 7 and is formed in an islands shape like a plurality of independent rectangular loops arranged at the constant pitch λ2 in the rotation direction of the rotor 15 as illustrated in FIG. 14. In an example illustrated in FIG. 14, nine second magnetic flux couplers 41c are provided. The shape of the first magnetic flux coupler 41a according to the second embodiment is the same as that according to the first embodiment, and thus an explanation thereof will be omitted.

Figure 15:
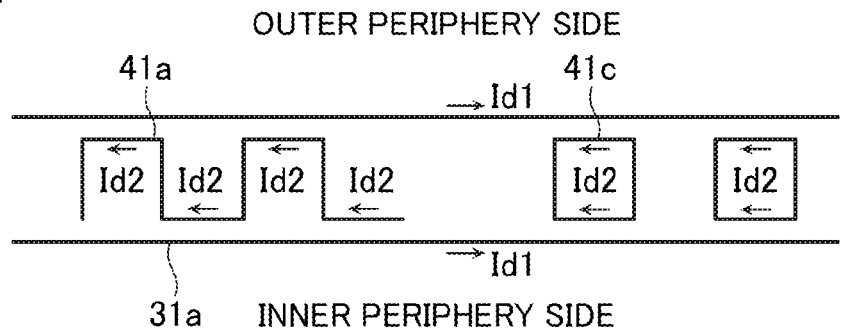
FIG. 15 is a schematic diagram illustrating inductive currents generated in the first and second magnetic flux couplers 41a and 41c by a current Id1 flowing through the first transmission wiring 31a according to the second embodiment.

Inductive currents generated in the first and second magnetic flux couplers 41a and 41c due to a current Id1 flowing through the first transmission wiring 31a will be described below with reference to FIG. 15. In an example illustrated in FIG. 15, the current Id1 flows clockwise in the current path on the outer periphery side of the first transmission wiring 31a. In this case, the current Id1 flows clockwise also in the current path on the inner periphery side of the first transmission wiring 31a. Thereby, inductive currents Id2 flow counterclockwise in the current paths on the outer periphery and inner periphery sides of the first and second magnetic flux couplers 41a and 41c, respectively. Thus, inductive currents are generated in the total current paths of the first magnetic flux coupler 41a due to its shape. On the other hand, the inductive currents Id2 flowing through the current paths on the outer periphery and inner periphery sides of the second magnetic flux coupler 41c are mutually substantially cancelled due to its shape, and thus no inductive current is substantially generated in the total current paths of the second magnetic flux coupler 41c.

Figure 16:
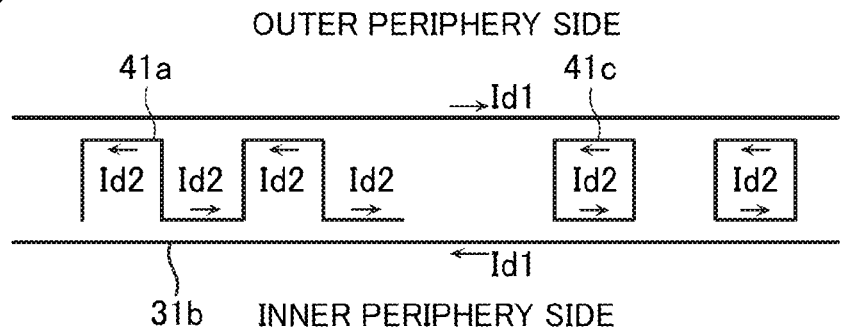
FIG. 16 is a schematic diagram illustrating inductive currents generated in the first and second magnetic flux couplers 41a and 41c by a current Id1 flowing through the second transmission wiring 31b according to the second embodiment.

Inductive currents generated in the first and second magnetic flux couplers 41a and 41c due to the current Id1 flowing through the second transmission wiring 31b will be described below with reference to FIG. 16. In the example illustrated in FIG. 16, the current Id1 flows clockwise in the current path on the outer periphery side of the second transmission wiring 31b. In this case, the current Id1 flows counterclockwise in the current path on the inner periphery side of the second transmission wiring 31b. Thereby, the inductive currents Id2 flow counterclockwise in the current paths on the outer periphery sides of the first and second magnetic flux couplers 41a and 41c, and the inductive currents Id2 flow clockwise in the current paths on the inner periphery sides of the first and second magnetic flux couplers 41a and 41c. Thus, the inductive currents Id2 flowing through the current paths on the outer periphery and inner periphery sides of the first magnetic flux coupler 41a are mutually substantially cancelled due to its shape, and thus no inductive current is substantially generated in the total current paths of the first magnetic flux coupler 41a. On the other hand, inductive currents are generated in the total current paths of the second magnetic flux coupler 41c due to its shape.

In the first embodiment, if the arrangements (such as alignment, axial eccentricity and tilt) of the stator and the rotor are not accurately made, crosstalk occurs thereby to deteriorate a measurement accuracy. On the other hand, in the second embodiment, as illustrated in FIGS. 15 and 16, generation of inductive current is suppressed in the second magnetic flux coupler 41c due to the current Id1 flowing through the first transmission wiring 31a, and generation of inductive current is suppressed in the first magnetic flux coupler 41a due to the current Id1 flowing through the second transmission wiring 31b. That is, in the second embodiment, even if the arrangements of the stator and rotor are not accurately matched, a current is alternately flowed in the first transmission wiring 31a and the second transmission wiring 31b so that crosstalk is further restricted than in the first embodiment, thereby enhancing a measurement accuracy. The second embodiment obtains the same advantages as the first embodiment.

Third Embodiment

An inductive detection type rotary encoder according to a third embodiment will be described below. The third embodiment is different from the second embodiment in that the first and second transmission wirings 31a and 31b are replaced with one transmission wiring 31c and an orientation of a current flow is switched. The transmission wiring 31c is directed for flowing a drive signal which changes with time, and for giving a magnetic field generated by the drive signal to the first and second magnetic flux couplers 41a and 41c. Additionally, the third embodiment has the same structure as the second embodiment. Thus, only the transmission wiring 31c and its peripheral circuits according to the third embodiment will be described below with reference to FIGS. 17A to 17C.

Figure 17A:
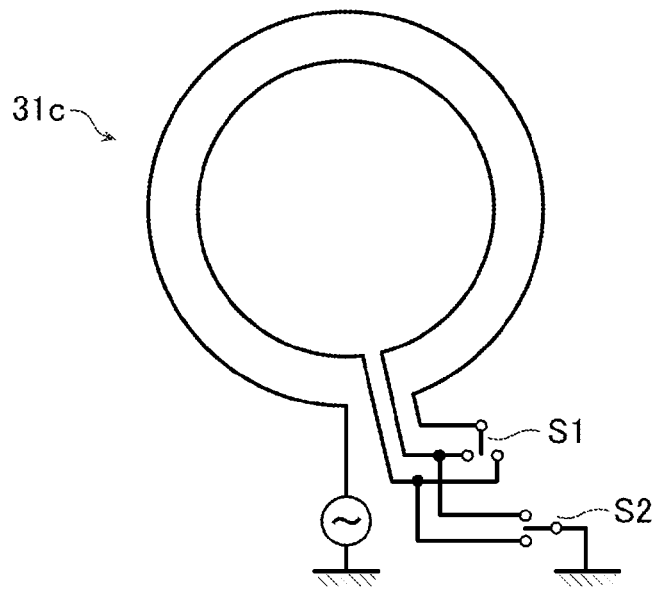
FIGS. 17A to 17C are schematic diagrams illustrating a transmission wiring 31c according to a third embodiment.
Figure 17B:
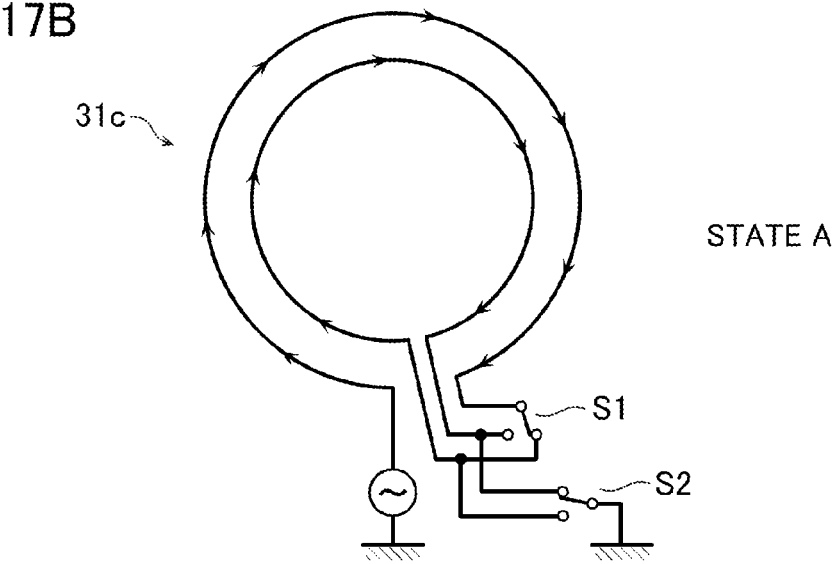
Figure 17C:
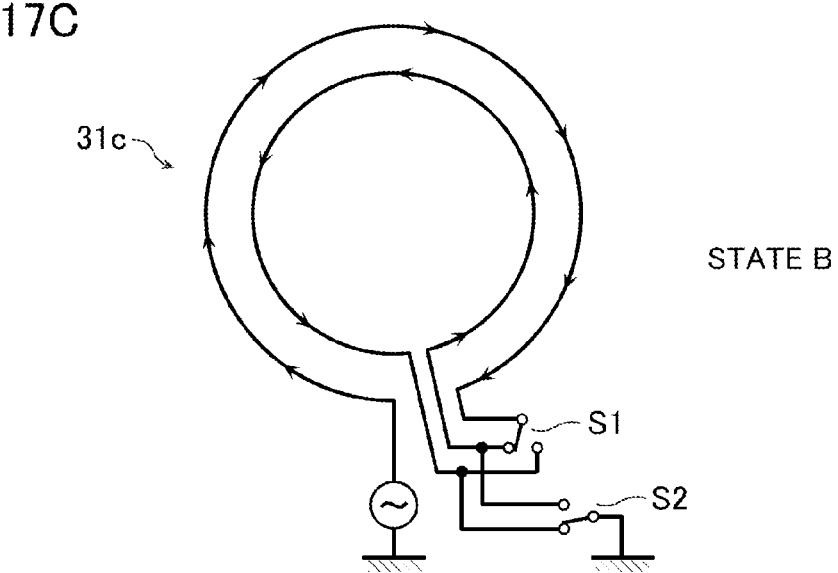

The rotary encoder according to the present embodiment includes switches S1 and S2 for inverting an orientation of a current flowing through a current path on the inner periphery side of the transmission wiring 31c as illustrated in FIG. 17A. The switches S1 and S2 are switched so that the transmission wiring 31c can be set in state A illustrated in FIG. 17B and in state B illustrated in FIG. 17C. In the state A illustrated in FIG. 17B, an orientation of a current flowing through the path on the outer periphery side of the transmission wiring 31c is the same as an orientation of a current flowing through the path on the inner periphery side of the transmission wiring 31c (see the arrows). In the state B illustrated in FIG. 17C, the orientation of the current flowing through the path on the outer periphery side of the transmission wiring 31c is reverse to the orientation of the current flowing through the path on the inner periphery side of the transmission wiring 31c (see the arrows). The transmission wiring 31c arranges therein the first and second reception wirings 32a and 32b between the current paths on the inner periphery and outer periphery sides like the transmission wiring 31 according to the first embodiment. The first and second transmission wirings 31a and 31b according to the second embodiment are provided on the surfaces of the insulative layers 33A and 33C on the rotor 15 side, respectively, while the current paths on the inner periphery and outer periphery sides of the transmission wiring 31c according to the third embodiment are provided only on the surface of the insulative layer 33A on the rotor 15 side in order to obtain a higher signal intensity.

From the above, the third embodiment obtains the same advantages as the second embodiment. Since the third embodiment has only one transmission wiring 31c, the structure of the wiring and its surroundings can be more simplified than the second embodiment including the two transmission wirings 31a and 31b. The current paths on the inner periphery and outer periphery sides of the transmission wiring 31c may be provided only on the surface of the insulative layer 33C on the rotor 15 side. Further, the current path on the inner periphery side of the transmission wiring 31c may be provided on the surface of the insulative layer 33A on the rotor 15 side and the current path on the outer periphery side of the transmission wiring 31c may be provided on the surface of the insulative layer 33C on the rotor 15 side. Alternatively, the current path on the outer periphery side of the transmission wiring 31c may be provided on the surface of the insulative layer 33A on the rotor 15 side and the current path on the inner periphery side of the transmission wiring 31c may be provided on the surface of the insulative layer 33C on the rotor 15 side.

Fourth Embodiment

Figure 18A:
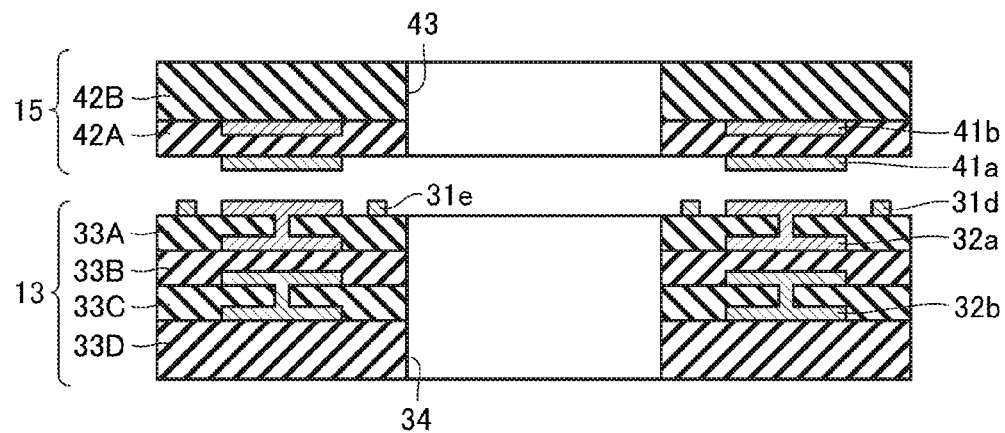
FIGS. 18A and 18B are cross-section views of the stator 13 and the rotor 15 according to a fourth embodiment.
Figure 19:
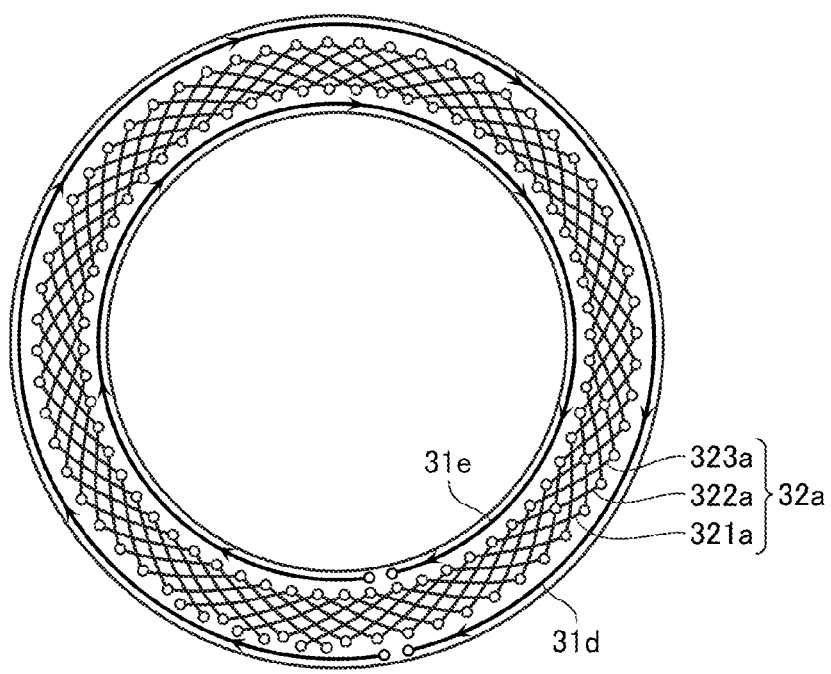
FIG. 19 is a plan view illustrating the first transmission wiring 31a, the second transmission wiring 31b and the first reception wiring 32a according to the fourth embodiment.

An inductive detection type rotary encoder according to a fourth embodiment will be described below. The fourth embodiment is different from the first embodiment in the shapes of the transmission wirings and the magnetic flux couplers. The transmission wirings according to the fourth embodiment will be first described with reference to FIGS. 18A and 19. FIG. 18A is a cross-section view of the stator 13 and the rotor 15 according to the fourth embodiment. FIG. 19 is a plan view illustrating first and second transmission wirings 31d, 31e and the first reception wiring 32a according to the fourth embodiment. Other constituents according to the fourth embodiment are the same as those in the first embodiment and an explanation thereof will be omitted.

In the fourth embodiment, the electrically-isolated first and second transmission wirings 31d and 31e are provided on the insulative layer 33A as illustrated in FIGS. 18A and 19. The first transmission wiring 31d is formed to be coaxial with the spindle 7 and has a substantially circular current path as illustrated in FIGS. 18A and 19. The second transmission wiring 31e is formed to be coaxial with the spindle 7 and on the inner periphery of the first transmission wiring 31d, and has a substantially circular current path.

Figure 18B:
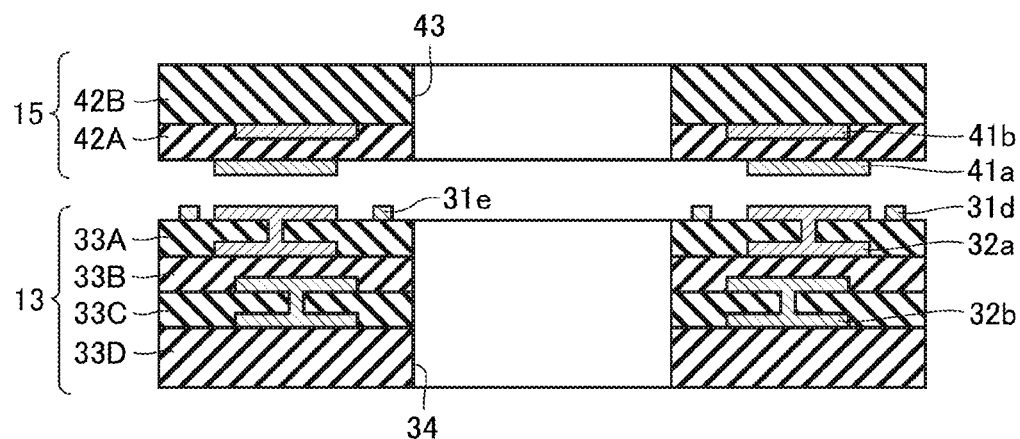

In the example illustrated in FIG. 18A, the first and second reception wirings 32a, 32b have the same diameter, and the first and second magnetic flux couplers 41a and 41b have the same diameter. However, it is only required that the diameter of the first reception wirings 32a is equal to the diameter of the first magnetic flux couplers 41a, and the diameter of the second reception wirings 32b is equal to the diameter of the second magnetic flux couplers 41b. Therefore, the first and second reception wirings 32a, 32b may have the different diameter, and the first and second magnetic flux couplers 41a and 41b may have the different diameter. For example, as shown in FIG. 18B, the diameter of the first reception wiring 32a may be larger than the diameter of the second reception wiring 32b, and the diameter of the magnetic flux coupler 41a may be larger than the diameter of the second magnetic flux coupler 41b.

Figure 20:
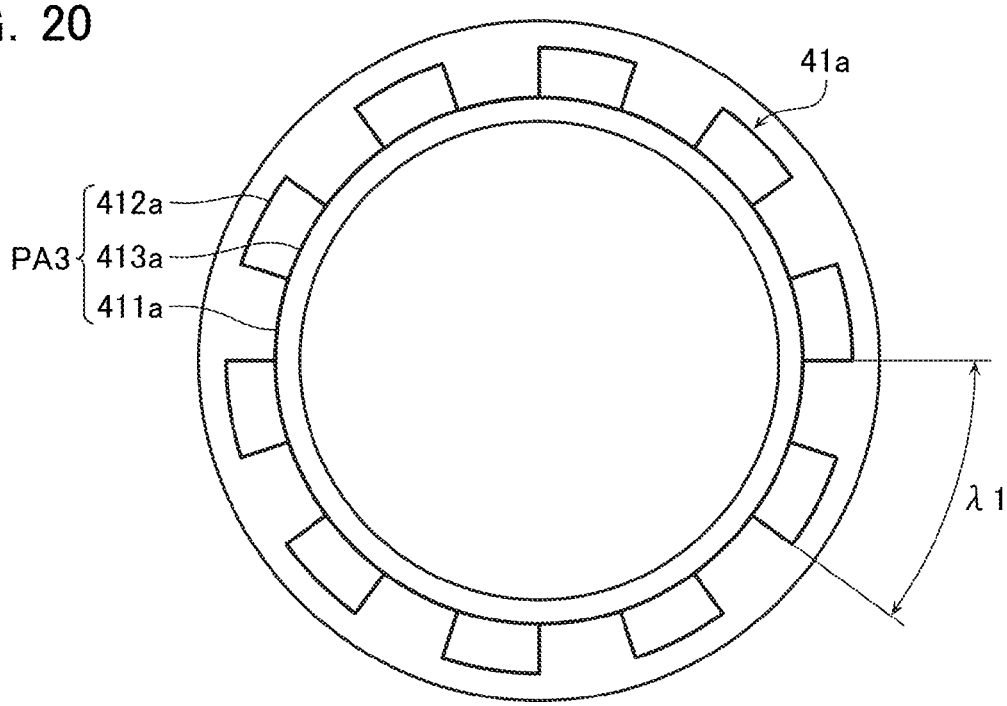
FIG. 20 is a plan view illustrating the first magnetic flux coupler 41a according to the fourth embodiment.

A shape of the first magnetic flux coupler 41a according to the fourth embodiment will be described below with reference to FIG. 20. FIG. 20 is a plan view illustrating the first magnetic flux coupler 41a. The first magnetic flux coupler 41a is formed to be coaxial with the spindle 7 and is formed to be stacked above the first reception wiring 32a via a gap as illustrated in FIG. 20. The first magnetic flux coupler, 41a has a wiring in which a continuous toothed wiring part periodically changing in the rotation direction of the rotor 15 at the same pitch $\lambda 1$ as the first reception wiring 32a and a circular wiring part inscribed in the toothed wiring part are stacked. More specifically, the first magnetic flux coupler 41a alternately configures the concave parts 411a sagging toward the spindle 7 and the convex parts 412a protruding away from the spindle 7. The first magnetic flux coupler 41a includes an annular coupling part 413a for coupling the concave parts 411a. That is, the concave parts 411a and the convex parts 412a form a toothed first current path, and the concave parts 411a and the coupling part 413a form an annular second current path. In an example illustrated in FIG. 20, ten combinations PA3 of the concave part 411a, the convex part 412a and the coupling part 413a are provided.

Figure 21:
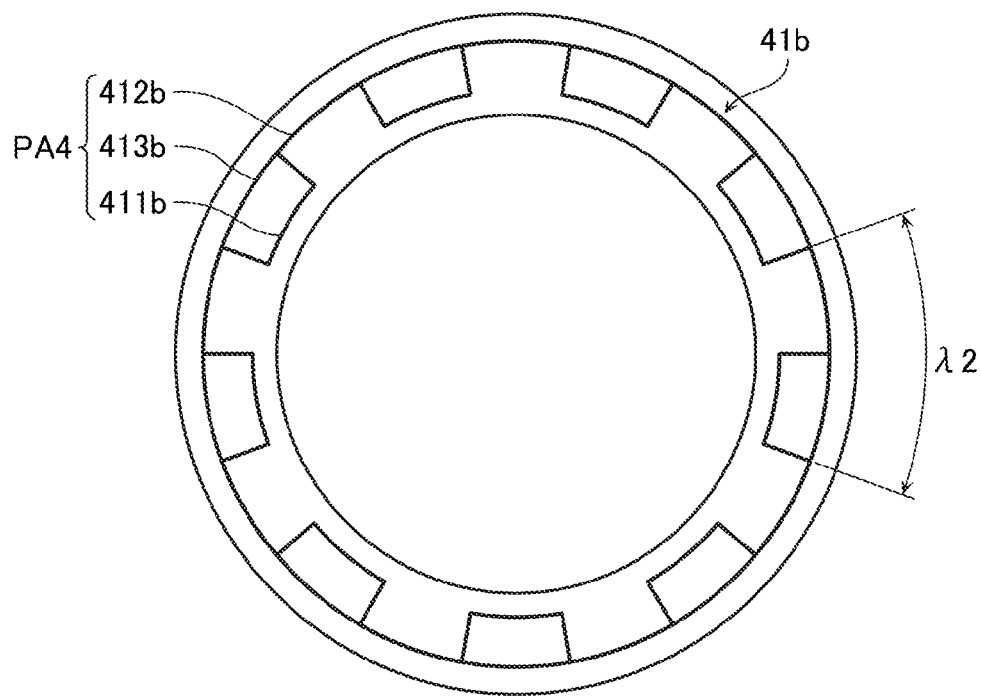
FIG. 21 is a plan view illustrating the second magnetic flux coupler 41b according to the fourth embodiment.

A shape of the second magnetic flux coupler 41b will be described below with reference to FIG. 21. FIG. 21 is a plan view illustrating the second magnetic flux coupler 41b. The second magnetic flux coupler 41b is formed to be coaxial with the spindle 7 and is formed to be stacked above the first magnetic flux coupler 41a via an insulative layer 42A in the stack direction as illustrated in FIG. 21. The second magnetic flux coupler 41b has a wiring in which a continuous toothed wiring part periodically changing in the rotation direction of the rotor 15 at the pitch $\lambda 2$ and a circular wiring part circumscribed to the toothed wiring part are stacked. More specifically, the second magnetic flux coupler 41b alternately configures the concave parts 411b sagging toward the spindle 7 and the convex parts 412b protruding away from the spindle 7. The second magnetic flux coupler 41b includes an annular coupling part 413b for coupling the convex parts 412b. That is, a plurality of the convex parts 412b and the coupling part 413b form an annular third current path, and a plurality of the concave parts 411b and the convex parts 412b form a toothed fourth current path. In an example illustrated in FIG. 21, nine combinations PA4 of the concave part 411b and the convex part 412b are provided.

With the structures illustrated in FIGS. 18A to 21, the first reception wiring 32a and the first magnetic flux coupler 41a form a first track having a shape periodically changing in the rotation direction of the rotor 15 at the pitch $\lambda 1$. The second reception wiring 32b and the second magnetic flux coupler 41b form a second track having a shape periodically changing in the rotation direction of the rotor 15 at the pitch $\lambda 2$ different from the pitch $\lambda 1$. In the present embodiment, the pitch 21 of the first track is shorter than the pitch $\lambda 2$ of the second track, and thus the first track further influences a measurement accuracy than the second track. A signal intensity of the first track at the pitch 21 is further enhanced than a signal intensity of the second track, thereby a high measurement accuracy can be obtained.

Figure 22:
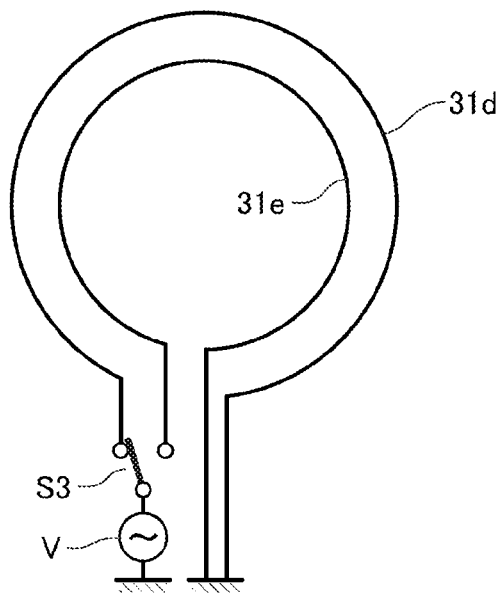
FIG. 22 is a circuit diagram illustrating a unit for supplying currents to the first transmission wiring 31a and the second transmission wiring 31b according to the fourth embodiment.

FIG. 22 illustrates a current supplying unit for supplying currents to the first transmission wiring 31d and the second transmission wiring 31e. The first transmission wiring 31d and the second transmission wiring 31e are both grounded at one ends, and are connected to an AC power supply V via a switch S3 at the other ends. During measurement, a drive signal which changes with time is alternately supplied to the first transmission wiring 31d and the second transmission wiring 31e by switching the switch S3.

[Operations of Inductive Detection Type Rotary Encoder 11 According to Fourth Embodiment]

Figure 23:
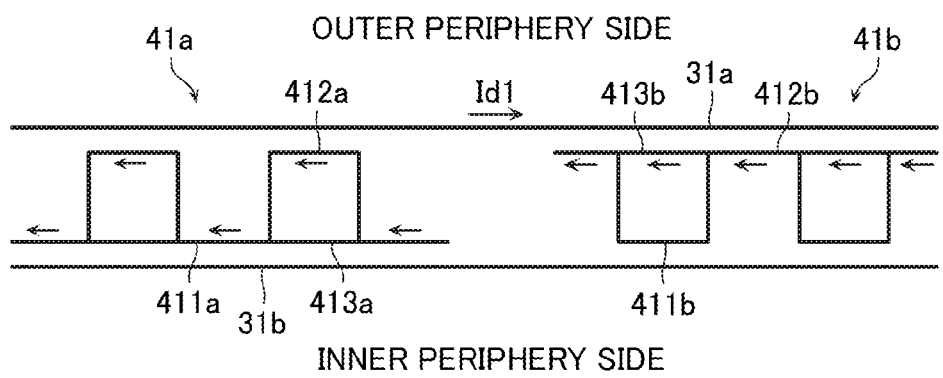
FIG. 23 is a schematic diagram illustrating inductive currents generated in the first and second magnetic flux couplers 41a and 41b by a current flowing through the first transmission wiring 31a according to the fourth embodiment.
Figure 24:
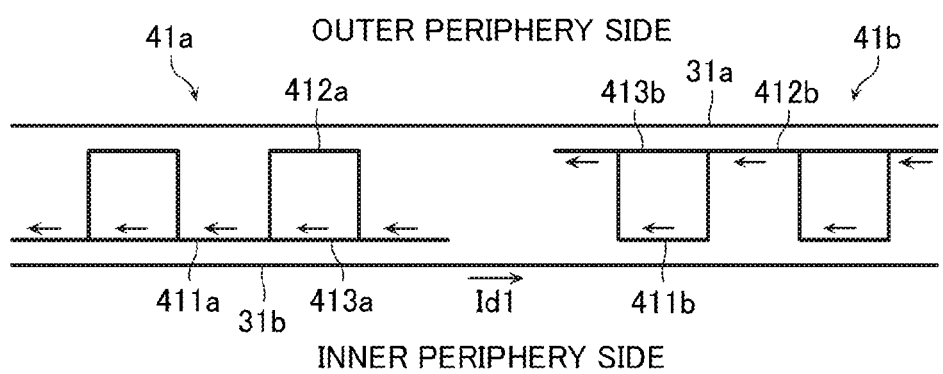
FIG. 24 is a schematic diagram illustrating inductive currents generated in the first and second magnetic flux couplers 41a and 41b by a current flowing through the second transmission wiring 31b according to the fourth embodiment.

Signals obtained by the first reception wiring 32a and the second reception wiring 32b will be described below with reference to FIGS. 23 and 24. As described above, a drive signal which changes with time is flowed through the first transmission wiring 31d and the second transmission wiring 31e alternately or in a time division manner. The signal is received by the first reception wiring 32a when the current is flowed through the first transmission wiring 31d. The signal is received by the second reception wiring 32b when the current is flowed through the second transmission wiring 31e.

A case in which a current is flowed through the first transmission wiring 31d will be described first with reference to FIG. 23. When a current is flowed through the first transmission wiring 31d clockwise, for example, magnetic fields are generated in the right screw direction in the respective current paths, and the magnetic fields are coupled with the first and second magnetic flux couplers 41a and 41b so that currents are flowed counterclockwise through the first and second magnetic flux couplers 41a and 41b.

The currents induced mainly in the convex parts 412a are dominant in the first magnetic flux coupler 41a. Thus, the currents induced in the magnetic flux coupler 41a mainly flow through the toothed first current path formed of the concave parts 411a and the convex parts 412a. Thereby, magnetic fields travelling from the top surface to the back surface of FIG. 23 are generated in the concave parts 411a of the first magnetic flux coupler 41a, magnetic fields travelling from the back surface to the top surface of the sheet are generated in the convex parts 412a, and the magnetic fields form a periodically magnetic pattern at the pitch 21. The magnetic fields are received by the first reception wiring 32a.

In the second magnetic flux coupler 41b, currents are induced in the convex parts 412b and the coupling part 413b and the currents mainly flow through the annular third current path. The current flowing through the toothed fourth current path formed of the concave parts 411b and the convex parts 412b is on the order of one-tenth of the current flowing through the third current path. Thus, the magnetic fields forming a magnetic pattern at the pitch $\lambda 2$ generated in the second magnetic flux coupler 41b are smaller than the magnetic fields forming a magnetic pattern at the pitch $\lambda 1$ generated in the first magnetic flux coupler 41a. Also, the first magnetic flux coupler 41a has a circumferential length of pitch $\lambda 1 \times 10$ while the second magnetic flux coupler 41b has a circumferential length of pitch $\lambda 2 \times 9$. Therefore, an impact of the magnetic field coupled with the first reception wiring 32a is compensated by an impact of the magnetic field from the second magnetic flux coupler 41b in the total circumference as illustrated in FIG. 10. That is, inductive voltages caused by the second magnetic flux couplers 41b are mutually cancelled in the first reception wiring 32a due to the different pitches $\lambda 1$ and λ2, and thus their signals are much small. That is, the first reception wiring 32a can restrict crosstalk from the second magnetic flux coupler 41b.

A case in which a current is flowed through the second transmission wiring 31e will be described below with reference to FIG. 24. When a current is flowed through the second transmission wiring 31e clockwise, for example, currents are flowed through the first and second magnetic flux couplers 41a and 41b counterclockwise like when a current is flowed through the first transmission wiring 31d.

Currents induced in the concave parts 411b are dominant in the second magnetic flux coupler 41b. Thus, the currents mainly flow through the toothed fourth current path formed of the concave parts 411b and the convex parts 412b. Thereby, magnetic fields travelling from the top surface to the back surface of FIG. 24 are generated in the concave parts 411b of the second magnetic flux coupler 41b, magnetic fields travelling from the back surface to the top surface of the sheet are generated in the convex parts 412b, and the magnetic fields form a periodically magnetic pattern at the pitch λ2. The magnetic fields are received by the second reception wiring 32b.

On the other hand, currents are induced in the concave parts 411a and the coupling part 413a in the first magnetic flux coupler 41a and the currents mainly flow through the annular second current path. Thus, as in the above case, the magnetic fields forming the magnetic pattern at the pitch λ1 generated in the first magnetic flux coupler 41a are much smaller than the magnetic fields forming the magnetic pattern at the pitch λ2 generated in the second magnetic flux coupler 41b. Even when some magnetic fields induce a current in the second reception wiring 32b, the currents are mutually cancelled due to a difference in phase between the first magnetic flux coupler 41a and the second reception wiring 32b, thus their detected signals are much small.

From the above, as illustrated in FIG. 10, the reception signals changing depending on a position of the rotor 15 relative to the stator 13 can be obtained from the first reception wiring 32a and the second reception wiring 32b. Both the reception signals are offset by one circumference during one revolution of the rotor 15, and thus an absolute position during one revolution can be detected from the two reception signals. FIG. 10 illustrates only one phase of signal, but three phases of reception signals offset by 120° are actually obtained.

According to the fourth embodiment, the first and second reception wirings 32a and 32b can be stacked via the insulative layers in the longitudinal direction of the spindle 7 and the first and second magnetic flux couplers 41a and 41b can be stacked via the insulative layers in the longitudinal direction of the spindle 7, thereby reducing the outer diameter of the encoder. Additionally, crosstalk cannot be generated.

Fifth Embodiment

Figure 25:
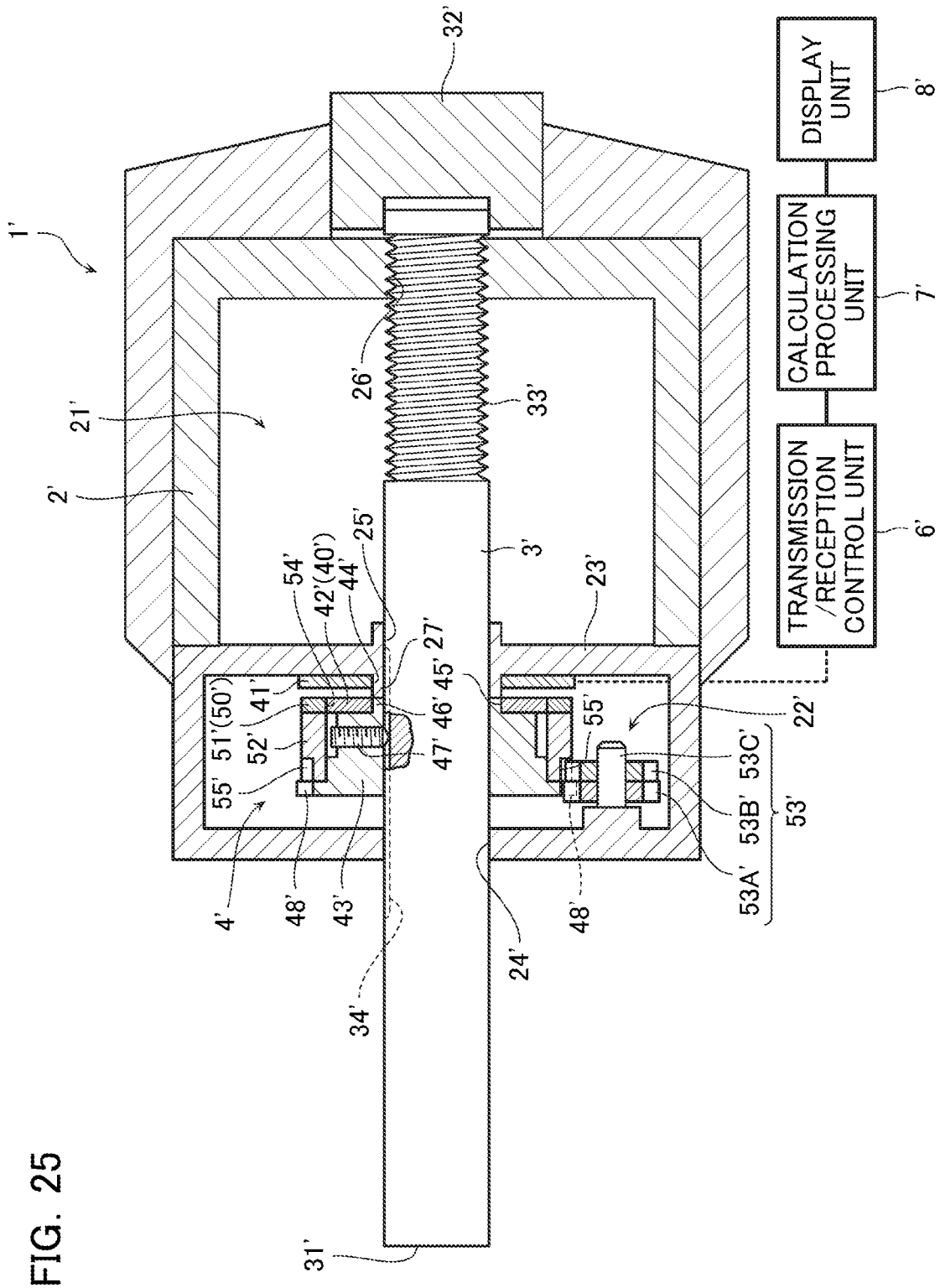
FIG. 25 is a cross-section view illustrating a micrometer head 1' according to a fifth embodiment.

An entire structure of a micrometer head 1' mounting thereon an inductive detection type rotary encoder 4' according to a fifth embodiment will be described below with reference to FIG. 25. FIG. 25 is a cross-section view illustrating the micrometer head 1' according to the fifth embodiment.

The micrometer head 1' includes a main body 2', a spindle 3' extending from the main body 2', and an inductive detection type rotary encoder 4' provided about the spindle 3'. The micrometer head 1' includes a transmission/reception control unit 6', a calculation processing unit 7' and a display unit 8'. The transmission/reception control unit 6' controls transmission/reception to/from the inductive detection type rotary encoder 4'. The calculation processing unit 7' performs calculation processing in response to a signal from the transmission/reception control unit 6' (the inductive detection type rotary encoder 4'). The display unit 8' displays calculation results by the calculation processing unit 7'.

The main body 2' is formed to be substantially cylindrical, and comprises housing spaces 21' and 22' therein. The housing spaces 21' and 22' are partitioned by a partitioning plate 23'. Through holes 24' and 25' through which the spindle 3' penetrates are formed in the wall of the spindle tip end (left side in the figure) of the substantially-cylindrical main body 2' and the partitioning plate 23', and a female screw 26' is formed at the end of the main body 2' (right side in the figure) on the base end side. The through holes 24', 25' and the female screw 26' are concentrically arranged.

The spindle 3' is formed in a substantially columnar shape, and includes a contact face 31' with an object to be measured (not illustrated) at the tip end, and a knob part 32' at the base end. The knob part 32' is directed for rotating the spindle 3' from the outside. The spindle 3' is inserted into the through holes 24' and 25' in the main body 2', and both ends thereof are protruded from the main body 2'. A feed screw 33' is formed on the outer periphery of the spindle 3' and is threaded with a female screw 26' of the main body 2'. In this way, when the knob part 32' is rotated, the feed screw 33' and the female screw 26' are threaded with each other so that the spindle 3' advances or retracts along the through holes 24' and 25'. The feed screw 33' is formed for 40 revolutions at a pitch of 0.5 mm, and can advance or retract the spindle 3' by 20 mm. A linear key groove 34' is formed in the shaft direction at the substantially center part of the spindle 3'.

Figure 26:
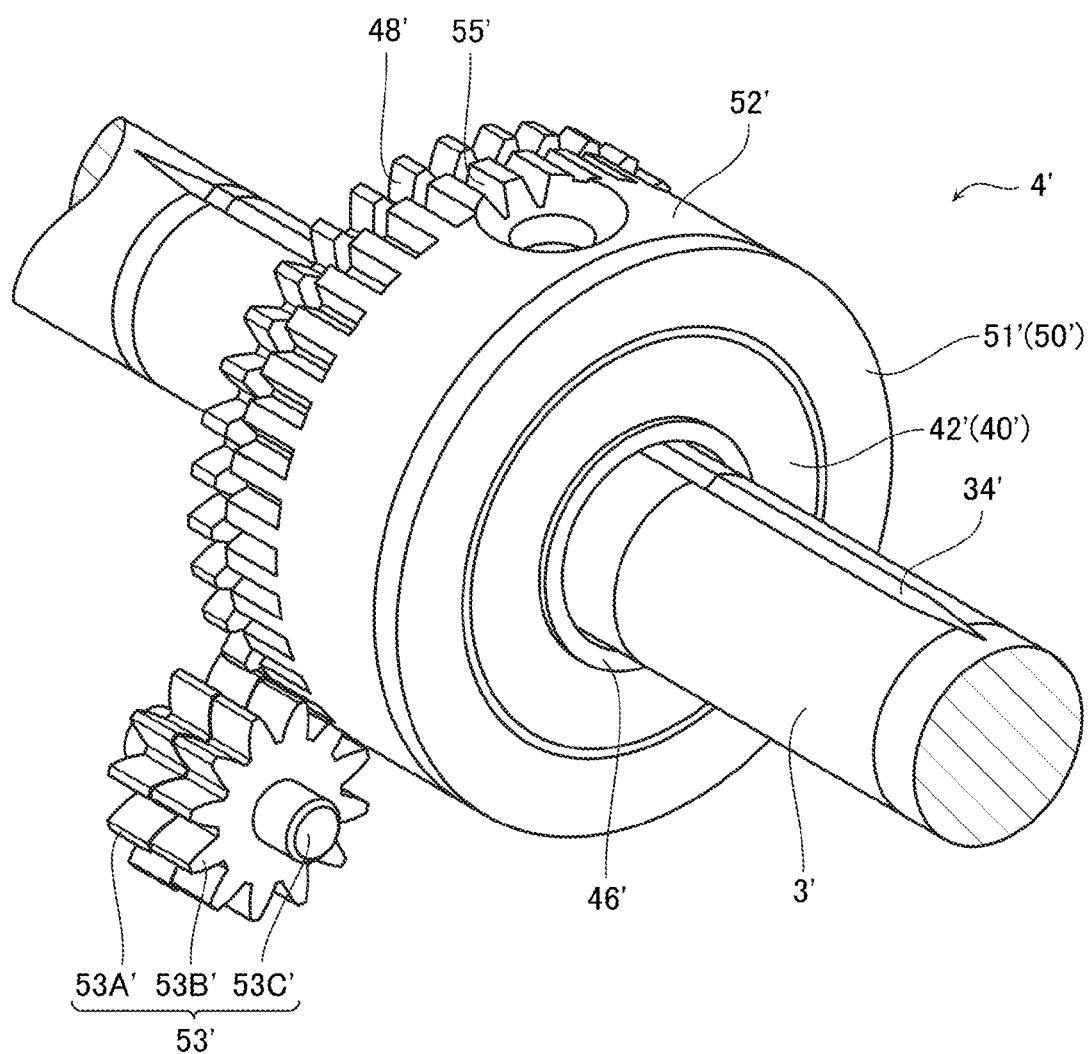
FIG. 26 is a perspective view of a first rotor 42' and a second rotor 51' configuring an inductive detection type rotary encoder 4' according to the fifth embodiment.
Figure 27:
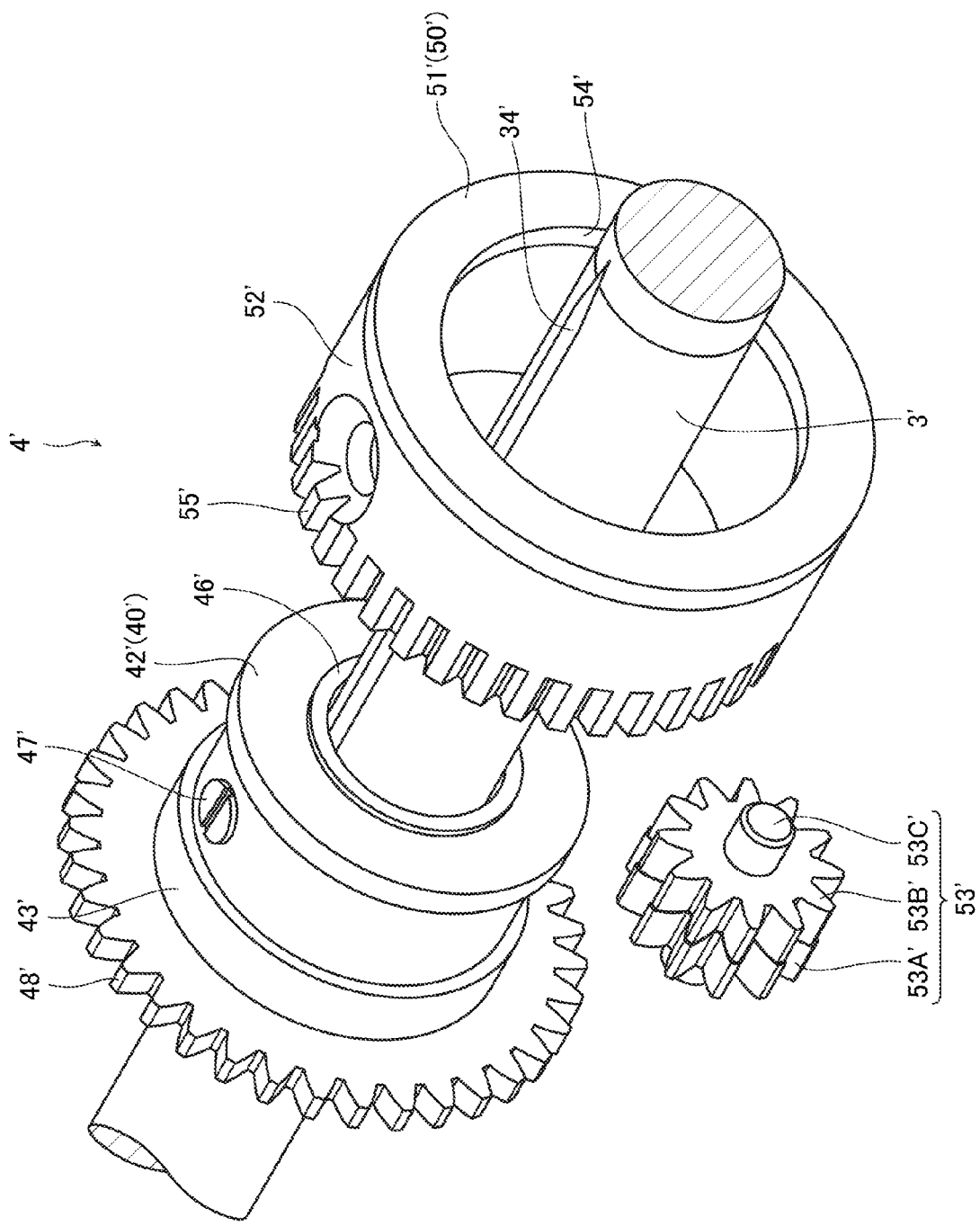
FIG. 27 is an exploded perspective view of the first rotor 42' and the second rotor 51' configuring the inductive detection type rotary encoder 4' according to the fifth embodiment.

A structure of a first rotor 42' and a second rotor 51' configuring the inductive detection type rotary encoder 4' will be next described with reference to FIGS. 25 to 27. FIG. 26 is a perspective view of the first rotor 42' and the second rotor 51' configuring the inductive detection type rotary encoder 4'. FIG. 27 is an exploded perspective view of the inductive detection type rotary encoder 4'. The inductive detection type rotary encoder 4' is configured of a first rotary encoder 40' and a second rotary encoder 50', and is housed in the housing space 22' in the main body 2' as illustrated in FIG. 25.

The first rotary encoder 40' includes a stator 41', the first rotor 42' and a first rotation cylinder 43'.

The stator 41' includes a through hole 44' through which the spindle 3' is inserted at the center of the circular plate, and is fixed on the partitioning plate 23'. Specifically, the stator 41' is externally fit on an insulative member 27' formed around the through hole 25' in the partitioning plate 23'.

The first rotor 42' includes a through hole 45' through which the spindle 3' is inserted at the center of the circular plate, and is arranged opposite to the stator 41' in the axial direction away from the stator 41' by a predetermined dimension.

In a state that the spindle 3' is being inserted into the first rotation cylinder 43', the first rotation cylinder 43' is arranged closer to the tip end side of the spindle 3' than the stator 41' and rotatably supports the first rotor 42' around the shaft of the spindle 3'. That is, a rotor support part 46' is formed along the outer periphery of the spindle 3' at the end of the first rotation cylinder 43' on the stator 41' side, and the first rotor 42' is externally fit on the outer periphery of the rotor support part 46'.

The first rotation cylinder 43' includes a screw key 47' threaded toward the center from the outer periphery. The tip end of the key 47' protrudes from the inner periphery of the first rotation cylinder 43' and is engaged with the key groove 34' on the outer periphery of the spindle 3'. That is, when the spindle 3' rotates, the key 47' is engaged with the key groove 34' of the spindle 3', and thus the first rotation cylinder 43' rotates in synchronization with the spindle 3'.

A first gear 48' is formed on the outer periphery of the first rotation cylinder 43'. The gear 48' is provided at the end of the first rotation cylinder 43' on the tip end side of the spindle 3', and has a larger outer diameter than the outer periphery of other part of the rotation cylinder 43'. The number of teeth of the first gear 48' is set at 40, for example.

The second rotary encoder 50' includes the stator 41', the second rotary 51', a second rotation cylinder (holder) 52', and a relay gear 53'.

The stator 41' is of the first rotary encoder 40', and is a common part between the rotary encoders 40' and 50'.

The second rotor 51' includes a hole 54' capable of arranging the first rotor 42' therein at the center of the circular plate, and is arranged on the outer periphery of the first rotor 42' to surround it. The second rotor 51' is arranged opposite to the stator 41' in the axial direction away from the stator 41' by a predetermined dimension like the first rotor 42'. In this way, the faces opposing the stator 41' of the rotors 42' and 51' form substantially the same plane.

While being inserted with the first rotation cylinder 43' (other than the first gear 48'), the second rotation cylinder 52' is supported on the first rotation cylinder 43'. The second rotor 51' is attached at the end of the second rotation cylinder 52' on the stator 41' side. In this way, the second rotor 51' is rotatably supported around the shaft of the spindle 3'. That is, the first rotor 42' and the second rotor 51' are arranged inside and outside, respectively, thereby to form a double cylindrical structure.

A second gear 55' is formed on the outer periphery of the second rotation cylinder 52'. The gear 55' is provided at the end of the second rotation cylinder 52' at the tip end side of the spindle 3', and has substantially the same outer diameter as the gear 48' of the first rotation cylinder 43'. The number of teeth of the second gear 55' is set at 41, for example, and is larger by one tooth than the first gear 48'.

The relay gear 53' is rotatably supported on the main body 2', and is arranged to be meshed with both the first gear 48' and the second gear 55'. That is, the relay gear 53' is configured of a first relay gear 53A' meshed with the first gear 48', a second relay gear 53B' meshed with the second gear 55', and a shaft part 53C' for axially supporting the relay gears 53A' and 53B' on the same shaft. The numbers of teeth of the relay gears 53A' and 53B' are set at the same number such as 12, for example, respectively. The modules of a pair of the first gear 48' and the first relay gear 53A' match with each other, and the modules of the other pair of the second gear 55' and the second relay gear 53B' match with each other so that the second rotation cylinder 52' can smoothly rotate via the relay gear 53' when the first rotation cylinder 43' rotates.

At this time, the rotors 42' and 51' rotate at different speeds due to a difference in the numbers of teeth of the gear 48' and the gear 55'. For example, when the number of teeth of the gear 48' is 40 and the number of teeth of the gear 55' is 41 as in the present embodiment, the first rotor 42' rotates 40 times and the second rotor 51' rotates 39 times while the spindle 3' rotates 40 times within an advance/retract movement range.

The first rotary encoder 40' and the second rotary encoder 50' can detect the absolute angles of the rotors 42' and 51' during one revolution, respectively. That is, the stator 41' outputs a phase signal indicating a periodical change per revolution of the first rotor 42'. Then, the first rotor 42' rotates in synchronization with the spindle 3', and thus the phase signal for the first rotor 42' indicates a change of the first cycle of the present invention due to one revolution of the spindle 3'. For example, 40 periodical changes are indicated while the spindle 3' rotates 40 times.

The stator 41' outputs a phase signal indicating a periodical change per revolution also for the second rotor 51'. Then, the second rotor 51' rotates 39 times while the spindle 3' rotates 40 times, and thus the phase signal for the second rotor 51' indicates 39 periodical changes due to about 40 revolutions of the spindle 3'.

Figure 28:
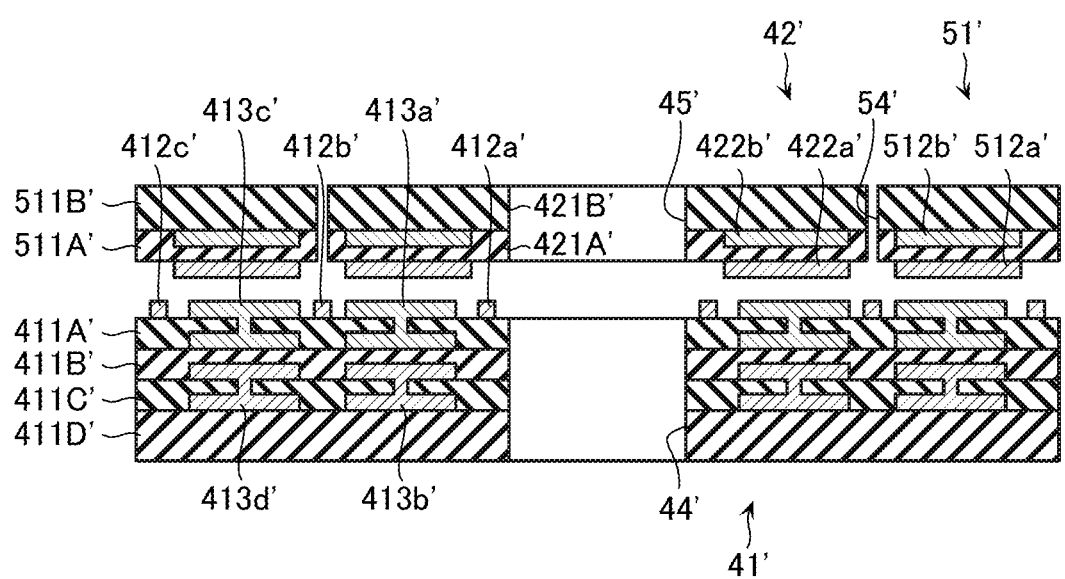
FIG. 28 is a cross-section view of a stator 41' and the rotors 42' and 51' according to the fifth embodiment.

A structure of the stator 41', the first rotor 42' and the second rotor 51' will be described below with reference to FIG. 28. FIG. 28 is a cross-section view of the stator 41', the first rotor 42' and the second rotor 51'.

The stator 41' includes stacked insulative layers 411A to 411D as illustrated in FIG. 28. The stator 41' includes first to third transmission wirings 412a' to 412c' on the surface of the insulative layer 411A' on the rotors 42', 51' side. The first to third transmission wirings 412a' to 412c' are annularly formed about the through hole 44'.

The stator 41' includes a first reception wiring 413a' in the insulative layer 411A' on the rotors 42', 51' side, and includes a second reception wiring 413b' in the intermediate insulative layer 411C'. The stator 41' includes a third reception wiring 413c' in the insulative layer 411A', and includes a fourth reception wiring 413d' in the insulative layer 411C'. Part of the first and third reception wirings 413a' and 413c' is formed on the surface of the insulative layer 411A' on the rotors 42', 51' side, the rest of the first and third reception wirings 413a' and 413c' is formed on the surface of the insulative layer 411B' on the rotors 42', 51' side, and both are mutually connected via a through hole or via penetrating the insulative layer 411A'. Part of the second and fourth reception wirings 413b' and 413d' is formed on the surface of the insulative layer 411C' on the rotors 42', 51' side, the rest of the second and fourth reception wirings 413b' and 413d' is formed on the surface of the insulative layer 411D' on the rotors 42', 51' side, and both are mutually connected via a thorough hole or via penetrating the insulative layer 411C'.

The first to fourth reception wirings 413a' to 413d' are annularly formed about the through hole 44'. The first and second reception wirings 413a' and 413b' are stacked one above the other in the stack direction via the insulative layer 411B'. The third and fourth reception wirings 413c' and 413d' are provided closer to the outer periphery side of the stator 41' than the first and second reception wirings 413a' and 413b'. The third and fourth reception wirings 413c' and 413d' are stacked one above the other in the stack direction via the insulative layer 411B'.

On the other hand, the first rotor 42' includes stacked insulative layers 421A' and 421B' as illustrated in FIG. 28. The first rotor 42' includes a first magnetic flux coupler 422a' on the surface of the insulative layer 421A' on the stator 41' side, and includes a second magnetic flux coupler 422b' on the surface of the insulative layer 421B' on the stator 41' side. The first magnetic flux coupler 422a' and the second magnetic flux coupler 422b' are annularly formed about the through hole 45'. The first and second magnetic flux couplers 422a' and 422b' are stacked one above the other in the stack direction via the insulative layer 421A'.

The second rotor 51' includes stacked insulative layers 511A' and 511B' as illustrated in FIG. 28. The second rotor 51' includes a third magnetic flux coupler 512a' on the surface of the insulative layer 511A' on the stator 41' side and includes a fourth magnetic flux coupler 512b' on the surface of the insulative layer 511B' on the stator 41' side. The third magnetic flux coupler 512a' and the fourth magnetic flux coupler 512b' are annularly formed about the hole 54'. The third and fourth magnetic flux couplers 512a' and 512b' are stacked one above the other in the stack direction via the insulative layer 511A'.

The first to third transmission wirings 412a' to 412c' flow a drive signal which changes with time in a time division manner, and give magnetic fields generated by the drive signal to the first to fourth magnetic flux couplers 422a', 422b', 512a' and 512b'.

The first and second magnetic flux couplers 422a' and 422b' generate inductive currents based on the magnetic fields generated by the drive signal flowing through the first and second transmission wirings 412a' and 412b'. The third and fourth magnetic flux couplers 512a' and 512b' generate inductive currents based on the magnetic fields generated by the drive signal flowing through the second and third transmission wirings 412b' and 412c'.

When an inductive current is generated in the first magnetic flux coupler 422a' due to magnetic flux coupling between the second transmission wiring 412b' and the first magnetic flux coupler 422a', the first reception wiring 413a' detects an inductive voltage generated by the magnetic flux coupling. When an inductive current is generated in the second magnetic flux coupler 422b' due to magnetic flux coupling between the first transmission wiring 412a' and the second magnetic flux coupler 422b', the second reception wiring 413b' detects an inductive voltage generated by the magnetic flux coupling.

When an inductive current is generated in the third magnetic flux coupler 512a' due to magnetic flux coupling between the third transmission wiring 412c' and the third magnetic flux coupler 512a', the third reception wiring 413c' detects an inductive voltage generated by the magnetic flux coupling. When an inductive current is generated in the fourth magnetic flux coupler 512b' due to magnetic flux coupling between the second transmission wiring 412b' and the fourth magnetic flux coupler 512b', the fourth reception wiring 413d' detects an inductive voltage generated by the magnetic flux coupling.

In FIG. 28, the first reception wiring 413a' opposes the first magnetic flux coupler 422a'. The first reception wiring 413a' and the first magnetic flux coupler 422a' are arranged between the second reception wiring 413b' and the second magnetic flux coupler 422b'. The arrangement enables a signal intensity received in the first reception wiring 413a' to be enhanced. When a reception signal of the first reception wiring 413a' influences a measurement accuracy, the arrangement is preferable.

Similarly, in FIG. 28, the third reception wiring 413c' opposes the third magnetic flux coupler 512a'. The third reception wiring 413c' and the third magnetic flux coupler 512a' are arranged between the fourth reception wiring 413d' and the fourth magnetic flux coupler 512b'. The arrangement enables a signal intensity received in the third reception wiring 413c' to be enhanced. When a reception signal of the third reception wiring 413c' influences a measurement accuracy, the arrangement is preferable.

A planar shape of the first to third transmission wirings 412a' to 412c', the first to fourth reception wirings 413a' to 413d', and the first to fourth magnetic flux couplers 422a', 422b', 512a', 512b' will be described below.

Figure 29:
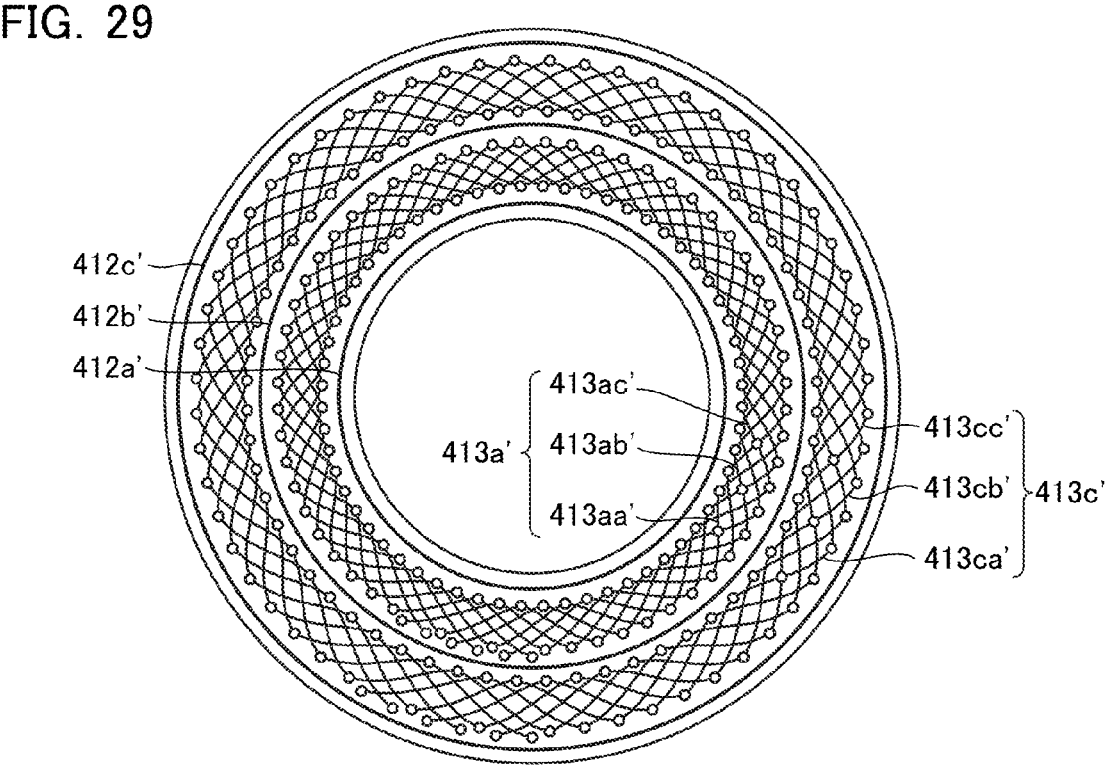
FIG. 29 is a plan view illustrating first to third transmission wirings 412a' to 412c', a first reception wiring 413a' and a third reception wiring 413c' according to the fifth embodiment.

FIG. 29 is a plan view illustrating the first to third transmission wirings 412a' to 412c' and the first and third reception wirings 413a', 413c'. The first to third transmission wirings 412a' to 412c' are formed to be coaxial with the spindle 3' and have substantially circular current paths, respectively, as illustrated in FIG. 29. The second transmission wiring 412b' is formed on the outer periphery side of the first transmission wiring 412a', and the third transmission wiring 412c' is formed on the outer periphery side of the second transmission wiring 412b'.

As illustrated in FIG. 29, the first and third reception wirings 413a' and 413c' are annularly formed to be coaxial with the spindle 3'. The first reception wiring 413a' is provided on the outer periphery side of the first transmission wiring 412a' and on the inner periphery side of the second transmission wiring 412b'. The third reception wiring 413c' is provided on the outer periphery side of the second transmission wiring 412b' and on the inner periphery side of the third transmission wiring 412c'. That is, the third reception wiring 413c' is provided on the outer periphery of the first reception wiring 413a'. The first and third reception wirings 413a' and 413c' are configured of three reception wirings 413aa' to 413ac' and 413ca' to 413cc' with different phases in the rotation direction, respectively. Crossing parts of the reception wirings 413aa' to 413ac' and 413ca' to 413cc' are vertically arranged via the insulative layer 411A' in order to prevent the crossing parts from short-circuiting, and the wirings are mutually connected via a through hole or via hole to be insulated and isolated.

Figure 30:
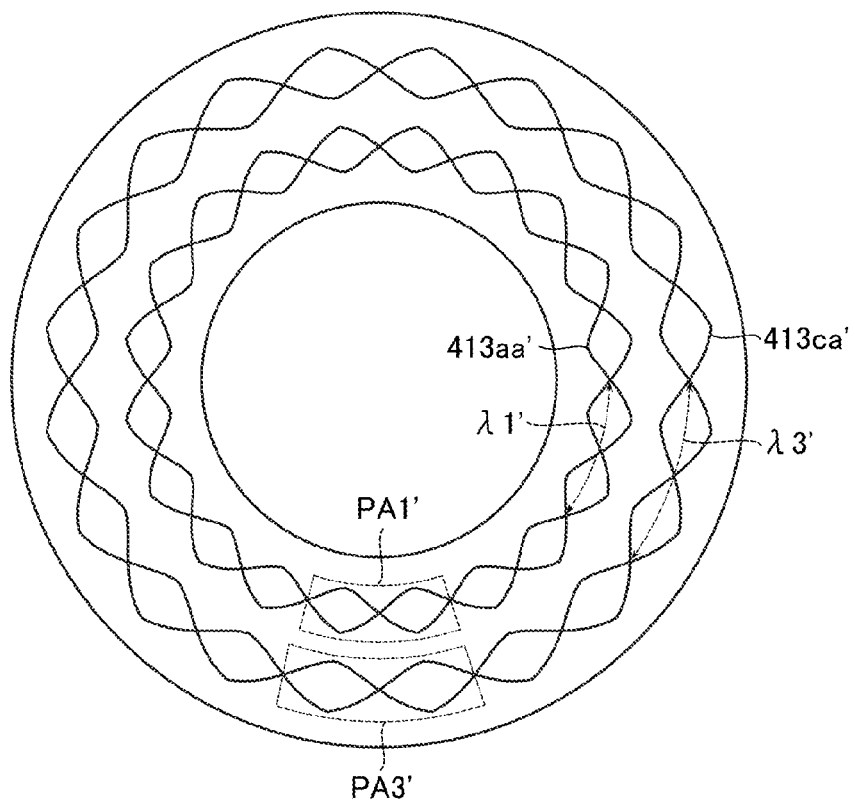
FIG. 30 is a plan view illustrating reception wirings 413aa' and 413ca' according to the fifth embodiment.

A shape of the reception wirings 413aa' and 413ca' will be described below with reference to FIG. 30. FIG. 30 is a plan view illustrating the reception wirings 413aa' and 413ca'.

As illustrated in FIG. 30, the reception wiring 413aa' has a loop (rhombic) shape periodically changing at the pitch $\lambda 1'$ in the rotation direction of the rotor 42'. In an example illustrated in FIG. 30, the reception wiring 413aa' is provided with 10 (N1) rhombic pairs PA1'. The reception wirings 413ab' and 413ac' have the same shape as the reception wiring 413aa'.

As illustrated in FIG. 30, the reception wiring 413ca' has a loop (rhombic) shape periodically changing at a pitch $\lambda 3'$ in the rotation direction of the rotor 51'. In an example illustrated in FIG. 30, the reception wiring 413ca' is provided with 10 (N3) rhombic pairs PA3'. The reception wirings 413cb' and 413cc' have the same shape as the reception wiring 413ca'.

Figure 31:
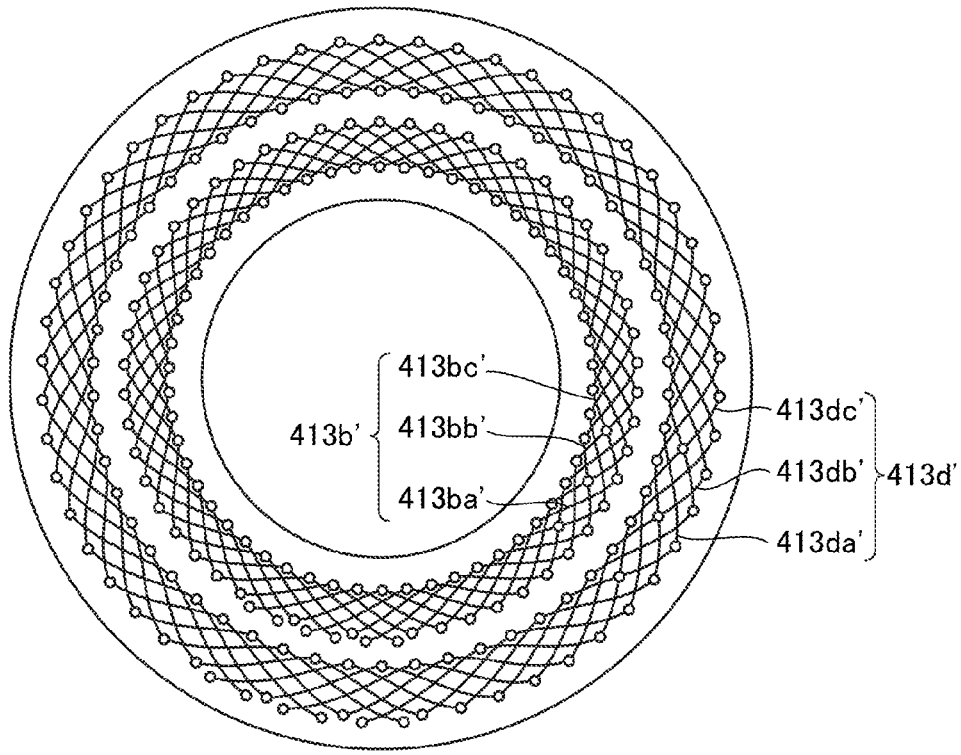
FIG. 31 is a plan view illustrating a second reception wiring 413b' and a fourth reception wiring 413d' according to the fifth embodiment.

A shape of the second and fourth reception wirings 413b' and 413d' will be described below with reference to FIG. 31. FIG. 31 is a plan view illustrating the second and fourth reception wirings 413b' and 413d'.

As illustrated in FIG. 31, the second and fourth reception wirings 413b' and 413d' are annularly formed to be coaxial with the spindle 3'. The second reception wiring 413b' is formed to be stacked above the first reception wiring 413a' in the stack direction. The fourth reception wiring 413d' is positioned on the outer periphery side of the second reception wiring 413b' and is formed to be stacked above the third reception wiring 413c' in the stack direction. The second and fourth reception wirings 413b' and 413d' are configured of three reception wirings 413ba' to 413bc' and 413da' to 413dc' with different phases in the rotation direction, respectively. Crossing parts of the reception wirings 413ba' to 413bc' and 413da' to 413dc' are vertically arranged via the insulative layer 411C' in order to prevent the crossing parts from short-circuiting, and are mutually connected via a through hole or via hole to be insulated and isolated.

Figure 32:
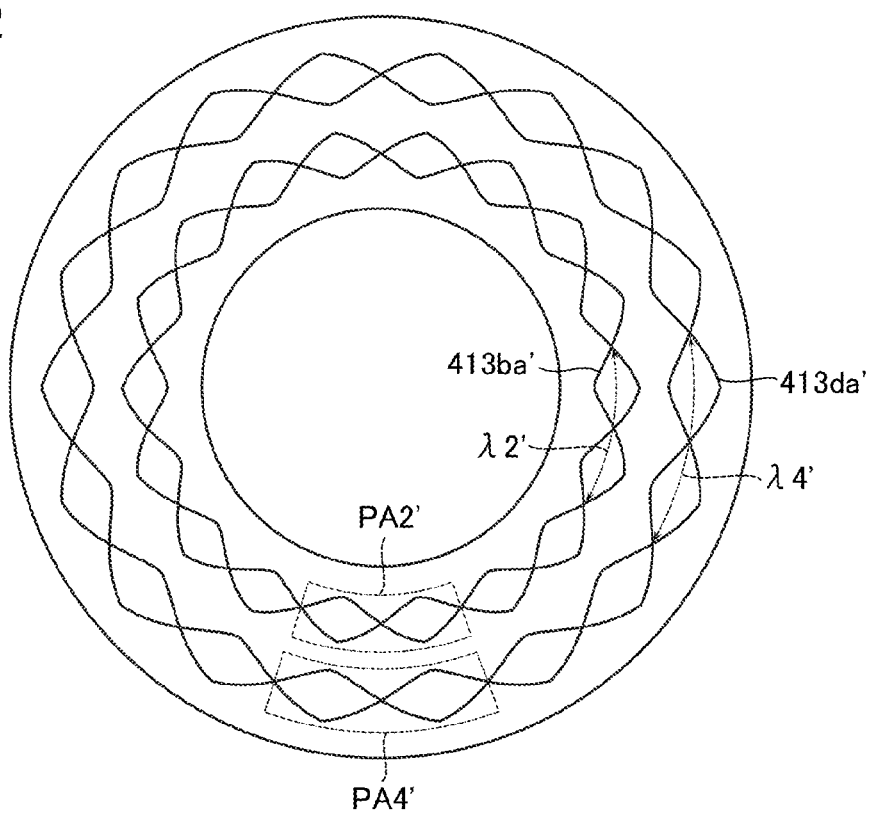
FIG. 32 is a plan view illustrating reception wirings 413ba' and 413da' according to the fifth embodiment.

A shape of the reception wirings 413ba' and 413da' will be described below with reference to FIG. 32. FIG. 32 is a plan view illustrating the reception wirings 413ba' and 413da'.

As illustrated in FIG. 32, the reception wiring 413ba' has a loop (rhombic) shape periodically changing at a pitch $\lambda 2'$ different from a pitch $\lambda 1'$ ($\lambda 2' \neq \lambda 1'$) in the rotation direction of the rotor 42'. In an example illustrated in FIG. 32, the reception wiring 413ba' is provided with nine (N2) rhombic pairs PA2'. In the present embodiment, the pitch $\lambda 1'$ is shorter than the pitch λ2' (λ1'<λ2'). The reception wirings 413bb' and 413bc' have the same shape as the reception wiring 413ba'.

As illustrated in FIG. 32, the reception wiring 413da' has a loop (rhombic) shape periodically changing at a pitch λ4' different from a pitch λ3' (λ4'≠λ3') in the rotation direction of the rotor 51'. In the example illustrated in FIG. 32, the reception wiring 413da' is provided with nine (N4) rhombic pairs PA4'. In the present embodiment, the pitch λ3' is shorter than the pitch λ4' (λ3'<λ4'). The reception wirings 413db' and 413dc' have the same shape as the reception wiring 413da'.

Figure 33A:
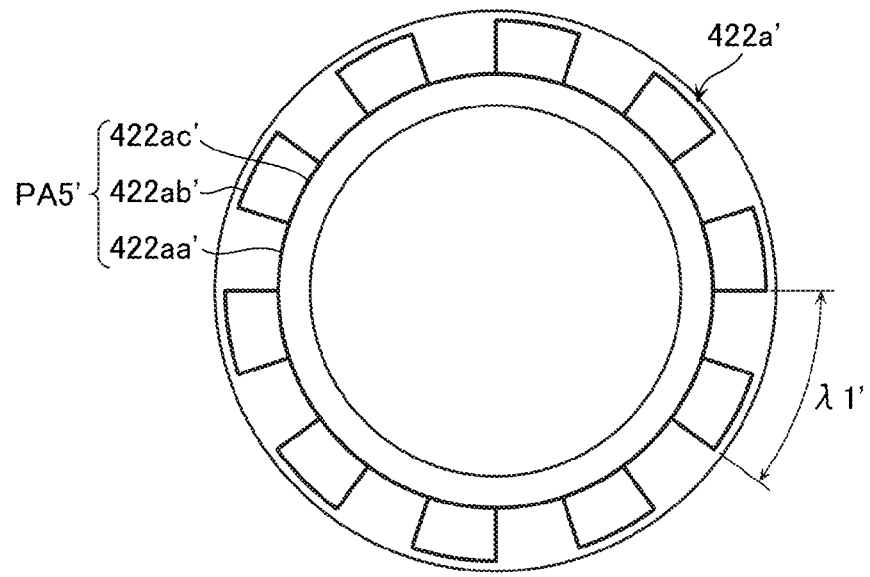
FIG. 33A is a plan view illustrating a first magnetic flux coupler 422a' according to the fifth embodiment.

A shape of the first magnetic flux coupler 422a' will be described below with reference to FIG. 33A. FIG. 33A is a plan view illustrating the first magnetic flux coupler 422a'. As illustrated in FIG. 33A, the first magnetic flux coupler 422a' is formed to be coaxial with the spindle 3' and is formed to be stacked above the first reception wiring 413a' via a gap. The first magnetic flux coupler 422a' has a wiring in which a continuous toothed wiring part periodically changing in the rotation direction of the rotor 42' at the same pitch λ1' as the first reception wiring 413a and a circular wiring part inscribed in the toothed wiring part are stacked. More specifically, the first magnetic flux coupler 422a' alternately configures concave parts 422aa' sagging toward the spindle 3' and convex parts 422ab' protruding away from the spindle 3'. The first magnetic flux coupler 422a' has an annular coupling part 422ac' for coupling the concave parts 422aa'. That is, the concave parts 422aa' and the convex parts 422ab' form a toothed current path and the concave parts 422aa' and the coupling part 422ac' form an annular current path. In an example illustrated in FIG. 33A, 10 (N1) combinations PA5' of the concave part 422aa', the convex part 422ab' and the coupling part 422ac' are provided.

Figure 33B:
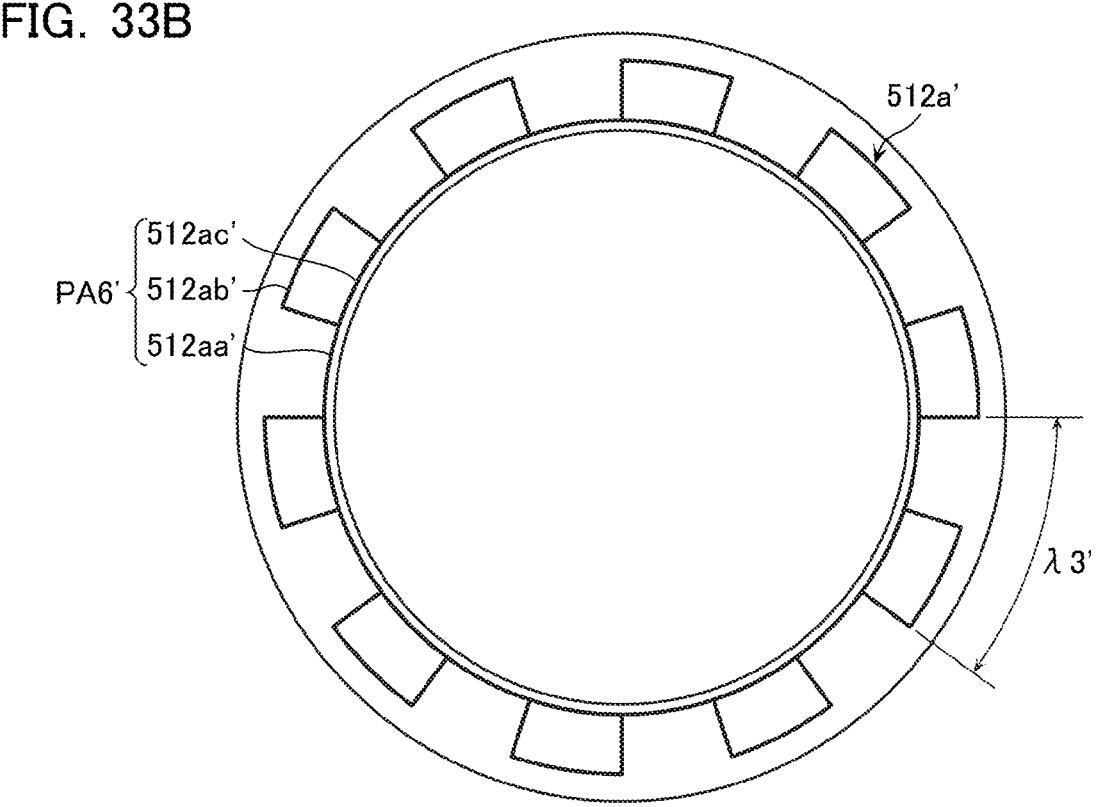
FIG. 33B is a plan view illustrating a third magnetic flux coupler 512a' according to the fifth embodiment.

A shape of the third magnetic flux coupler 512a' will be described below with reference to FIG. 33B. FIG. 33B is a plan view illustrating the third magnetic flux coupler 512a'. As illustrated in FIG. 33B, the third magnetic flux coupler 512a' is formed to be coaxial with the spindle 3' and is formed to be stacked above the third reception wiring 413c' via a gap. The third magnetic flux coupler 512a' has a wiring in which a continuous toothed wiring part periodically changing in the rotation direction of the rotor 51' at the same pitch λ3' as the third reception wiring 413c' and a circular wiring part inscribed in the toothed wiring part are stacked. More specifically, the third magnetic flux coupler 512a' alternately configures concave parts 512aa' sagging toward the spindle 3' and convex parts 512ab' protruding away from the spindle 3'. The third magnetic flux coupler 512a' has an annular coupling part 512ac' for coupling the concave parts 512aa'. That is, the concave parts 512aa' and the convex parts 512ab' form a toothed current path, and the concave parts 512aa' and the coupling part 512ac' form an annular current path. In an example illustrated in FIG. 33B, 10 (N3) combinations PA6' of the concave part 512aa', the convex part 512ab' and the coupling part 512ac' are provided.

Figure 34A:
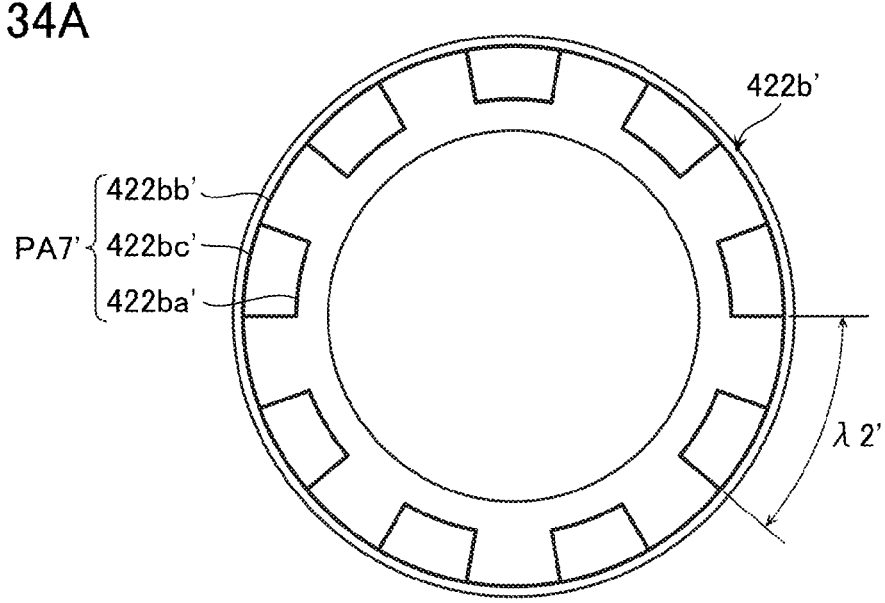
FIG. 34A is a plan view illustrating a second magnetic flux coupler 422b' according to the fifth embodiment.

A shape of the second magnetic flux coupler 522b' will be described below with reference to FIG. 34A. FIG. 34A is a plan view illustrating the second magnetic flux coupler 422b'. As illustrated in FIG. 34A, the second magnetic flux coupler 422b' is formed to be coaxial with the spindle 3' and is formed to be stacked above the first magnetic flux coupler 422a' via the insulative layer 421A' in the stack direction. The second magnetic flux coupler 422b' has a wiring in which a continuous toothed wiring part periodically changing in the rotation direction of the rotor 42' at the pitch λ2' and a circular wiring part circumscribed to the toothed wiring part are stacked. More specifically, the second magnetic flux coupler 422b' alternately configures concave parts 422ba' sagging toward the spindle 3' and convex parts 422bb' protruding away from the spindle 3'. The second magnetic flux coupler 422b' has an annular coupling part 422bc' for coupling the convex parts 422bb'. That is, the convex parts 422bb' and the coupling part 422bc' form an annular current path, and the concave parts 422ba' and the convex parts 422bb' form a toothed current path. In an example illustrated in FIG. 34A, nine (N2) combinations PA7' of the concave part 422ba', the convex part 422bb' and the coupling part 422bc' are provided.

Figure 34B:
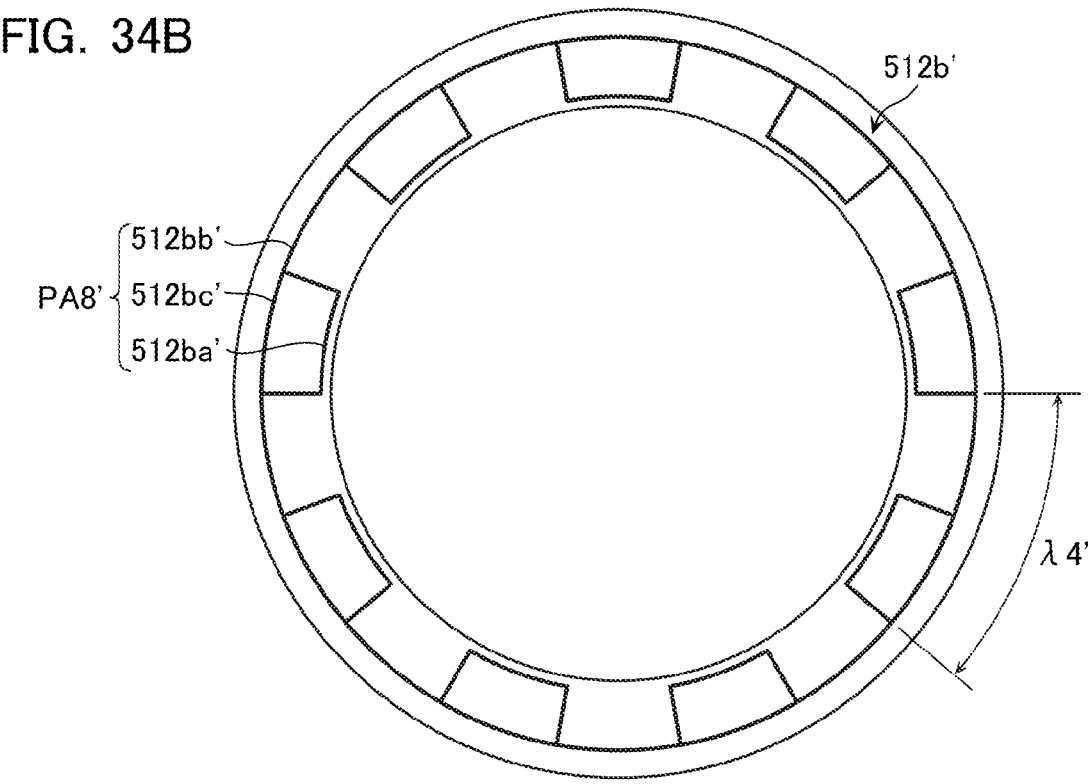
FIG. 34B is a plan view illustrating a fourth magnetic flux coupler 512b' according to the fifth embodiment.

A shape of the fourth magnetic flux coupler 512b' will be described below with reference to FIG. 34B. FIG. 34B is a plan view illustrating the fourth magnetic flux coupler 512b'. The fourth magnetic flux coupler 512b' is formed to be coaxial with the spindle 3' and is formed to be stacked above the third magnetic flux coupler 512a' via the insulative layer 511A' in the stack direction. The fourth magnetic flux coupler 512b' has a wiring in which a continuous toothed wiring part periodically changing in the rotation direction of the rotor 51' at the pitch λ4' and a circular wiring part circumscribed to the toothed wiring part are stacked. More specifically, the fourth magnetic flux coupler 512b' alternately configures concave parts 512ba' sagging away from the spindle 3' and convex parts 512bb' protruding away from the spindle 3'. The fourth magnetic flux coupler 512b' has an annular coupling part 512bc' for coupling the convex pars 512bb'. That is, the convex parts 512bb' and the coupling part 512bc' form an annular current path and the concave parts 512ba' and the convex parts 512bb' form a toothed current path. In an example illustrated in FIG. 34B, nine (N4) combinations PA8' of the concave part 512ba', the convex part 512bb' and the coupling part 512bc' are provided.

With the structures illustrated in FIGS. 27 to 34B, the first reception wiring 413a' and the first magnetic flux coupler 422a form a first track having a shape periodically changing in the rotation direction of the rotor 42' at the pitch λ1'. The first track generates ten (N1) periodical changes for one revolution of the rotor 42'. The second reception wiring 413b' and the second magnetic flux coupler 422b' form a second track having a shape periodically changing in the rotation direction of the rotor 42' at the pitch λ2' different from the pitch λ1'. The second track generates nine (N2) periodical changes for one revolution of the rotor 42'. In the present embodiment, the pitch λ1' of the first track is shorter than the pitch λ2' of the second track. A distance between the first reception wiring 413a' and the first magnetic flux coupler 422a in the first track is shorter than a distance between the second reception wiring 413b' and the second magnetic flux coupler 422b' in the second track. Thereby, a signal intensity of the first track at the pitch λ1' is higher than a signal intensity of the second track, thereby obtaining high measurement accuracy.

The third reception wiring 413c' and the third magnetic flux coupler 512a' form a third track having a shape periodically changing in the rotation direction of the rotor 51' at the pitch λ3'. The third track generates ten (N3) periodical changes for one revolution of the rotor 51'. The fourth reception wiring 413d' and the fourth magnetic flux coupler 512b' form a fourth track having a shape periodically changing in the rotation direction of the rotor 51' at the pitch λ4' different from the pitch 23'. The fourth track generates nine (N4) periodical changes for one revolution of the rotor 51'. In the present embodiment, the pitch λ3' of the third track is shorter than the pitch λ4' of the fourth track. A distance between the third reception wiring 413c' and the third magnetic flux coupler 512a' in the third track is shorter than a distance between the fourth reception wiring 413d' and the fourth magnetic flux coupler 512b' in the fourth track. Thereby, a signal intensity of the third track at the pitch $\lambda 3'$ is higher than a signal intensity of the fourth track, thereby obtaining high measurement accuracy.

Figure 35:
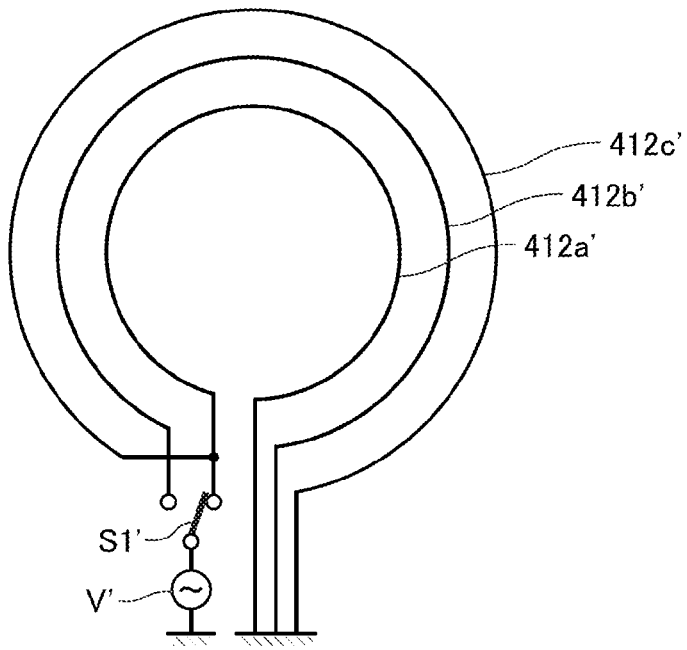
FIG. 35 is a circuit diagram illustrating a unit for supplying currents to the first to third transmission wirings 412a' to 412c' according to the fifth embodiment.

FIG. 35 illustrates a current supplying unit for supplying currents to the first to third transmission wirings 412a' to 412c'. The first to third transmission wirings 412a' to 412c' are grounded at one ends and are connected to the AC power supply V via a switch S1' at the other ends. During measurement, drive signal which changes with time is supplied to the first to third transmission wirings 412a' to 412c' by switching the switch S1'. Specifically, a drive signal is supplied only to the second transmission wiring 412b' and then the drive signal is supplied to only the first and third transmission wirings 412a' and 412c' at the same time. These steps are repeatedly performed.

Signals obtained in the first to fourth reception wirings 413a' to 413d' will be described below with reference to FIGS. 36A, 36B and 37. As described above, the first to third transmission wirings 412a' to 412c' flow the drive signal which changes with time in a time division manner, respectively.

A case in which a current is flowed through the second transmission wiring 412b' will be described first with reference to FIG. 36A. When a current is flowed through the second transmission wiring 412b' clockwise, magnetic fields are generated in the right screw direction in the respective current paths. Therefore, the magnetic fields are coupled with the first to fourth magnetic flux couplers 422a', 422b', 512a' and 512b' and currents are flowed through the first to fourth magnetic flux couplers 422a', 422b', 512a' and 512b' counterclockwise.

Figure 36A:
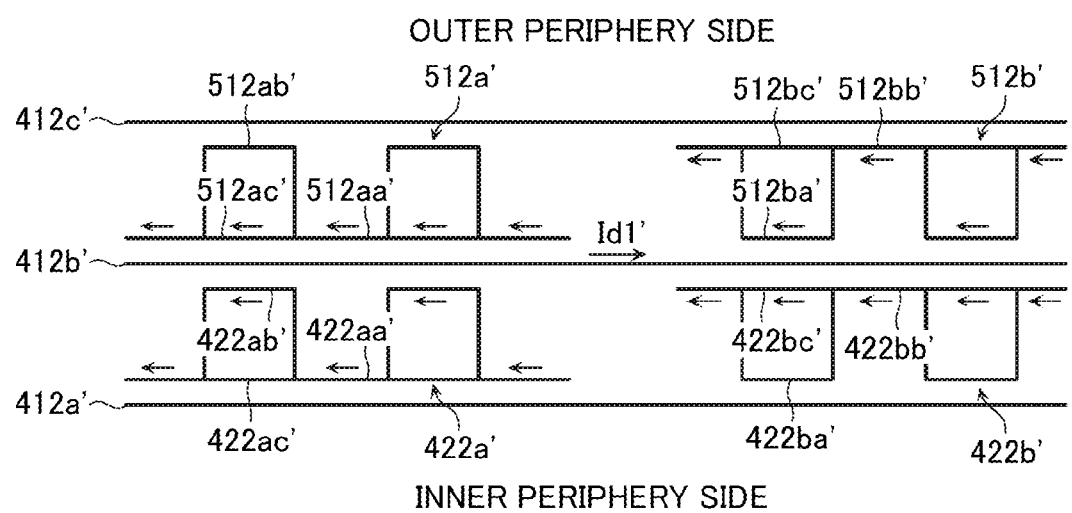
FIG. 36A is a schematic diagram illustrating inductive currents generated in the first to fourth magnetic flux couplers 422a', 422b', 512a' and 512b' by a current flowing through the second transmission wiring 412b' according to the fifth embodiment.

In the first magnetic flux coupler 422a', currents induced in the convex parts 422ab' are dominant as illustrated in FIG. 36A. Thus, a current induced in the first magnetic flux coupler 422a' is flowed through the toothed current path formed of the concave parts 422aa' and the convex parts 422ab'. Thereby, magnetic fields travelling from the top surface to the back surface of FIG. 36A are generated in the concave parts 422aa' in the first magnetic flux coupler 422aa', magnetic fields travelling from the back surface to the top surface of the sheet are generated in the convex parts 422ab', and the magnetic fields form a periodically magnetic pattern at the pitch $\lambda 1'$. The magnetic fields are received in the first reception wiring 413a'.

As illustrated in FIG. 36A, in the second magnetic flux coupler 422b', currents are induced in the convex parts 422bb' and the coupling part 422bc' and the currents are mainly flowed through the annular current path. A current flowing through the toothed current path formed of the concave parts 422ba' and the convex parts 422bb' is on the order of one-tenth of the current flowing through the annular current path. Thus, the magnetic fields forming the magnetic pattern at the pitch 22' generated in the second magnetic flux coupler 422b' are smaller than the magnetic fields forming the magnetic pattern at the pitch $\lambda 1'$ generated in the first magnetic flux coupler 422a'. The first magnetic flux coupler 422a' has one circumferential length of pitch $\lambda 1' \times 10$ while the second magnetic flux coupler 422b' has one circumferential length of pitch $\lambda 2' \times 9$. Thus an influence of the magnetic fields coupled with the first reception wiring 413a is compensated by an influence of the magnetic fields from the second magnetic flux coupler 422b' in the total circumference as illustrated in FIG. 37. That is, inductive voltages caused by the second magnetic flux coupler 422b' are mutually cancelled in the first reception wiring 413a' due to the different pitches $\lambda 1'$ and $\lambda 2'$, and their detected signals are much small. The first reception wiring 413a' can restrict crosstalk from the second magnetic flux coupler 422b'.

As illustrated in FIG. 36A, in the third magnetic flux coupler 512a', currents are induced in the concave parts 512aa' and the coupling part 512ac' and the currents mainly flow through the annular current path. Thus, as in the above case, few magnetic fields are generated from the third magnetic flux coupler 512a'. Also, currents are mutually cancelled due to a difference in phase between the third magnetic flux coupler 512a' and the fourth reception wiring 413d' even when some magnetic fields induce a current in the fourth reception wiring 512b', and their detected signals are much small.

On the other hand, currents induced in the concave parts 512ba' are dominant in the fourth magnetic flux coupler 512b'. Thus, the currents mainly flow through the toothed current path formed of the concave parts 512ba' and the convex parts 512bb'. Thereby, magnetic fields travelling from the top surface to the back surface of FIG. 36A are generated in the concave parts 512ba' in the fourth magnetic flux coupler 512b', magnetic fields travelling from the back surface to the top surface of the sheet are generated in the convex parts 512bb', the magnetic fields form a periodically magnetic pattern at the pitch $\lambda 4'$. The magnetic fields are received in the fourth reception wiring 413d'.

A case in which currents are flowed through the first and third transmission wirings 412a' and 412c' will be described below with reference to FIG. 36B. When currents are flowed through the first and third transmission wirings 412a' and 412c' clockwise, currents are flowed through the first to fourth magnetic flux coupler 422a', 422b', 512a' and 512b' counterclockwise like when a current is flowed through the second transmission wiring 412b'.

Figure 36B:
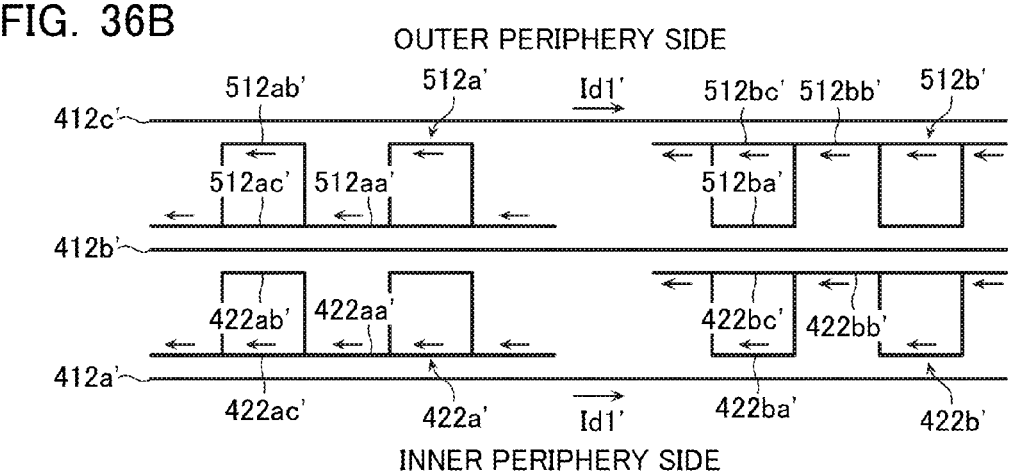
FIG. 36B is a schematic diagram illustrating inductive currents generated in the first to fourth magnetic flux couplers 422a', 422b', 512a' and 512b' by currents flowing through the first and third transmission wirings 412a' and 412c' according to the fifth embodiment.

As illustrated in FIG. 36B, currents are induced in the concave parts 422aa' and the coupling part 422ac' in the first magnetic flux coupler 422a' and the currents mainly flow through the annular current path. Thus, as in the above case, few magnetic fields at the pitch $\lambda 1'$ are generated from the first magnetic flux coupler 422a', and inductive voltages cause by the first magnetic flux coupler 422a' are mutually cancelled in the second reception wiring 413b' due to a difference in pitch between the first magnetic flux coupler 422a' and the second reception wiring 413b' even when some magnetic fields at the pitch $\lambda 1'$ induce a current in the second reception wiring 413b', and thus their detected signals are much small.

On the other hand, as illustrated in FIG. 36B, currents induced in the concave parts 422ba' are dominant in the second magnetic flux coupler 422b'. Thus, the currents mainly flow through the toothed current path formed of the concave parts 422ba' and the convex part 422bb'. Thereby, magnetic fields travelling from the top surface to the back surface of FIG. 36B are generated in the concave parts 422ba' in the second magnetic flux coupler 422b', magnetic fields travelling from the back surface to the top surface of the sheet are generated in the convex parts 422bb', and the magnetic fields form a periodically magnetic pattern at the pitch $\lambda 2'$. The magnetic fields are received in the second reception wiring 413b'.

As illustrated in FIG. 36B, currents induced in the convex parts 512ab' are dominant in the third magnetic flux coupler 512a'. Thus, the currents mainly flow through the toothed current path formed of the concave parts 512aa' and the convex parts 512ab'. Thereby, magnetic fields travelling from the top surface to the back surface of FIG. 36B are generated in the concave parts 512aa' of the third magnetic flux coupler 512a', magnetic fields travelling from the back surface to the top surface of the sheet are generated in the convex parts 512*ab*', and the magnetic fields form a periodically magnetic pattern at the pitch λ3'. The magnetic fields are received in the third reception wiring 413*c*'.

On the other hand, as illustrated in FIG. 36B, currents are induced in the convex parts 512*bb*' and the coupling part 512*bc*' in the fourth magnetic flux coupler 512*b*' and the currents mainly flow through the annular current path. Thus, as in the above case, few magnetic fields at the pitch λ4' are generated from the fourth magnetic flux coupler 512*b*'. Also, inductive voltages caused by the third magnetic flux coupler 512*a*' are mutually cancelled in the fourth reception wiring 512*b*' due to a difference in pitch between the third magnetic flux coupler 512*a*' and the fourth reception wiring 512*b*' even when some magnetic fields at the pitch λ4' induce a current in the third reception wiring 413*c*', and thus their detected signals are much small.

Figure 37:
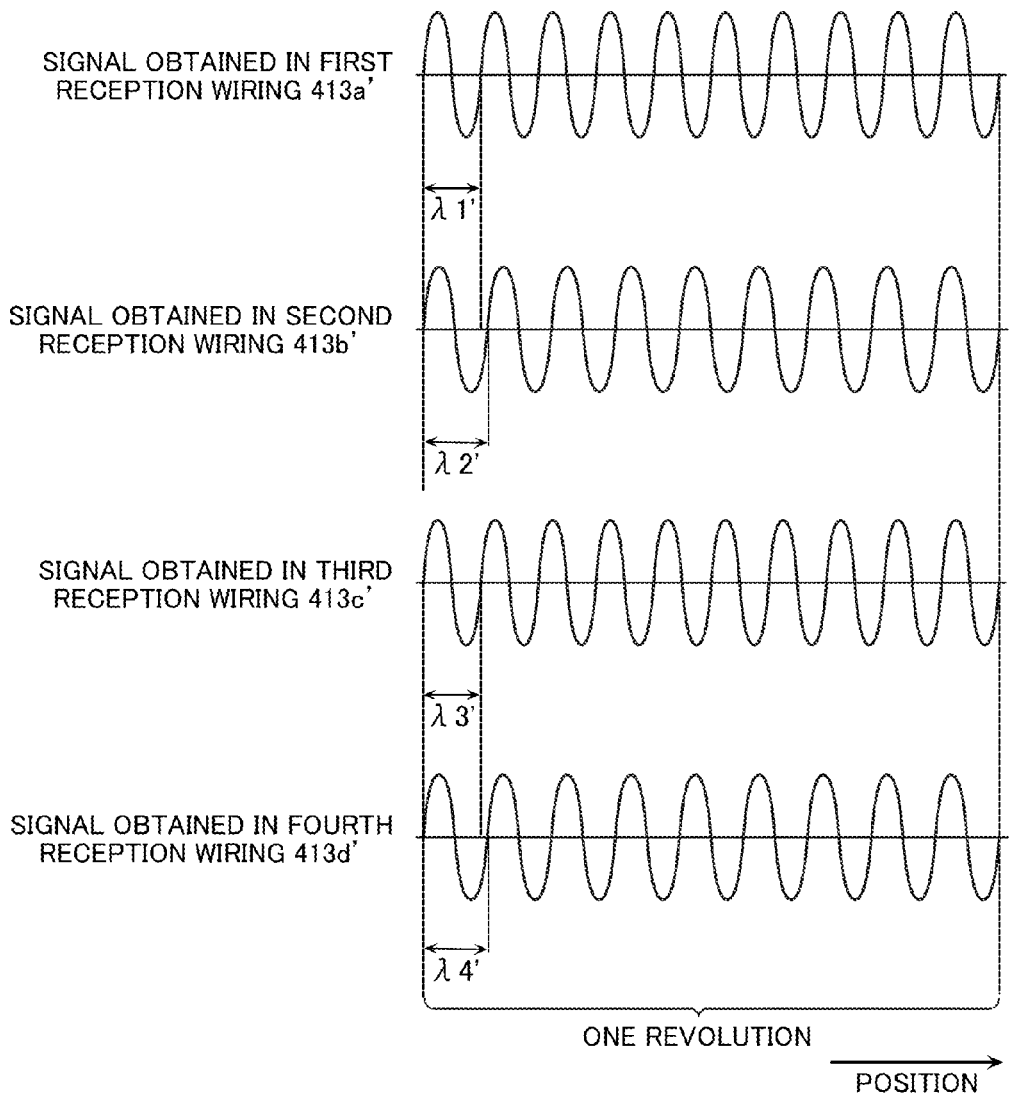
FIG. 37 is a diagram illustrating signals obtained by the first to fourth reception wirings 413a' to 413d' according to the fifth embodiment.

From the above, as illustrated in FIG. 37, reception signals changing depending on the positions of the rotors 42' and 51' relative to the stator 41' are obtained from the first to fourth reception wirings 413*a*' to 413*d*'. The reception signals obtained in the first and second reception wirings 413*a*' and 413*b*' are offset by one circumference during one revolution of the rotor 42'. Thus an absolute position during one revolution can be detected from the two reception signals. Similarly, the reception signals obtained in the third and fourth reception wirings 413*c*' and 413*d*' are offset by one circumference during one revolution of the rotor 51'. Thus an absolute position during one revolution can be detected from the two reception signals. FIG. 37 illustrates only one phase of signal, but three phases of reception signals offset by 120° can be actually obtained.

According to the present embodiment, the first and second reception wirings 413*a*' and 413*b*' can be stacked via the insulative layers in the longitudinal direction of the spindle 3'. Similarly the third and fourth reception wirings 413*c*' and 413*d*' can be stacked via the insulative layers in the longitudinal direction of the spindle 3'. The first and second magnetic flux couplers 422*a*' and 422*b*' can be stacked via the insulative layers in the longitudinal direction of the spindle 3'. Similarly the third and fourth magnetic flux couplers 512*a*' and 512*b*' can be stacked via the insulative layers in the longitudinal direction of the spindle 3'. Thus, the outer diameter of the encoder can be reduced thereby to restrict crosstalk. Further, the three transmission wirings 412*a*' to 412*c*' can drive four tracks, thereby further simplifying the structure of the inductive detection type rotary encoder.

Figure 38:
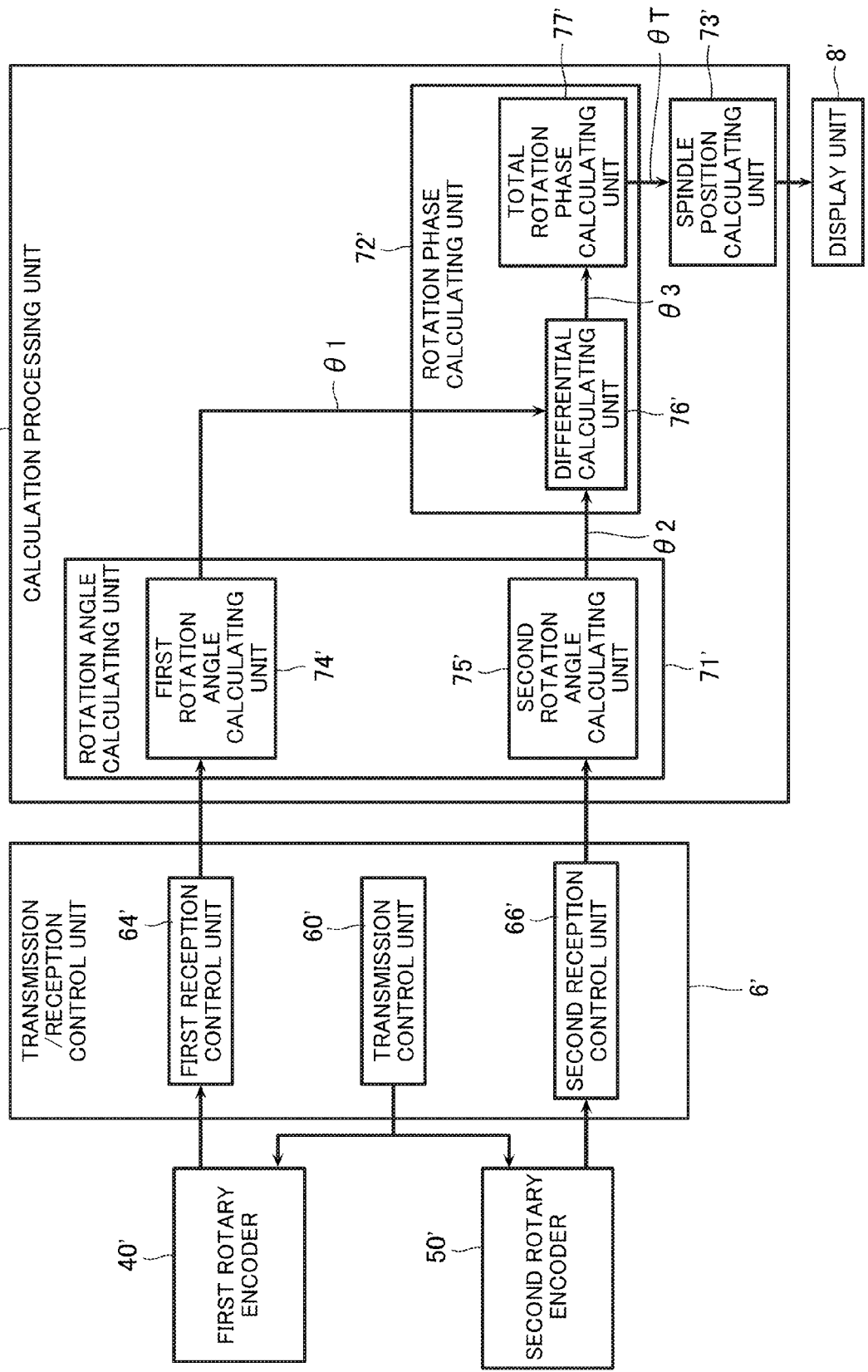
FIG. 38 is a block diagram illustrating a structure of a transmission/reception control unit 6' and a calculation processing unit 7' according to the fifth embodiment.

A structure of the transmission/reception control unit 6' and the calculation processing unit 7' will be described below in detail with reference to FIG. 38. FIG. 38 is a block diagram illustrating the structure of the transmission/reception control unit 6' and the calculation processing unit 7'.

The transmission/reception control unit 6' will be described first. The transmission/reception control unit 6' includes a transmission control unit 60, a first reception control unit 64' and a second reception control unit 66'.

The transmission control unit 60' controls transmission of signals to the first and second rotary encoders 40' and 50'. The transmission control unit 60' transmits predetermined AC signals for the first and second rotors 41' and 51' (for the first to third transmission wirings 412*a*' to 412*c*') to the stator 41'.

The first reception control unit 64' receives a phase signal of the first rotor 42' from the stator 41' (the first reception wiring 413*a*' and the second reception wiring 413*b*'). Herein, the phase signal is a signal indicating a phase difference between a signal based on the first magnetic flux coupler 422*a*' and a signal based on the second magnetic flux coupler 422*b*'.

The second reception control unit 66' receives a phase signal of the second rotor 51' from the stator 41' (the third reception wiring 413*c*' and the fourth reception wiring 413*d*'). Herein, the phase signal is a signal indicating a phase difference between a signal based on the third magnetic flux coupler 512*a*' and a signal based on the fourth magnetic flux coupler 512*b*'. The first reception control unit 64' and the second reception control unit 66' output the phase signals of the rotors 42' and 51' received from the stator 41' to the calculation processing unit 7'.

The calculation processing unit 7' will be described below. The calculation processing unit 7' includes a rotation angle calculating unit 71', a rotation phase calculating unit 72' and a spindle position calculating unit 73'. The rotation angle calculating unit 71' calculates rotation angles θ1 and θ2 of the first rotor 42' and the second rotor 51', respectively. The rotation phase calculating unit 72' calculates a rotation phase of the spindle 3' based on the rotation angles θ1 and θ2 of the rotors 42' and 51' calculated in the rotation angle calculating unit 71'. The spindle position calculating unit 73' calculates an absolute position of the spindle 3' based on the rotation phase of the spindle 3' calculated in the rotation phase calculating unit 72'.

The rotation angle calculating unit 71' includes a first rotation angle calculating unit 74' and a second rotation angle calculating unit 75'. The first rotation angle calculating unit 74' calculates the rotation angle θ1 of the first rotor 42' based on a phase signal from the first reception control unit 64'. The second rotation angle calculating unit 75' calculates the rotation angle θ2 of the second rotor 51' based on a phase signal from the second reception control unit 66'.

The first rotation angle calculating unit 74' calculates the rotation angle θ1 of the first rotor 42' as an absolute angle during one revolution (0°<θ1<360°) based on the phase signal from the first reception control unit 64'. Herein, the phase signal from the first reception control unit 64' does not generate the same phase during one revolution of the first rotor 42'. The first rotation angle calculating unit 74' sets and stores therein the rotation angle θ1 of the first rotor 42' and the phase signal in one-to-one correspondence. Thereby, the rotation angle θ1 of the first rotor 42' is uniquely defined depending on the phase signal output from the first reception control unit 64' and the absolute angle during one revolution of the first rotor 42' is calculated.

The second rotation angle calculating unit 75' calculates the rotation angle θ2 of the second rotor 51' as an absolute angle during one revolution based on the phase signal from the second reception control unit 66', like the first rotation angle calculating unit 74'.

The rotation phase calculating unit 72' includes a differential calculating unit 76' and a total rotation phase calculating unit 77'. The differential calculating unit 76' calculates a differential θ3 between the rotation angles θ1 and θ2 of the rotors 42' and 51' calculated in the rotation angle calculating unit 71'. The total rotation phase calculating unit 77' calculates a total rotation phase of the spindle 3' based on the differential θ3.

The total rotation phase calculating unit 77' sets and stores therein the differential θ3 and the total rotation phase of the spindle 3' in one-to-one correspondence. That is, a difference between the rotation angles θ1 and θ of the rotors 42' and 51' is set as one revolution while the spindle 3' rotates 40 times within the advance/retract movement range, and thus the differential θ3 is calculated between 0° and 360°, and a total rotation phase θT of the spindle 3' is uniquely calculated depending on the differential θ3.

The spindle position calculating unit 73' previously sets and stores therein a movement pitch (0.5 mm) per revolution of the spindle 3'. Then, the movement pitch (0.5 mm) is multiplied by the total rotation phase θT in the spindle position calculating unit 73' thereby to calculate a total movement amount of the spindle 3' or an absolute position of the spindle 3'. The display unit 8' displays the absolute position of the spindle 3' by digital display, for example.

The mechanical operations of the present embodiment will be described below. When the spindle 3' is rotated by the knob part 32', the female screw 26' of the main body 2' is engaged with the feed screw 33' of the spindle 3' so that the spindle 3' is axially advanced or retracted. When the spindle 3' rotates, the first rotation cylinder 43' rotates along with the spindle 3' by the key 47' engaged in the key groove 34' of the spindle 3'.

When the first rotation cylinder 43' rotates, the first rotor 42' rotates along with the first rotation cylinder 43'. The rotation of the first rotor 42 is detected by the stator 41' and is transmitted to the first reception control unit 64'. Subsequently, the rotation angle 91 within one revolution of the first rotor 42' is calculated in the first rotation angle calculating unit 74'.

Since the first rotor 42' rotates in synchronization with the spindle 3', the rotation angle 81 within one revolution of the first rotor 42' indicates a rotation angle within one revolution of the spindle 3'.

When the first rotation cylinder 43' rotates, the first relay gear 53A' of the relay gear 53' meshed with the gear 48' of the first rotation cylinder 43' rotates. Further, the gear 55' of the second rotation cylinder 52' meshed with the second relay gear 53B' of the relay gear 53' rotates and the second rotor 51' rotates along with the second rotation cylinder 52'. A phase signal within one revolution of the second rotor 51' is detected by the stator 41' and is transmitted to the second reception control unit 66'. Subsequently, the rotation angle θ2 within one revolution of the second rotor 51' is calculated in the second rotation angle calculating unit 75'.

Subsequently, the differential θ3 between the rotation angles θ1 and θ2 of the rotors 42' and 51' is calculated in the rotation phase calculating unit 72', and the total rotation phase θT of the spindle 3' is calculated based on the differential θ3. Finally, an absolute position of the spindle 3' is calculated based on the total rotation phase θT and the feed pitch (0.5 mm) of the spindle 3' in the spindle position calculating unit 73', and is displayed on the display unit 8'.

Sixth Embodiment

Figure 39:
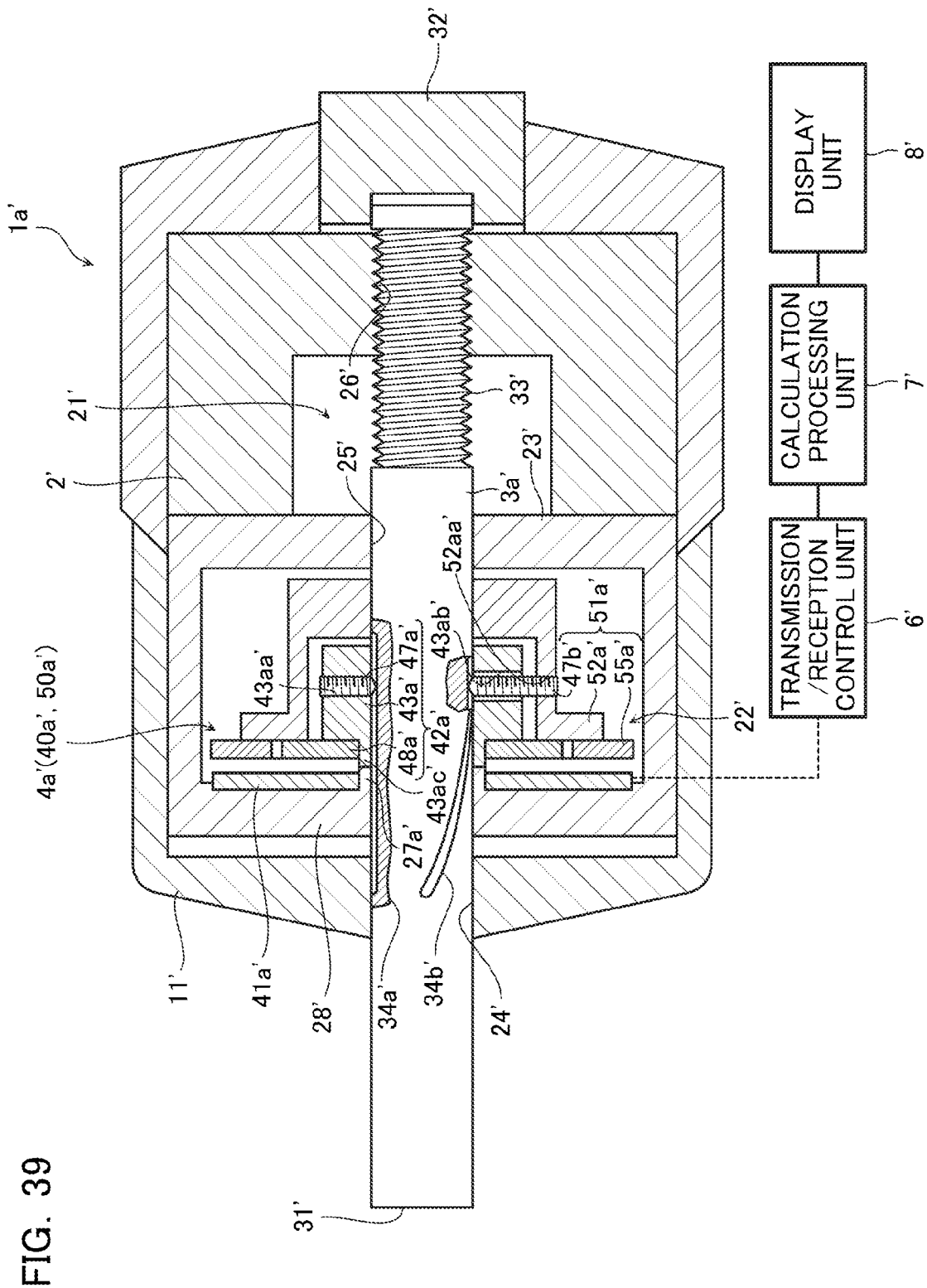
FIG. 39 is a cross-section view illustrating a micrometer head 1a' according to a sixth embodiment.

An entire structure of a micrometer head 1a' mounting thereon an inductive detection type rotary encoder 4a' according to a sixth embodiment will be described below with reference to FIG. 39. FIG. 39 is a cross-section view illustrating the micrometer head 1a' according to the sixth embodiment. In the sixth embodiment, like reference numerals are denoted to like reference parts identical to those in the fifth embodiment, and an explanation thereof will be omitted.

As illustrated in FIG. 39, the micrometer head 1a' includes a spindle 3a' different from the fifth embodiment, and an inductive detection type rotary encoder 4a' provided about the spindle 3a'. The micrometer head 1a' has the same structure of other parts as the fifth embodiment.

The spindle 3a' is formed in a substantially columnar shape like the fifth embodiment, and includes the contact face 31' with an object to be measured (not illustrated) at the end on the tip end side, and includes the knob part 32' at the end on the base end side.

Two key grooves 34a' and 34b' with different lead angles are provided at the center of the spindle 3a' unlike the fifth embodiment. The first key groove 34a' is linearly provided in parallel with the shaft of the spindle 3a'. The second key groove 34b' is spirally provided relative to the spindle 3a'. The positions of the start points and the end points of the first key groove 34a' and the second key groove 34b' substantially match in the shaft direction of the spindle 3a'. That is, the first key groove 34a' and the second key groove 34b' are formed in substantially the same range in the shaft direction of the spindle 3a'.

The key grooves 34a' and 34b' protrude to the outside of the main body 2' together with the spindle 3' when the spindle 3a' advances or retracts. But an outer frame 11' is provided such that the key grooves 34a' and 34b' are not exposed to the outside even when the spindle 3a' advances at maximum.

Figure 40:
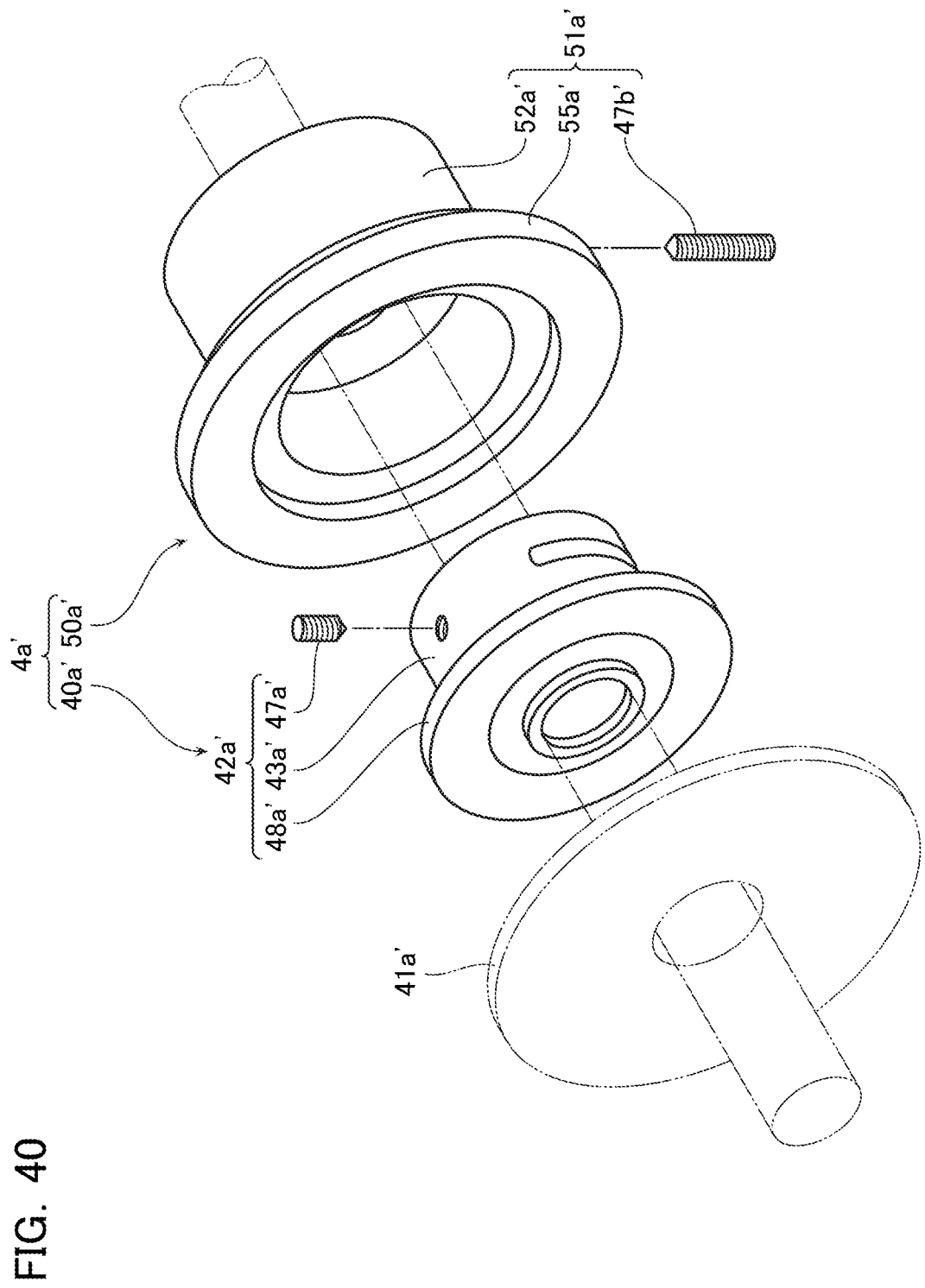
FIG. 40 is an exploded perspective view of an inductive detection type rotary encoder 4a' according to the sixth embodiment.

Subsequently, the inductive detection type rotary encoder 4a' will be described. FIG. 40 is an exploded perspective view of the inductive detection type rotary encoder 4a'. The inductive detection type rotary encoder 4a' is configured of a first rotary encoder 40a' and a second rotary encoder 50a' and is arranged inside the housing space 22' of the main body 2' as illustrated in FIG. 40.

The first rotary encoder 40a' includes a stator 41a', and a first rotor 42a' having a key 47a' engaged with the key groove 34a' and rotatably provided about the spindle 3a'.

The stator 41a' is fixed on a front end inner wall 28' of the housing space 22' while being inserted with the spindle 3a'.

The first rotor 42a' is arranged immediately outside the spindle 3a'. The first rotor 42a' is arranged axially opposite to the stator 41a' away from the stator 41a' by a predetermined distance. The first rotor 42a' includes: a first rotor plate 48a' which is rotated while being paired with the stator 41a' and opposing the stator 41a'; a first rotation cylinder 43a' for supporting rotation of the first rotor plate 48a' about the spindle 43a'; and the first key 47a' engaged with the first key groove 34a'. The first rotor plate 48a' is a small circular plate having a hole through which the spindle 3a' is inserted.

The first rotation cylinder 43a' supports rotation of the first rotor plate 48a' which is cylindrical to be externally fit to the spindle 3a' and is connected to the backside of the first rotor plate 48a'. The first rotation cylinder 43a' is provided with two holes 43aa' and 43ab' formed to penetrate in a direction perpendicular to the shaft, and the first key 47a' is fit into the first hole 43aa'. The second hole 43ab' is formed in a long hole shape having a circumferential length of the first rotation cylinder 43a'.

The second rotary encoder 50a' includes the stator 41a', and a second rotor 51a' having a key 47b' engaged with the key groove 34b' and rotatably provided about the spindle 3a'.

The second rotor 51a' is arranged outside the first rotor 42a' to surround it. The second rotor 51a' is arranged axially opposite to the stator 41a' away from the stator 41a' by a predetermined distance. The second rotor 51a' includes: a second rotor plate 55a' which is rotated while being paired with the stator 41a' and being opposite to the stator 41a'; a second rotation cylinder 52a' for supporting rotation of the second rotor plate 55a' about the spindle 3a'; and a second key 47b' engaged with the second key groove 34b', like the first rotor 42a'.

The second rotor plate 55a' is an annular plate having an inner hole enough to fit the first rotor plate 48a' therein. The second rotation cylinder 52a' is cylindrical to have a hole which is connected to the backside of the second rotor plate 55a' and fits the first rotation cylinder 43a' therein.

The second rotation cylinder 52a' includes a hole 52aa' formed to penetrate in a direction perpendicular to the shaft, and the second key 47b' is fit in the hole 52aa'. The second key 47b' passes through the second hole 43ab' as a long hole of the first rotation cylinder 43a' and is engaged with the second key groove 34b'.

The second rotation cylinder 52a' includes a bearing part 52ab' for receiving the spindle 3a' on the opposite side of the stator 41a' with the first rotor 42a' sandwiched therebetween. The position of the second key 47b' is substantially the same as the position of the first key 47a' provided in the first rotation cylinder 43a' in the spindle shaft direction.

A spindle bearing 27a' is slightly extended closer to the rear end than the stator 41a' in the front end inner wall 28' of the housing space 22' fixed with the stator 41a'. A spindle bearing 43ac' of the first rotation cylinder 43a' is slightly extended closer to the stator 41a' than the first rotor plate 48a'. The spindle bearing 43ac' of the first rotation cylinder 43a' abuts the spindle bearing 27a' of the main body 2' so that a gap between the stator 41a' and the first rotor plate 48a' is properly secured.

A coil spring (biasing unit) (not illustrated) is intervened between the second rotation cylinder 52a' and the partitioning plate 23', the second rotor 51a' is biased toward the stator 41a'. The first rotor 42a' is pressed onto the inner wall of the second rotation cylinder 52a' so that the first rotor 42a' is also biased toward the stator 41a'.

The operations of the micrometer head 1a' according to the sixth embodiment with the structure will be describe below. When the spindle 3a' is rotated by the knob part 32', the female screw 26' of the main body 2' is threaded with the feed screw 33' of the spindle 3a' so that the spindle 3a' is advanced or retracted in the shaft direction.

When the spindle 3a' is rotated, the first key groove 34a' and the second key groove 34b' of the spindle 3a' are engaged with the first key 47a' of the first rotation cylinder 43a' and the second key 47b' of the second rotation cylinder 52a', respectively. Thus the first rotation cylinder 43a' and the second rotation cylinder 52a' are rotated along with the rotation of the spindle 3a'. At this time, the first rotation cylinder 43a' receives the spindle 3a' by the spindle bearing 43ac'. Thus the first rotation cylinder 43a' rotates with reference to the spindle 3a'. The second rotation cylinder 52a' receives the spindle 3a' by a bearing part 622'. Thus the second rotation cylinder 52a' also rotates with reference to the spindle 3a'.

The first key groove 34a' and the second key groove 34b' have mutually different lead angles. Thus the first rotation cylinder 43a' and the second rotation cylinder 52a' are rotated at mutually different rotation amounts (rotation phases) per revolution of the spindle 3a'. When the first and second rotation cylinders 43a' and 52a' are rotated along with the rotation of the spindle 3a', the first rotor plate 48a' is rotated along with the first rotation cylinder 43a', and the second rotor plate 55a' is rotated along with the second rotation cylinder 52a'. That is, also in the sixth embodiment, the first rotor 42a' rotates at a different rotation speed from the second rotor 51a' as in the fifth embodiment.

Also in the sixth embodiment, the first and second magnetic flux couplers 422a' and 422b' are formed on the first rotor 42a' opposing the stator 41' as in the fifth embodiment (not illustrated). The third and fourth magnetic flux couplers 512a' and 512b' are formed on the second rotor 51a' opposing the stator 41' (not illustrated). The first to third transmission wirings 412a' to 412c' and the first to fourth reception wirings 412a' to 412d' are formed on the stator 41a' opposing the first and second rotors 42a' and 51a' (not illustrated).

The micrometer head 1a' according to the sixth embodiment has substantially the same structure as the fifth embodiment, and thus obtains the same advantages as the fifth embodiment.

Seventh Embodiment

An inductive detection type rotary encoder according to a seventh embodiment will be described below. In the seventh embodiment, like reference numerals are denoted to like reference parts identical to those in the fifth embodiment, and an explanation thereof will be omitted.

Figure 41:
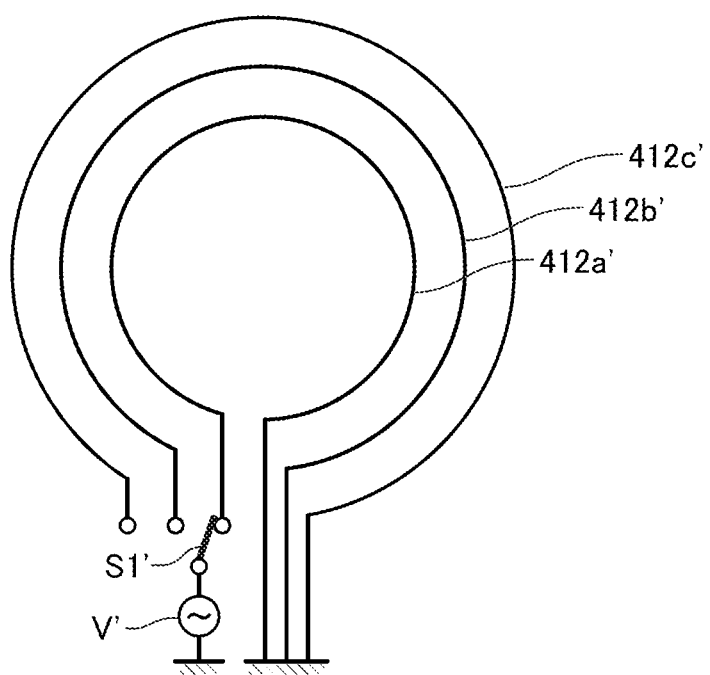
FIG. 41 is a circuit diagram illustrating a unit for supplying currents to the first to third transmission wirings 412a' to 412c' according to a seventh embodiment.

FIG. 41 is a diagram illustrating a current supplying unit for supplying currents to the first to third transmission wirings 412a' to 412c' according to the seventh embodiment. As illustrated in FIG. 41, in the seventh embodiment, drive signals are separately supplied to the first to third transmission wirings 412a' to 412c' via the switch S1'. The seventh embodiment is different from the fifth embodiment in that the drive signals are supplied to the first and third transmission wirings 412a' and 412c' at the same time.

Figure 42:
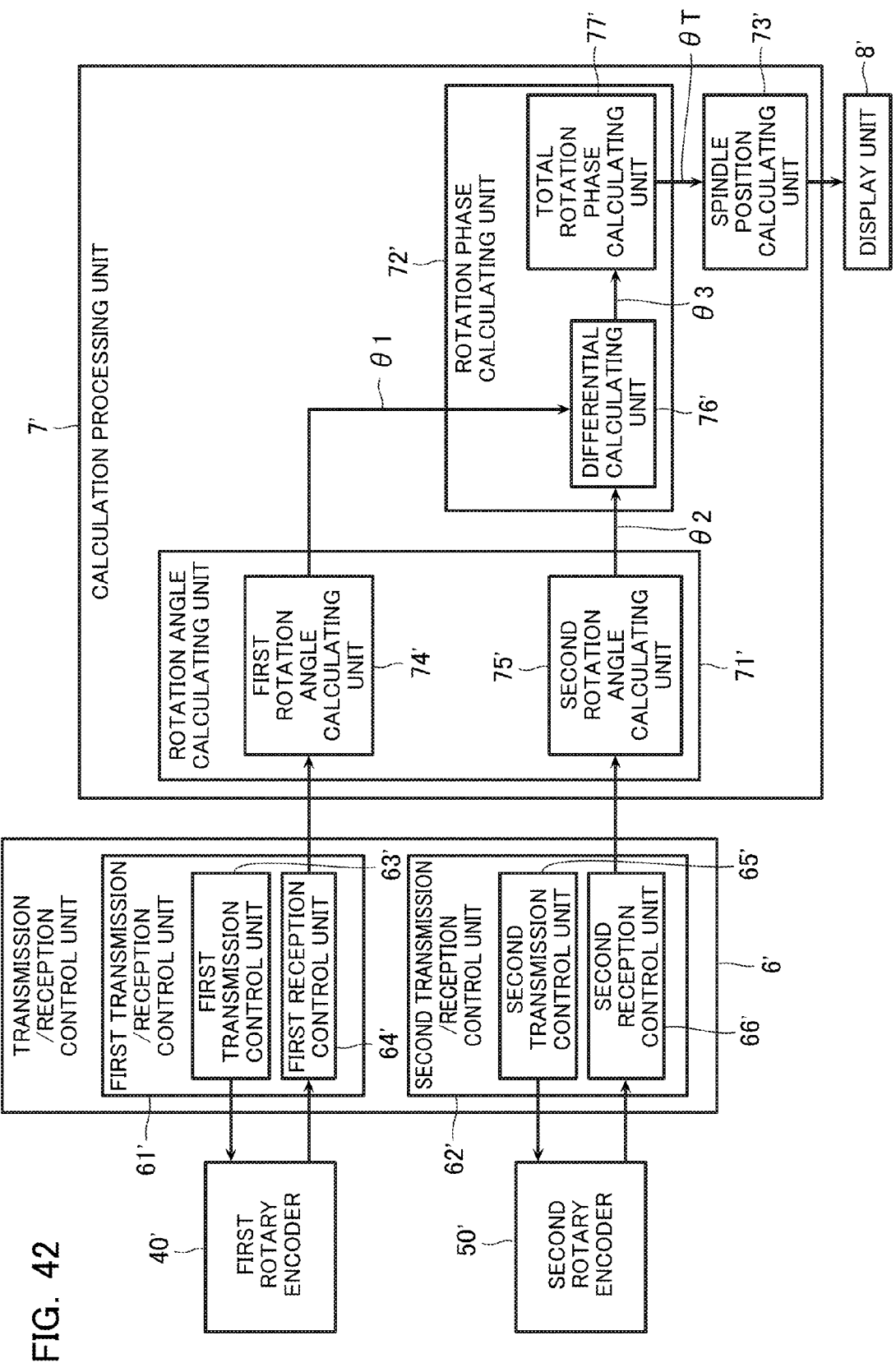
FIG. 42 is a block diagram illustrating a structure of the transmission/reception control unit 6' and the calculation processing unit 7' according to the seventh embodiment.

A structure of the transmission/reception control unit 6' according to the seventh embodiment will be described below with reference to FIG. 42. FIG. 42 is a block diagram illustrating the structure of the transmission/reception control unit 6' and the calculation processing unit 7' according to the seventh embodiment.

The transmission/reception control unit 6' includes a first transmission/reception control unit 61' for controlling transmission/reception of signals to/from the first rotary encoder 40' and a second transmission/reception control unit 62' for controlling transmission/reception of signals to/from the second rotary encoder 50' as illustrated in FIG. 42.

The first transmission/reception control unit 61' includes a first transmission control unit 63' and a first reception control unit 64'. The first transmission control unit 63' transmits a predetermined AC signal for the first rotor 42' (for the first and second transmission wirings 412a' and 412b') to the stator 41'.

The second transmission/reception control unit 62' includes a second transmission control unit 65' and a second reception control unit 66'. The second transmission control unit 65' transmits a predetermined AC signal for the second rotor 51' (for the second and third transmission wirings 412b' and 412c') to the stator 41'.

The seventh embodiment also obtains the same advantages as the fifth embodiment.

The embodiments according to the present invention have been described above, but the present invention is not limited thereto, and may be variously modified and added without departing from the spirit of the invention. For example, in the first embodiment, the second reception wiring 32b may oppose the second magnetic flux coupler 41b, and the second reception wiring 32b and the second magnetic flux coupler 41b may be arranged between the first reception wiring 32a and the first magnetic flux coupler 41a. Further, the second reception wiring 32b may oppose the first magnetic flux coupler 41a, and the second reception wiring 32b and the first magnetic flux coupler 41a may be arranged between the first reception wiring 32a and the second magnetic flux coupler 41b. Furthermore, the first reception wiring 32a may oppose the second magnetic flux coupler 41b, and the first reception wiring 32a and the second magnetic flux coupler 41b may be arranged between the second reception wiring 32b and the first magnetic flux coupler 41a.

The transmission wiring 31 according to the first embodiment may have a current path only on the outer periphery side or inner periphery side. The second transmission wiring 31b according to the second embodiment may be formed on the surface of the insulative layer 33B on the rotor 15 side.

In the fifth embodiment, the first to fourth magnetic flux couplers may be an electrode, or a hole or concave part formed on a conductive plate.

The fifth embodiment is directed for detecting how many revolutions the first rotor 42' rotates based on the positional relationship between the first rotor 42' and the second rotor 51'. However, the fifth embodiment may be directed for detecting how many revolutions the second rotor 51' rotates based on the positional relationship between the first rotor 42' and the second rotor 51'.

In the fifth embodiment, N1=N3, N2=N4, and N4−N3=N2−N1=1 are established, but N1≠N3, N2≠N4 and N4−N3≠N2−N1≠1 may be established and N1=N4, N2=N3 may be established. Alternatively, N1, N2, N3, and N4 may be all different.

In the fifth embodiment, the second reception wiring 413b' may oppose the second magnetic flux coupler 422b', and the second reception wiring 413b' and the second magnetic flux coupler 422b' may be arranged between the first reception wiring 413a' and the first magnetic flux coupler 422a'. Similarly, the fourth reception wiring 413d' may oppose the fourth magnetic flux coupler 512b', and the fourth reception wiring 413d' and the fourth magnetic flux coupler 512b' may be arranged between the third reception wiring 413c' and the third magnetic flux coupler 512a'.

In the fifth embodiment, the second reception wiring 413b' may oppose the first magnetic flux coupler 422a', and the second reception wiring 413b' and the first magnetic flux coupler 422a' may be arranged between the first reception wiring 413a' and the second magnetic flux coupler 422b'. Similarly, the fourth reception wiring 413d' may oppose the third magnetic flux coupler 512a', and the fourth reception wiring 413d' and the third magnetic flux coupler 512a' may be arranged between the third reception wiring 413c' and the fourth magnetic flux coupler 512b'.

In the fifth embodiment, the first reception wiring 413a' may oppose the second magnetic flux coupler 422b', and the first reception wiring 413a' and the second magnetic flux coupler 422b' may be arranged between the second reception wiring 413b' and the first magnetic flux coupler 422a'. Similarly, the third reception wiring 413c' may oppose the fourth magnetic flux coupler 512b', and the third reception wiring 413c' and the fourth magnetic flux coupler 512b' may be arranged between the fourth reception wiring 413d' and the third magnetic flux coupler 512a'.

The above embodiments are of an inductive detection type rotary encoder, but the present invention is applicable to an electrostatic capacity type rotary encoder or a photoelectric type rotary encoder.

What is claimed is:

1. An inductive detection type rotary encoder comprising:
a stator;
a rotor which is rotatable about a rotation shaft and is arranged opposite to the stator;
a first transmission wiring and a second transmission wiring which are annularly formed on the stator about the rotation shaft;
a first reception wiring and a second reception wiring which are annularly formed on the stator along the first transmission wiring and the second transmission wiring about the rotation shaft;
a first magnetic flux coupler and a second magnetic flux coupler which are annularly formed on the rotor about the rotation shaft and are directed for magnetic-flux coupling with the first transmission wiring, the second transmission wiring, the first reception wiring and the second reception wiring; and
a current supplying unit for supplying currents to the first transmission wiring and the second transmission wiring,
the first reception wiring and the first magnetic flux coupler forming a first track having a shape periodically changing in a rotation direction of the rotor at a first pitch,
the second reception wiring and the second magnetic flux coupler forming a second track having a shape periodically changing in a rotation direction of the rotor at a second pitch different from the first pitch,
the first reception wiring and the second reception wiring being stacked via a first insulative layer in a direction in which the rotation shaft extends,
the first magnetic flux coupler and the second magnetic flux coupler being stacked via a second insulative layer in a direction in which the rotation shaft extends, and
the current supplying unit alternately supplying currents to the first transmission wiring and the second transmission wiring in a time division manner.

2. The inductive detection type rotary encoder according to claim 1, wherein
the first transmission wiring has an outer periphery side first current path and an inner periphery side first current path, and the outer periphery side first current path and the inner periphery side first current path surround the first reception wiring,
the second transmission wiring has an outer periphery side second current path and an inner periphery side second current path, and the outer periphery side second current path and the inner periphery side second current path surround the second reception wiring,
an orientation of a current flowing through the outer periphery side first current path of the first transmission wiring is the same as an orientation of a current flowing through the inner periphery side first current path of the first transmission wiring;
an orientation of a current flowing through the outer periphery side second current path of the second transmission wiring is reverse to an orientation of a current flowing through the inner periphery side second current path of the second transmission wiring,
the first magnetic flux coupler is continuously formed to be toothed, and
the second magnetic flux coupler is formed to be isolated in an islands shape.

3. The inductive detection type rotary encoder according to claims 1,
wherein the first reception wiring opposes the first magnetic flux coupler, and
the first reception wiring and the first magnetic flux coupler are arranged between the second reception wiring and the second magnetic flux coupler.

4. The inductive detection type rotary encoder according to claim 3,
wherein the first pitch is shorter than the second pitch.

5. An inductive detection type rotary encoder comprising:
a stator;
a rotor which is rotatable about a rotation shaft and is arranged opposite to the stator,
a first transmission wiring which is annularly formed on the stator about the rotation shaft;

a second transmission wiring which is annularly formed on the inner periphery side of the first transmission wiring;

a first reception wiring and a second reception wiring which are annularly formed on the stator along the transmission wiring about the rotation shaft;

a first magnetic flux coupler and a second magnetic flux coupler which are annularly formed on the rotor about the rotation shaft and are directed for magnetic-flux coupling with the first transmission wiring, the second transmission wiring, and the first reception wiring and the second reception wiring; and a current supplying unit for supplying currents to the first transmission wiring and the second transmission wiring, the first reception wiring and the first magnetic flux coupler forming a first track having a shape periodically changing in a rotation direction of the rotor at a first pitch, the second reception wiring and the second magnetic flux coupler forming a second track having a shape periodically changing in a rotation direction of the rotor at a second pitch different from the first pitch, the first reception wiring and the second reception wiring being stacked via a first insulative layer in a direction in which the rotation shaft extends, the first magnetic flux coupler and the second magnetic flux coupler being stacked via a second insulative layer in a direction in which the rotation shaft extends, the first magnetic flux coupler having a toothed first current path changing at the first pitch and an annular second current path coupling an inner periphery side of the first current path, the second magnetic flux coupler having an annular third current path, and a toothed fourth current path changing at the second pitch of which outer periphery side is coupled by the third current path, and the current supplying unit alternately supplying currents to the first transmission wiring and the second transmission wiring in a time division manner.

6. The inductive detection type rotary encoder according to claim 5, wherein the first reception wiring opposes the first magnetic flux coupler, and the first reception wiring and the first magnetic flux coupler are arranged between the second reception wiring and the second magnetic flux coupler.

7. The inductive detection type rotary encoder according to claim 6, wherein the first pitch is shorter than the second pitch.

8. An inductive detection type rotary encoder comprising:

a stator;

a first rotor which is engaged with a rotation shaft to rotate along with the rotation shaft and axially opposes the stator;

a second rotor which is arranged on an outer periphery side of the first rotor, is rotatable relative to the first rotor, and axially opposes the stator;

a rotation transmitting unit which transmits rotation of the rotation shaft and rotates the second rotor at a different speed from the first rotor;

a first transmission wiring and a second transmission wiring which are annularly formed on the stator about the rotation shaft;

a first reception wiring and a second reception wiring which are provided on the stator and are annularly formed about the rotation shaft;

a third reception wiring and a fourth reception wiring which are provided on the stator on the outer periphery sides of the first reception wiring and the second reception wiring and are annularly formed about the rotation shaft;

a first magnetic flux coupler and a second magnetic flux coupler which are provided on the first rotor, are annularly formed about the rotation shaft and are directed for magnetic-flux coupling with the first reception wiring and the second reception wiring;

a third magnetic flux coupler and a fourth magnetic flux coupler which are provided on the second rotor, are annularly formed about the rotation shaft, and are directed for magnetic-flux coupling with the third reception wiring and the fourth reception wiring; and a current supplying unit for supplying currents to the first transmission wiring and the second transmission wiring, wherein, the first reception wiring and the second reception wiring are stacked via a first insulative layer in a direction in which the rotation shaft extends, the third reception wiring and the fourth reception wiring are stacked via a second insulative layer in a direction in which the rotation shaft extends, the first magnetic flux coupler and the second magnetic flux coupler are stacked via a third insulative layer in a direction in which the rotation shaft extends, the third magnetic flux coupler and the fourth magnetic flux coupler are stacked via a fourth insulative layer in a direction in which the rotation shaft extends, the first reception wiring and the first magnetic flux coupler form a first angle detection track generating N1 periodical changes for one revolution of the first rotor, the second reception wiring and the second magnetic flux coupler form a second angle detection track generating N2 periodical changes for one revolution of the first rotor, the third reception wiring and the third magnetic flux coupler form a third angle detection track generating N3 periodical changes for one revolution of the second rotor, the fourth reception wiring and the fourth magnetic flux coupler form a fourth angle detection track generating N4 periodical changes for one revolution of the second rotor, N1 is different from N2 and N3 is different from N4, and the current supplying unit alternately supplying currents to the first transmission wiring and the second transmission wiring in a time division manner.

9. The inductive detection type rotary encoder according to claim 8, wherein the first angle detection track has a shape periodically changing in a rotation direction of the first rotor at a first pitch, the second angle detection track has a shape periodically changing in a rotation direction of the first rotor at a second pitch, the third angle detection track has a shape periodically changing in a rotation direction of the second rotor at a third pitch, the fourth angle detection track has a shape periodically changing in a rotation direction of the second rotor at a fourth pitch, the first pitch is different from the second pitch, and the third pitch is different from the fourth pitch.

10. The inductive detection type rotary encoder according to claim 8,
wherein N1, N2, N3 and N4 are different from each other.

11. The inductive detection type rotary encoder according to claim 8,
wherein a differential between N1 and N2 is "1" and a differential between N3 and N4 is "1".

12. The inductive detection type rotary encoder according to claim 8,
wherein N1=N3 is established and N2=N4 is established.

13. The inductive detection type rotary encoder according to claim 8,
wherein the transmission wiring comprises:
the first transmission wiring which is provided on the inner periphery sides of the first reception wiring and the second reception wiring;
the second transmission wiring which is provided on the outer periphery sides of the first reception wiring and the second reception wiring and on the inner periphery sides of the third reception wiring and the fourth reception wiring; and
a third transmission wiring which is provided on the outer periphery sides of the third reception wiring and the fourth reception wiring.

14. The inductive detection type rotary encoder according to claim 8,
wherein the first magnetic flux coupler has a toothed first current path changing at the first pitch and an annular second current path coupling an inner periphery side of the first current path,
the second magnetic flux coupler has an annular third current path, and a toothed fourth current path of which outer periphery side is coupled by the third current path and which changes at the second pitch,
the third magnetic flux coupler has a toothed fifth current path changing at the third pitch and an annular sixth current path coupling an inner periphery side of the fifth current path, and
the fourth magnetic flux coupler has an annular seventh current path and a toothed eighth current path of which outer periphery side is coupled by the seventh current path and which changes at the fourth pitch.

* * * * *